(12) United States Patent
Sherman

(10) Patent No.: US 10,733,584 B2
(45) Date of Patent: Aug. 4, 2020

(54) METHOD AND SYSTEM FOR PROVIDING PAY-AS-YOU-GO PRE-PAID PROFESSIONAL SERVICES

(71) Applicant: Kenneth L. Sherman, Santa Monica, CA (US)

(72) Inventor: Kenneth L. Sherman, Santa Monica, CA (US)

( * ) Notice: Subject to any disclaimer, the term of this patent is extended or adjusted under 35 U.S.C. 154(b) by 0 days.

(21) Appl. No.: 16/428,752

(22) Filed: May 31, 2019

(65) Prior Publication Data

US 2019/0287086 A1    Sep. 19, 2019

Related U.S. Application Data

(63) Continuation of application No. 15/254,461, filed on Sep. 1, 2016, now Pat. No. 10,366,376.

(60) Provisional application No. 62/281,086, filed on Jan. 20, 2016, provisional application No. 62/213,215, filed on Sep. 2, 2015.

(51) Int. Cl.
| | |
|---|---|
| *G06Q 20/14* | (2012.01) |
| *G06Q 20/28* | (2012.01) |
| *G06Q 50/18* | (2012.01) |
| *H04N 7/15* | (2006.01) |
| *G06Q 20/12* | (2012.01) |
| *G06F 3/0484* | (2013.01) |
| *G06N 5/02* | (2006.01) |

(52) U.S. Cl.
CPC ......... *G06Q 20/145* (2013.01); *G06Q 20/12* (2013.01); *G06Q 20/28* (2013.01); *G06Q 50/184* (2013.01); *H04N 7/15* (2013.01); *G06F 3/04842* (2013.01); *G06N 5/02* (2013.01)

(58) Field of Classification Search
None
See application file for complete search history.

(56) References Cited

U.S. PATENT DOCUMENTS

| | | |
|---|---|---|
| 7,043,443 B1 | 5/2006 | Firestone |
| 7,096,193 B1 | 8/2006 | Beaudoin et al. |
| 7,505,919 B2 | 3/2009 | Richardson |

(Continued)

OTHER PUBLICATIONS

U.S. Restriction Requirement for U.S. Appl. No. 15/254,461 dated Aug. 28, 2018.

(Continued)

*Primary Examiner* — Peter Ludwig
(74) *Attorney, Agent, or Firm* — Sherman IP LLP; Kenneth L. Sherman; Hemavathy Perumal

(57) ABSTRACT

One embodiment provides a method comprising generating a first graphical user interface (GUI) for display on an electronic device. The first GUI comprises data indicative of at least one professional service available for selection. The method comprises receiving, from the electronic device, a request to initiate a professional service selected from the first GUI. The method further comprises generating a second GUI for display on the electronic device. The second GUI comprises a customized questionnaire for collecting information relevant to the professional service selected. The method further comprises receiving, from the electronic device, user responses to the customized questionnaire, and initiating an analysis of the user responses. A communication indicative of the analysis is forwarded to the electronic device.

20 Claims, 40 Drawing Sheets

(56) References Cited

U.S. PATENT DOCUMENTS

| | | |
|---|---|---|
| 7,533,034 B2 | 5/2009 | Laurin et al. |
| 7,805,382 B2 | 9/2010 | Rosen et al. |
| 7,996,767 B2 | 8/2011 | Lee et al. |
| 8,948,009 B1 * | 2/2015 | Hasan ................... H04L 47/193 370/231 |
| 9,597,601 B2 | 3/2017 | Tanaka et al. |
| 10,039,113 B2 | 7/2018 | Ogrinz |
| 10,083,411 B2 | 9/2018 | Kinsey, II et al. |
| 2002/0042719 A1 | 4/2002 | Chauchard et al. |
| 2002/0087378 A1 | 7/2002 | Como |
| 2004/0117472 A1 * | 6/2004 | Masachika .............. H04L 29/06 709/223 |
| 2004/0230550 A1 | 11/2004 | Simpson et al. |
| 2006/0229896 A1 | 10/2006 | Rosen et al. |
| 2007/0022113 A1 | 1/2007 | Heino |
| 2008/0172415 A1 | 7/2008 | Fakhari et al. |
| 2009/0011395 A1 | 1/2009 | Schmidt et al. |
| 2009/0216552 A1 | 8/2009 | Watrous |
| 2009/0259492 A1 * | 10/2009 | Cossman .............. G06F 19/328 705/3 |
| 2011/0247028 A1 | 10/2011 | Eyer |
| 2012/0330769 A1 | 12/2012 | Arceo |
| 2013/0095460 A1 | 4/2013 | Bishop |
| 2013/0297324 A1 * | 11/2013 | Phillips .................. G06Q 30/02 705/2 |
| 2014/0057718 A1 * | 2/2014 | Tanaka ................ H04L 12/1827 463/31 |
| 2014/0059487 A1 * | 2/2014 | Baumann .............. G06F 3/0482 715/811 |
| 2014/0111597 A1 * | 4/2014 | Anderson ........... H04L 12/1827 348/14.03 |
| 2017/0039867 A1 | 5/2017 | Fieldman |

OTHER PUBLICATIONS

U.S. Non-Final Office Action for U.S. Appl. No. 15/254,461 dated Nov. 6, 2018.

U.S. Notice of Allowance for U.S. Appl. No. 15/254,461 dated Apr. 10, 2019.

* cited by examiner

715

700

| Registration | 701 |

Name:

Email:

Confirm Email:

Password:

Confirm Password:

Agreement:

☐ 705    704
703

Create Account
706

YOUR TRADEMARK QUESTIONNAIRE

Has your mark been previously applied for or registered in the U.S. or Internationally?

○ Yes  ◉ No

Is your trademark a transliteration?

○ Yes  ◉ No

Is your trademark a translation?

○ Yes  ◉ No

Is your trademark a name, portrait, or signature of an individual?

○ Yes  ◉ No

Do you have any questions or additional information that you would like the attorney to review prior to your consultation?

○ Yes  ◉ No

Back    Next

Schedule A Virtual Consultation

Cost Structure:
  ┌─────────────────────────────────── 841
  │ 15 Minutes          $X
  │ 30 Minutes          $Y
  │         ⋮
  └───────────────────────────────────

Select a Desired Length of the Virtual Consultation
  ┌─────────────────────────────────── 842
  │ ☐ 15 Minutes   ☑ 30 Minutes   ☐ 45 Minutes   ...
  │                  843
  └───────────────────────────────────

Select a Proposed Date & Time for the Virtual Consultation
  ┌─────────────────────────────────── 844
  │ [  Date  ]      [ Start Time ]
  │    845A              845B
  └───────────────────────────────────

Select a Desired Professional to Schedule the Virtual Consultation With:
  ┌─────────────────────────────────── 847
  │ ☑ Professional 1          [ Info About Professional 1 ]
  │   848
  │         ⋮
  │ ☐ Professional M          [ Info About Professional M ]
  │                                                    849
  └───────────────────────────────────

Dashboard 770

| Name | Identifier | Date | Status | | Actions | |
|---|---|---|---|---|---|---|
| ● Request 1 | 0001 | 01/02/16 01:02 PM PST | Complete | View | Email | |
| ○ Request 2 | 0002 | 01/02/16 02:03 PM PST | Incomplete | View | Email | Delete |
| ● Request Z | ZZZZ | 06/07/16 03:04 PM PST | Complete | View | Email | |

- 772: Date From / Date To
- 773: Filter Status
- 774: Name Filter
- 775: Filter / Clear Filter
- 776: 777 / Search 778
- 793: Resume Incomplete Request
- 795: Start New Request
- 771, 781, 780
- 782, 783, 784
- 785
- 791: Export
- 792: Legend
- 794: Account Details
- 790: Statistical Information

Resume Incomplete Request — 1001

| Name | Status | Actions |
|---|---|---|
| ○ Request 2 | Incomplete | Resume — 1002 |
| 785 | ... | |

Back to Dashboard — 834

Generate ZIP File — 835

Detailed Information for Request 1 — 831

Identifier:
Status:
Contact Info: — 832
Date & Time of Consultation:
...

Save Changes — 833

Revision History — 836

| File Name | Edited By | Timestamp | PDF | |
|---|---|---|---|---|
| | | | 838 | 839 |
| Document 1 — 837 | Joe B | 01/02/16 10:00 AM PST | View | Download |
| Document 1 | Jill B | 01/02/16 12:00 PM PST | View | Download |
| ... | | | | |

MYACCOUNT

My Account Details

Name: Jane Doe
Email: abc@defg.com
Password:

My Payment History

My Addresses

| Name | Street | City | State | Zip | Country | Phone | Website | Actions |
|---|---|---|---|---|---|---|---|---|
| Jane Doe | xxxxx | xxx | CA | 90066 | US | 123-456-7890 | | |
| John Doe | 123 4th Street | Los Angeles | CA | 90066 | US | 123-456-7890 | | |

FIG. 15B

METHOD AND SYSTEM FOR PROVIDING PAY-AS-YOU-GO PRE-PAID PROFESSIONAL SERVICES

CROSS REFERENCE TO RELATED APPLICATIONS

The present application is a continuation of and claims priority to U.S. patent application Ser. No. 15/254,461, filed on Sep. 1, 2016, which in turn claims priority to U.S. Provisional Patent Application Ser. No. 62/213,215, filed on Sep. 2, 2015, and U.S. Provisional Patent Application Ser. No. 62/281,086, filed on Jan. 20, 2016, all incorporated herein by reference.

TECHNICAL FIELD

One or more embodiments relate generally to an online service provider, and in particular, a method and system for providing pay-as-you-go pre-paid professional services.

BACKGROUND

Traditionally, a provider of professional services (e.g., a provider of legal services such as an attorney or a law firm, a provider of accounting services such as an accountant or an accounting firm, architects, public relations professionals, etc.) dictates the amount of time spent and service fees associated with professional services rendered to a client. They usually bill at a certain increment on the billable hour model.

For example, when an attorney performs legal services for a client, the amount of legal service fees the client is billed may be based on multiple factors, such as the total amount of time spent by the attorney consulting with the client and then preparing documents, attending meetings or conducting other work, the complexity of the legal services performed, the hourly rate of the attorney, etc. The client may have little or no input with regards to controlling the costs or fees associated with the legal services being performed.

Alternatively, sometimes professionals quote flat fees for specific services. However, again, this effort is simply an attempt by the professional to model the projected time they are going to dedicate to a project. It is inaccurate and completely within the professional's control. The client is not able to define the amount of time they want the professional to dedicate to the project nor even the amount of time that the professional is consulting with the client.

BRIEF SUMMARY

One embodiment provides a method comprising generating a first graphical user interface (GUI) for display on an electronic device. The first GUI comprises data indicative of at least one professional service available for selection. The method comprises receiving, from the electronic device, a request to initiate a professional service selected from the first GUI. The method further comprises generating a second GUI for display on the electronic device. The second GUI comprises a customized questionnaire for collecting information relevant to the professional service selected. The method further comprises receiving, from the electronic device, user responses to the customized questionnaire, and initiating an analysis of the user responses. A communication indicative of the analysis is forwarded to the electronic device.

Another embodiment provides a system comprising at least one processor and a non-transitory processor-readable memory device storing instructions that when executed by the at least one processor causes the at least one processor to perform operations including generating a first graphical user interface (GUI) for display on an electronic device. The first GUI comprises data indicative of at least one professional service available for selection. The operations further comprise receiving, from the electronic device, a request to initiate a professional service selected from the first GUI. The operations further comprise generating a second GUI for display on the electronic device. The second GUI comprises a customized questionnaire for collecting information relevant to the professional service selected. The operations further comprise receiving, from the electronic device, user responses to the customized questionnaire, and initiating an analysis of the user responses. A communication indicative of the analysis is forwarded to the electronic device.

One embodiment provides a method comprising receiving, from an electronic device, a request to access a dashboard for an online account, and generating a graphical user interface (GUI) comprising the dashboard for display on the electronic device. The dashboard provides service history information for the online account. The service history information comprises a list of one or more professional services associated with the online account and a status of each professional service of the list.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5A illustrates an example registration GUI 700, in accordance with an embodiment;

FIG. 5B illustrates another example registration GUI 705, in accordance with an embodiment;

FIGS. 8B-8I illustrate other example questionnaires GUIs 750-757, in accordance with an embodiment;

FIG. 9 illustrates an example scheduling GUI 840, in accordance with an embodiment;

FIG. 13A illustrates an example dashboard 770, in accordance with an embodiment;

FIG. 13D illustrates an example pop-up window 1000, in accordance with an embodiment;

FIG. 14A illustrates an example detailed information GUI 830, in accordance with an embodiment;

FIG. 14B illustrates another example detailed information GUI 850, in accordance with an embodiment;

FIG. 15B illustrates another example account details GUI 530, in accordance with an embodiment;

Figure 1:
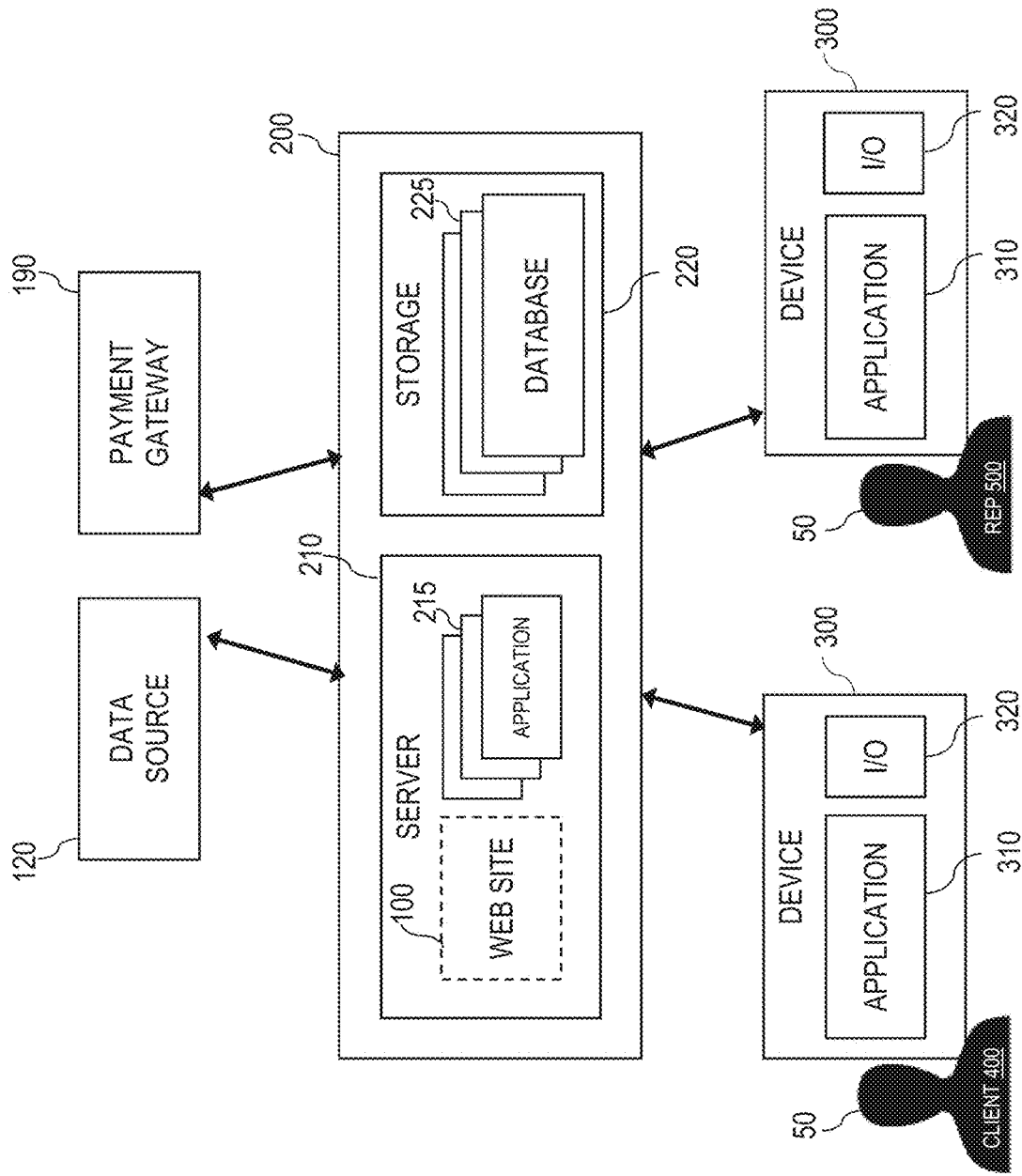
FIG. 1 illustrates an example system 200 for providing pay-as-you-go pre-paid professional services, in accordance with an embodiment.

The detailed description explains the preferred embodiments of the invention together with advantages and features, by way of example with reference to the drawings.

DETAILED DESCRIPTION

One or more embodiments relate generally to an online service provider, and in particular, a method and system for providing pay-as-you-go pre-paid professional services. One embodiment provides a method comprising generating a first graphical user interface (GUI) for display on an electronic device. The first GUI comprises data indicative of at least one professional service available for selection. The method comprises receiving, from the electronic device, a request to initiate a professional service selected from the first GUI. The method further comprises generating a second GUI for display on the electronic device. The second GUI comprises a customized questionnaire for collecting information relevant to the professional service selected. The method further comprises receiving, from the electronic device, user responses to the customized questionnaire, and initiating an analysis of the user responses. A communication indicative of the analysis is forwarded to the electronic device.

Another embodiment provides a system comprising at least one processor and a non-transitory processor-readable memory device storing instructions that when executed by the at least one processor causes the at least one processor to perform operations including generating a first graphical user interface (GUI) for display on an electronic device. The first GUI comprises data indicative of at least one professional service available for selection. The operations further comprise receiving, from the electronic device, a request to initiate a professional service selected from the first GUI. The operations further comprise generating a second GUI for display on the electronic device. The second GUI comprises a customized questionnaire for collecting information relevant to the professional service selected. The operations further comprise receiving, from the electronic device, user responses to the customized questionnaire, and initiating an analysis of the user responses. A communication indicative of the analysis is forwarded to the electronic device.

One embodiment provides a method comprising receiving, from an electronic device, a request to access a dashboard for an online account, and generating a graphical user interface (GUI) comprising the dashboard for display on the electronic device. The dashboard provides service history information for the online account. The service history information comprises a list of one or more professional services associated with the online account and a status of each professional service of the list.

One embodiment provides a web site that allows a user (e.g., a client) requesting a professional service to actively control different aspects of the professional service requested. The user may select, via the web site, a particular professional/service provider from different professionals/service providers to perform the professional service requested. The user may also manage, via the web site, fees associated with the professional service requested. For example, the user may schedule a virtual consultation/appointment with a selected professional/service provider for a pre-determined amount of time with a visible cost structure, thereby directly controlling a length of the scheduled consultation/appointment to manage costs associated with the professional service requested.

For expository purposes, the term "professional services" as used herein refers to services requiring performance of an individual with special training or holding a professional license. Examples of professional services include, but are not limited to, architectural services performed by architects, auditing services performed by auditors, engineering services performed by engineers, medical services performed by doctors/physicians, legal services performed by attorneys and paralegals, tax services performed by tax professionals and accountants, etc. The term "user" as used herein refers to a user utilizing a web site provided by one embodiment.

FIG. 1 illustrates an example system 200 for providing pay-as-you-go pre-paid professional services, in accordance with an embodiment. The system 200 comprises one or more server devices 210 and one or more storage devices 220. The storage devices 220 may maintain one or more databases 225. As described in detail later herein, one or more applications 215 may execute/operate on the server devices 210 to provide an online service web site 100 that offers and provides pay-as-you-go pre-paid professional services.

As described in detail later herein, in one embodiment, the web site 100 allows a client to select a particular professional service, select a particular professional/service provider for the selected professional service from a group of different professionals/service providers, schedule a virtual consultation with the selected professional/service provider for a pre-determined amount of time with a visible cost structure, and control duration of the scheduled virtual consultation to manage costs associated with the selected professional service.

In one embodiment, the web site 100 offers and provides pay-as-you-go pre-paid legal services (e.g., legal services associated with registration of a trademark, such as preparing and filing a trademark application for a desired mark, etc.). In another embodiment, the web site 100 offers and provides other types of pay-as-you-go pre-paid professional services such as, but not limited to, architectural services, auditing services, engineering services, medical services, tax services, etc.

One or more users 50 may access the web site 100 via one or more electronic devices 300. An electronic device 300 may comprise, but is not limited to, at least one of the following: a personal computer (e.g., a desktop computer), a mobile/handheld device such as a laptop computer, a tablet, a smartphone, etc. An electronic device 300 comprises one or more input/output (I/O) modules 320, such as a keyboard, a keypad, a display screen, a microphone, etc. The web site 100 is configured to exchange data with an electronic device 300 over a connection (e.g., a wired connection and/or a wireless connection such as a WiFi connection or a cellular data connection).

A user 50 may interact with the web site 100 via an application 310 downloaded to or pre-loaded on an electronic device 300. For example, the application 310 may be a mobile application downloaded to the electronic device 300 from a digital distribution platform (e.g., Google Play, iTunes Store, etc.). As another example, the application 310 may be a web browser pre-loaded on the electronic device 300.

In one embodiment, a user 50 may be classified as either a client user ("client") 400 or a service representative user ("rep") 500. A client user 400 is an individual/collection of individuals requesting a professional service from the web site 100 (e.g., a client/customer, etc.). A service representative user 500 is one of the following: an individual/collection of individuals acting as an administrator, or an individual/collection of individuals assigned/selected to render a professional service requested by a client user 400 (e.g., a professional such as an attorney, support staff for the professional such as a paralegal, etc.).

As described in detail later herein, the web site 100 supports different payment mechanisms to facilitate payment of fees for a professional service requested by a client user 400. To support different payment mechanisms, the system 200 is configurable to communicate/interface with different payment gateways 190. The system 200 is configured to exchange data with a payment gateway 190 over a connection (e.g., a wired connection and/or a wireless connection).

The system 200 is configured to query and retrieve information of relevance/interest to a user 50 from one or more data sources. The data sources queried may comprise a database 225 maintained on the storage devices 220 and/or a third-party data source 120. The system 200 is configurable to interface with different third-party data sources 120 to acquire data. The system 200 is configured to exchange data with a third-party data source 120 over a connection (e.g., a wired connection and/or a wireless connection).

In one embodiment, the system 200 is implemented utilizing a centralized computing architecture. In another embodiment, the system 200 is implemented utilizing a distributed computing architecture. In yet another embodiment, the system 200 is implemented utilizing a cloud computing architecture.

Figure 2:
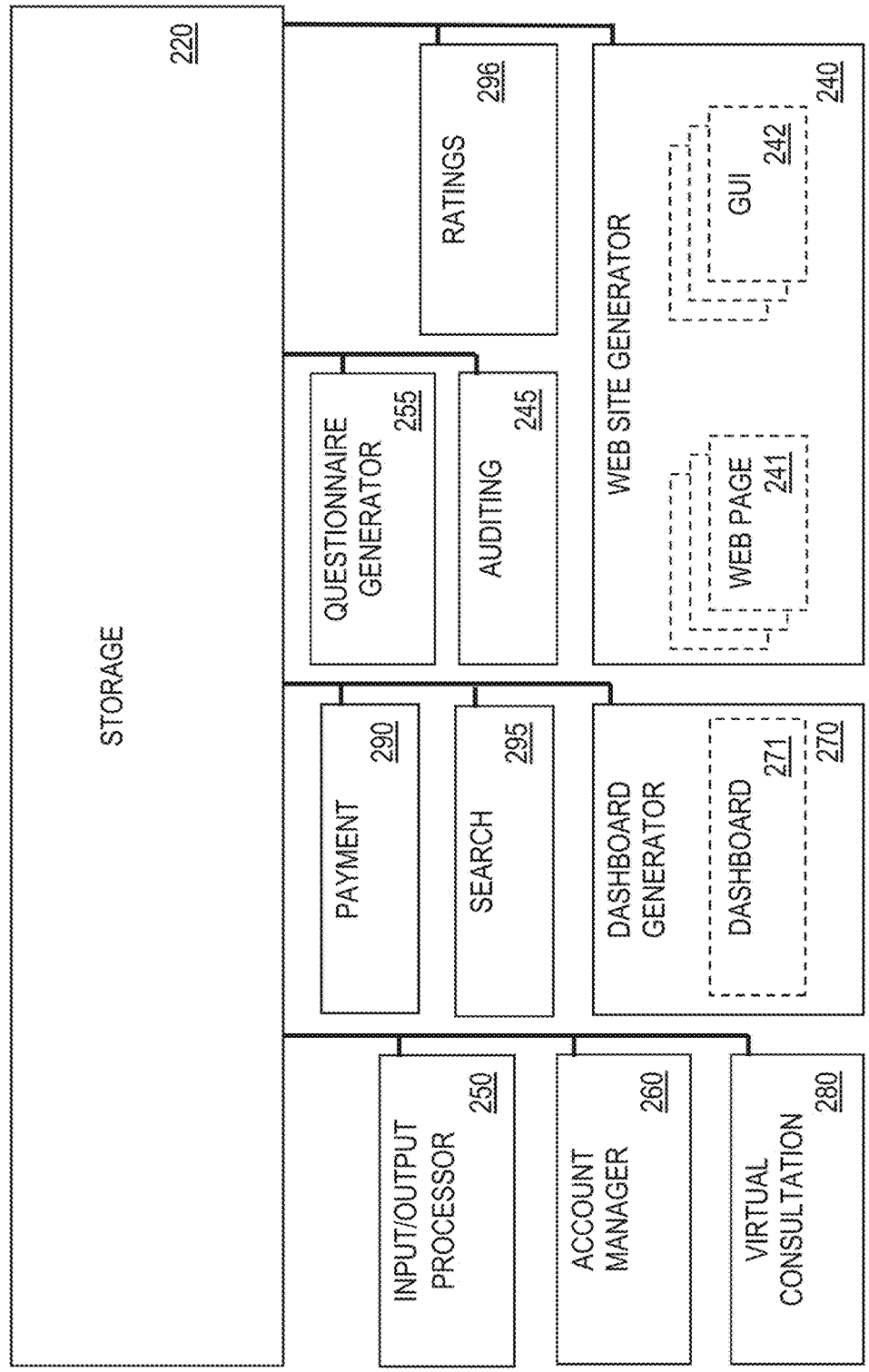
FIG. 2 illustrates the system 200 in detail, in accordance with an embodiment.

FIG. 2 illustrates the system 200 in detail, in accordance with an embodiment. As stated above, one or more applications 215 (FIG. 1) may execute/operate on the server devices 210 (FIG. 1) to provide the attributes of the web site 100 (FIG. 1). In one embodiment, the applications 215 comprise a web site generator 240 configured to generate a collection of web pages 241 and a collection of graphical user interfaces (GUIs) 242 for the web site 100. A web page 241 may be embedded with one or more GUIs 242. A GUI 242 may comprise one or more GUI components that a user 50 (FIG. 1) may interact with (e.g., an input field for receiving input, such as a text field, a checkbox field, a radio button field, a select field, a file field, etc.). Examples of different GUIs 242 generated by the web site generator 240 are described in detail later herein. Each GUI 242 may be presented to a user 50 by an application 310 (e.g., a mobile application or a web browser) on an electronic device 300 (FIG. 1) of the user 50.

In one embodiment, the applications 215 comprise an input/output (I/O) processor 250 configured to receive input from, and send output to, a user 50. The I/O processor 250 may receive different types of input. The different types of input may comprise, but are not limited to, at least one of the following: a request to register a new online account for the web site 100, a request to login/sign in to an existing online account for the web site 100, a user interaction with a GUI component included in a GUI 242 (e.g., a user response/selection collected via an input field included in a GUI 242), and a document uploaded by a user 50 (e.g., an image file, a text file, an audio file, a video file, etc.).

In one embodiment, a web page 241 and/or GUI 242 is dynamically generated based in part on input received from a user 50.

The I/O processor 250 may send different types of output. The different types of output may comprise, but are not limited to, at least one of the following: a communication indicative of a status of a professional service, a communication indicative of one or more results of an audit, and a communication exchanged between two or more users 50. In one embodiment, the I/O processor 250 supports different electronic delivery methods. The electronic delivery methods may comprise, but are not limited to, at least one of the following: an e-mail, a short messaging service (SMS), a message, a text, a document file, and a notification (e.g., a push or pull notification retrieved by the application 310). In one embodiment, an electronic delivery method selected for sending a communication to a user 50 is based on communication preferences of the user 50 and/or urgency of the communication.

In one embodiment, in response to receiving/sending a communication, a user 50 may delay or set a reminder for a follow-up action. The user 50 may report whether the follow-up action was performed through a number of communication methods, including a direct response to the communications.

In one embodiment, the applications 215 comprise a questionnaire generator 255 configured to generate a questionnaire for a client user 400. Specifically, in response to a request from a client user 400 for a professional service, the questionnaire generator 255 generates a customized questionnaire comprising one or more questions selected from one or more question banks 232 (FIG. 3) maintained on the storage devices 220. The questions of the questionnaire are relevant to the professional service requested. The questionnaire is presented to the client user 400. The questionnaire simplifies the process of gathering information necessary for performance of the professional service requested. Specifically, the questionnaire enables the client user 400 to flow through an engaging and intuitive flow of steps that collects, from the client user 400, information necessary for performance of the professional service requested.

In one embodiment, the questionnaire adapts based on user responses from the client user 400. The questionnaire is a pre-aligned architecture/hierarchy of questions that self-populates with additional questions dynamically selected from the question banks 232 based on user responses from the client 400. Specifically, subsequent/additional questions are selected for inclusion in the questionnaire based on user responses from the client user 400 to earlier questions of the questionnaire. By customizing subsequent questions based on earlier user responses from the client user 400, the client user 400 need not struggle with determining subsequent questions he/she must respond to, thereby saving the client user 400 time and effort.

In one embodiment, a user 50 may upload, to the website 100, information necessary for performance of the professional service requested, such as image data (e.g., a photo of a legal document, a photo of an electronic check or a credit card for use in payment of fees, etc.), audio data (e.g., a voice recording), and/or video data (e.g., a video recording). The user 50 may upload information at various points of the process of submitting a request for a professional service, such as while completing a questionnaire, during a virtual consultation, etc. For example, via an application 310 on an electronic device 300, the user 50 may select a previously created file (e.g., a file comprising image data, audio data, and/or video data) stored on the electronic device 300, and upload the file selected to the website 100. The uploaded file may be used to populate a questionnaire or may be viewable by another user 50 during a virtual consultation.

In one embodiment, a user 50 may utilize one or more sensors (e.g., a camera, a microphone, etc.) of the electronic device 300 to simply capture real-time image data, audio data, and/or video data, and directly upload the real-time data captured to the website 100. For example, the user 50 may take/capture a photo in real-time, and upload the photo captured directly into the website 100. The uploaded photo may be used to populate a questionnaire or may be viewable by another user 50 immediately and in real time during a virtual consultation. Providing the user 50 with the ability to capture and directly upload real-time audio and video data to the web site 100 saves the user 50 time and effort and allows real time creation and implementation of professional information and work.

For example, instead of manually scanning a legal document and then later uploading the scanned and stored legal document to the web site 100, the user 50 may utilize his/her electronic device 300 to simply capture and directly upload a photo of the legal document for immediate use and access instead. This way a user 50 can directly populate a questionnaire with an immediately taken photo based on the questions posed instead of determining the questions that will be asked in advance, gathering materials, taking photos and storing them and once all that work is created, then first beginning the questionnaire. Instead, the user 50 can go through the questionnaire and populate it in real time with minimal preparation.

Further, the ability to capture and directly upload real-time data reduces or eliminates data tampering/manipulation, thereby ensuring credibility/integrity of important documents (e.g., opinion letters, litigation matters, etc.) for other aspects of professional communications. For example, an embodiment would allow for a remote deponent to provided real-time, verified deposition testimony, including the introduction verified documentary or other evidence and for a remote lawyer to provide a limited scope representation of the deponent or to take the deponents testimony.

In one embodiment, the applications 215 comprise an account manager 260 configured to create and manage an online account for the web site 100. For example, in response to receiving a request from a user 50 to register a new online account for the web site 100, the account manager 260 creates/sets up the new online account based on input provided by the user 50. As another example, in response to receiving a request from a user 50 to login/sign in to an existing online account for the web site 100, the account manager 260 verifies login/sign in information (e.g., a username/e-mail address and a password) provided by the user 50 against authentication credentials maintained on the storage devices 220 for the online account, and authorizes the user 50 to access the online account upon successful verification. As another example, the account manager 260 updates account information for an online account for the web site 100 based in part on input received from a user 50 associated with the online account.

In one embodiment, the accounts manager 260 enables a client user 400 to create a corporate account for use in payment of service fees for a professional service requested by the client user 400. Any future professional service requested by the client user 400 may be directly billed to the corporate account.

In one embodiment, the applications 215 comprise a dashboard generator 270 configured to generate a dashboard 271 for an online account for the web site 100. The dashboard 271 is a tool that facilitates user review and user management of an online account. Examples of different dashboards 271 generated by the dashboard generator 270 are described in detail later herein.

In one embodiment, the applications 215 comprise a virtual consultation unit 280 configured to facilitate a client user 400 with scheduling a live, virtual consultation with a service representative user 500 for a pre-determined amount of time. The client user 400 may manage costs associated with the virtual consultation by controlling a duration of the virtual consultation (e.g., specifying a pre-determined amount of time to set as the length of time of the virtual consultation).

In one embodiment, the applications 215 comprise a payment unit 290 configured to facilitate a client user 400 with payment of fees for a professional service requested by the client user 400. In one embodiment, the payment unit 290 supports different payment mechanisms. The different payment mechanisms may comprise, but are not limited to, at least one of the following: an instant payment mechanism, a recurring payment mechanism (e.g., auto-pay), and a pre-set credit or other type of accounting system that tracks payment options for a client user 400.

In one embodiment, the payment unit 290 may communicate/interface with different payment gateways 190 (FIG. 1). The different payment gateways 190 may comprise, but are not limited to, at least one of the following: the Automated Clearing House (ACH) (e.g., for electronic check payments, credit payments, and debit payments), a world-wide online payment system (e.g., PayPal, etc.), and a mobile payment and digital wallet service (e.g., Apple Pay, Square, etc.).

In one embodiment, the payment unit 290 records each payment of fees for a professional service requested by a client user 400. Each payment is recorded as a time-stamped payment transaction record on the storage devices 220. As described in detail later herein, a client user 400 may utilize a dashboard 271 for an online account that he/she is associated with to view prior payments that he/she has made in connection with the online account.

In one embodiment, all payments made are non-refundable. If a client user 400 has pre-paid for a virtual consultation but concludes the virtual consultation before the pre-determined amount of time paid has run out, the web site 100 may provide a credit to the client user 400 for the unused amount of time remaining.

In one embodiment, the applications 215 comprise an auditing unit 245 configured to facilitate an audit of information from a client user 400. As stated above, the system 200 presents to a client user 400 a questionnaire comprising one or more questions for collecting information necessary for performance of a professional service requested by the client user 400. The I/O processor 250 collects one or more user responses from the client user 400 while the client user 400 is completing the questionnaire. When the client user 400 has completed the questionnaire and made a payment of fees for the professional service requested, the I/O processor 250 forwards user responses to the completed questionnaire to the auditing unit 245. In response to receiving the user responses, the auditing unit 245 initiates an audit of the user responses.

The audit of the user responses may be performed automatically or manually. To perform the audit automatically, the auditing unit 245 invokes artificial intelligence (AI) software to review the user responses. In one embodiment, the auditing unit 245 comprises AI software. In another embodiment, the auditing unit 245 may interface/communicate with third-party AI software. To perform the audit manually, the auditing unit 245 forwards the user responses to at least one service representative user 500 for review.

During the audit, the service representative user 500 and/or the AI software determines whether the user responses satisfy one or more pre-specified conditions/requirements. The pre-specified conditions/requirements may comprise one or more conditions/requirements relevant to the professional service requested.

Upon completion of the review, the auditing unit 245 forwards, to the client user 400, a communication indicative of one or more results of the audit. In one embodiment, if the user responses satisfy the pre-specified conditions/requirements, the auditing unit 245 generates, based on the user responses, a confirmation document comprising all relevant information necessary for performance of the professional service requested. The confirmation document may be reviewed by the service representative user 500 before it is forwarded to the client user 400 for approval.

If the user responses do not satisfy the pre-specified conditions/requirements, one or more suggested changes to the user responses are returned to the client user 400. The client user 400 may be prompted to revise the user responses based on the suggested changes. The suggested changes may comprise an edit/correction suggested by the service representative user 500 and/or the AI software. In one embodiment, the web site generator 240 is configured to provide a suggested change as a tooltip, an infotip, a hint, or another GUI element that appears within proximity of a user response that the suggested change is applicable to. The client user 400 may correct an input field including the user response by selecting the suggested change; the input field is re-populated with the suggested change when the suggested change is selected.

In one embodiment, the audit is a multi-stage review process (e.g., a two-stage review process). For example, a first/initial review of the user responses is performed by AI software, and one or more subsequent reviews of the user responses are performed by one or more service representative users 500. The user responses may be reviewed by different service representative users 500. For example, a first service representative user 500 may perform a review of the user responses, and a second service representative user 500 may perform a subsequent review of the user responses. The first service representative user 500 may be a subordinate of or provide support to the second service representative user 500.

For example, if the professional service requested comprises a legal service, the user responses may be reviewed by a legal team. Specifically, a first/initial review of the user responses may be performed by support staff for an attorney (e.g., a paralegal), and a second review of the user responses may be performed by the attorney.

In one embodiment, the applications 215 comprise a search unit 295 configured to query and retrieve information of relevance/interest to a client user 400 from one or more data sources. The data sources queried may comprise a database 225 (FIG. 1) maintained on the storage devices 220 and/or a third-party data source 120 (FIG. 1). The search unit 295 may communicate/interface with different third-party data sources 120. For example, the search unit 295 may interface with an application programming interface (API) of an online database maintained by a third-party.

In one embodiment, the applications 215 comprise a ratings unit 296 configured to collect a rating and/or a review from a user 50. The web site 100 may prompt a client user 400 for a rating and/or a review indicative of client satisfaction with performance and/or experience of a service representative user 500 who performed a professional service requested by the client user 400. The web site 100 may also prompt a service representative user 500 for a rating and/or a review indicative of ease of interaction/engagement with a client user 400 the service representative user 500 performed a professional service for.

Figure 3:
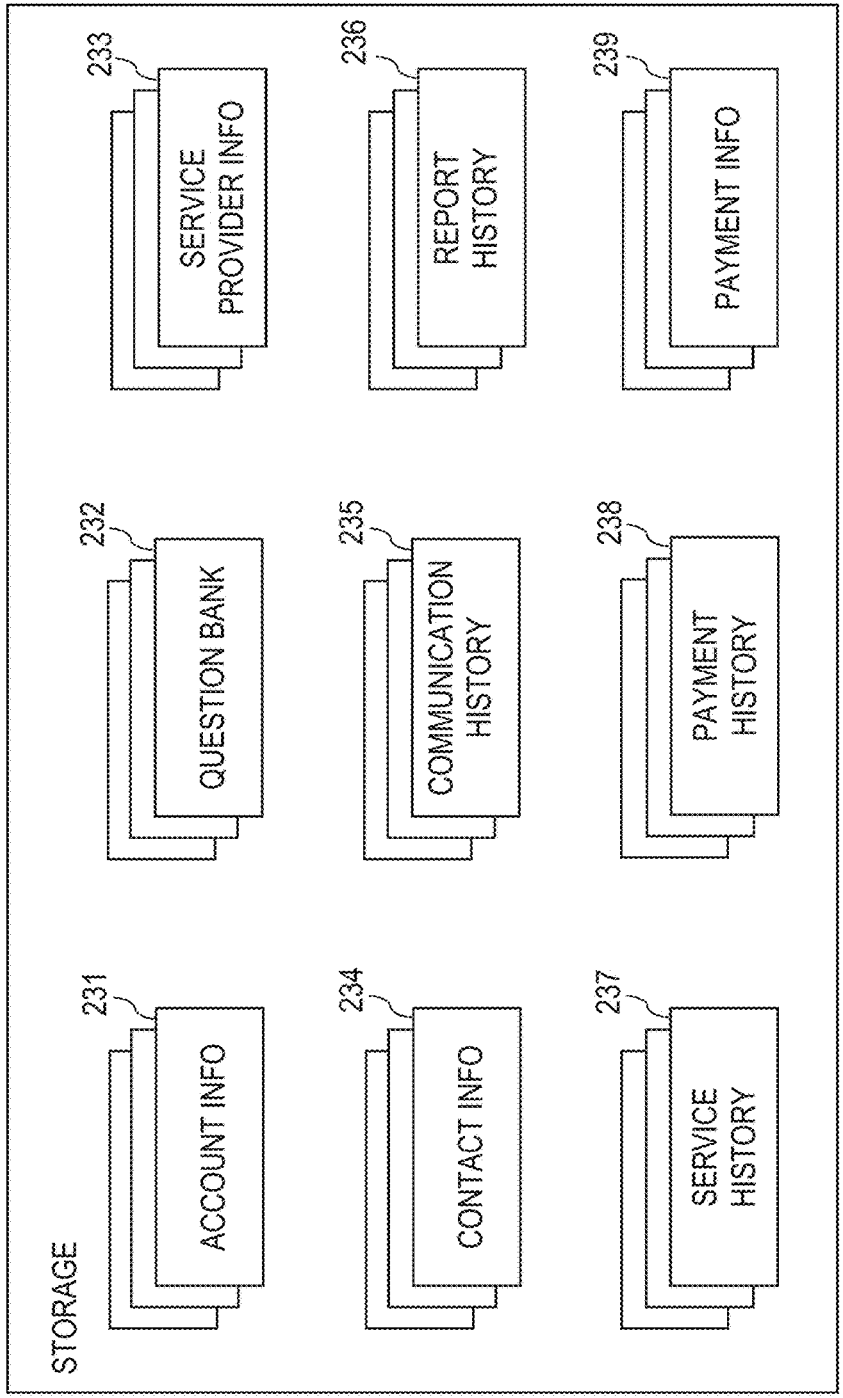
FIG. 3 illustrates the storage devices 220 in detail, in accordance with an embodiment.

FIG. 3 illustrates the storage devices 220 in detail, in accordance with an embodiment. As stated above, the storage devices 220 (FIG. 1) may maintain one or more databases 225 (FIG. 1). In one embodiment, the databases 225 comprise a set of databases 231 maintaining account information for at least one online account for the web site 100 (FIG. 1). Each database 231 corresponds to a particular online account for the web site 100. Each database 231 maintains account information for a corresponding online account. In one embodiment, the account information may comprise, but is not limited to, at least one of the following: authentication credentials for the online account (e.g., a username/e-mail address and a password), user information of a user 50 (FIG. 1) associated with the online account (e.g., full name, etc.), and user preferences of the user 50 (e.g., preferred account settings, etc.).

In one embodiment, the databases 225 comprise a set of databases 232 maintaining at least one question bank. Each database 232 corresponds to a particular professional service offered by the web site 100. Each database 232 comprises a question bank for a corresponding professional service. In one embodiment, the question bank may comprise, but is not limited to, one or more questions for collecting information necessary for performance of the corresponding professional service.

In one embodiment, the databases 225 comprise a set of databases 233 maintaining service provider information for one or more service providers. Each database 233 corresponds to a particular service provider offering one or more professional services via the web site 100. Each database 233 maintains service provider information for a corresponding service provider. In one embodiment, the service provider information may comprise, but is not limited to, at least one of the following: contact information for the corresponding service provider (e.g., business address, etc.), fee information comprising at least one cost structure including pre-determined rates for a professional service offered by the service provider, and user information of each service representative user 500 associated with the service provider (e.g., full name, contact information such as e-mail address, availability for virtual consultations, etc.).

In one embodiment, the databases 225 comprise a set of databases 234 maintaining contact information for one or more users 50. Each database 234 corresponds to a particular user 50. Each database 234 maintains contact information for a corresponding user 50. In one embodiment, the contact information may comprise, but is not limited to, at least one of the following: one or more e-mail addresses of the user 50 (e.g., personal e-mail address, business e-mail address, etc.), one or more telephone numbers of the user 50 (e.g., home phone number, office phone number, mobile phone number, etc), one or more addresses of the user 50 (e.g., home address, business address, web site address, etc.), and contact preferences of the user 50 (e.g., preferred e-mail address, etc.).

In one embodiment, the databases 225 comprise a set of databases 235 maintaining communication history for one or more online accounts for the web site 100. Each database 235 corresponds to a particular online account for the web site 100. Each database 235 maintains communication history for a corresponding online account. In one embodiment, the communication history may comprise, but is not limited to, at least one of the following: one or more status updates indicative of changes in status for one or more professional services requested by/assigned to a user 50 (e.g., a client user 400 or a service representative user 500) associated with the corresponding online account, and one or more communications exchanged between the user 50 and another user 50 (e.g., a transcript of a chat between a client user 400 and a service representative user 500 assigned to perform a professional service requested by the client user 400).

In one embodiment, the databases 225 comprise a set of databases 236 maintaining report history for one or more online accounts for the web site 100. Each database 236 corresponds to a particular online account for the web site 100. Each database 236 maintains report history for a corresponding online account. In one embodiment, the report history may comprise, but is not limited to, one or more time-stamped reports for one or more professional services requested by/assigned to a user 50 (e.g., a client user 400 or a service representative user 500) associated with the corresponding online account. Each time-stamped report for each professional service may comprise, but is not limited to, at least one of the following: information necessary for performance of the professional service, one or more changes (e.g., corrections, edits, etc.) to the information, and an identity of a user 50 responsible for the changes.

In one embodiment, the databases 225 comprise a set of databases 237 maintaining service history for one or more online accounts for the web site 100. Each database 237 corresponds to a particular online account for the web site 100. Each database 237 maintains service history for a corresponding online account. In one embodiment, the service history may comprise, but is not limited to, one or more data records for one or more professional services requested by/assigned to a user 50 (e.g., a client user 400 or a service representative user 500) associated with the corresponding online account. Each data record for each professional service may comprise, but is not limited to, status history information indicative of one or more status updates for the professional service, and one or more documents prepared for the professional service.

In one embodiment, the databases 225 comprise a set of databases 238 maintaining payment history for one or more online accounts for the web site 100. Each database 238 corresponds to a particular online account for the web site 100. Each database 238 maintains payment history for a corresponding online account. In one embodiment, the payment history may comprise, but is not limited to, one or more time-stamped payment transaction records for one or more professional services requested by/assigned to a user 50 associated with the corresponding online account. Each time-stamped payment transaction record for each professional service may comprise, but is not limited to, at least one of the following: total amount of fees for the professional service, and payment information indicative of a payment method utilized to pay the total amount of fees.

In one embodiment, the databases 225 comprise a set of databases 239 maintaining payment information for one or more online accounts for the web site 100. Each database 239 corresponds to a particular online account for the web site 100. Each database 239 maintains payment information for a corresponding online account. In one embodiment, the payment information for the corresponding online account may comprise, but is not limited to, at least one of the following: one or more payment methods previously utilized by a client user 400 associated with the online account (e.g., credit card information, bank account information, etc.), and payment preferences of the client user 400 (e.g., preferred payment method, etc.).

Figure 4A:
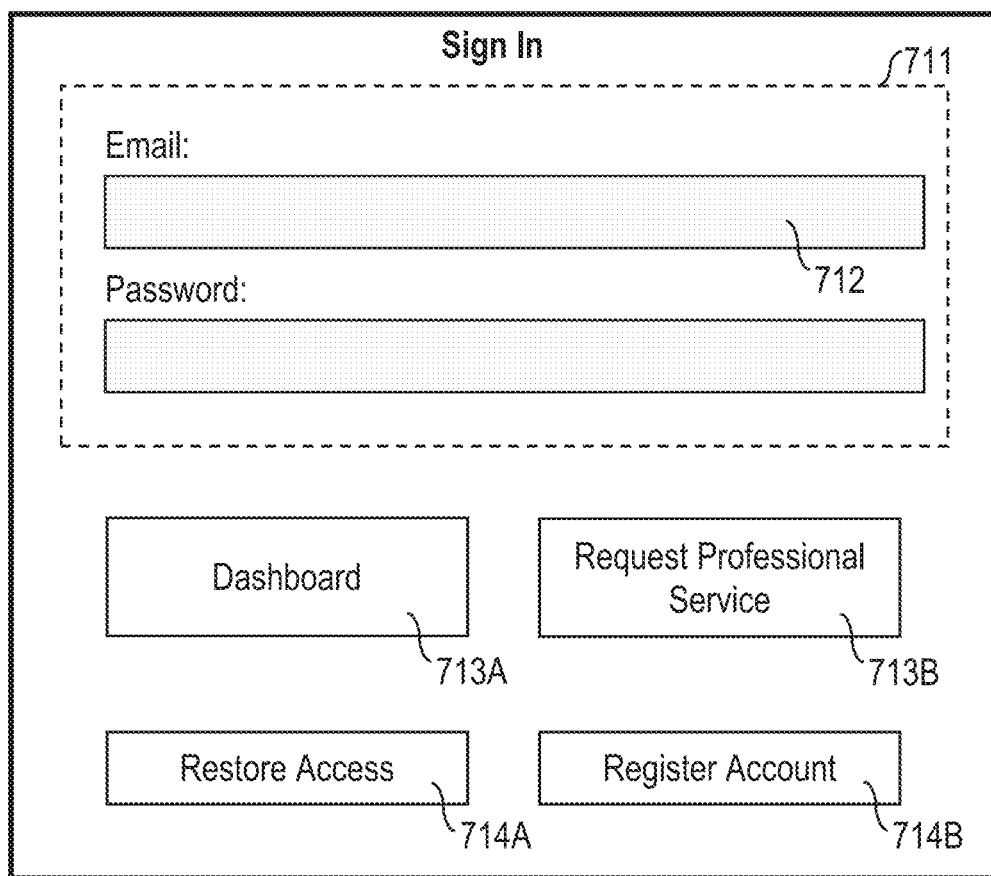
FIG. 4A illustrates an example sign in graphical user interface (GUI) 710, in accordance with an embodiment.

FIG. 4A illustrates an example sign in GUI 710, in accordance with an embodiment. As stated above, a user 50 (FIG. 1) may interact with the web site 100 (FIG. 1) via an application 310 (e.g., a mobile application or a web browser) on an electronic device 300 (FIG. 1). In response to a request from the user 50 to login/sign in to an existing online account for the web site 100, the web site generator 240 (FIG. 2) generates a sign in GUI 710 for display on the electronic device 300.

In one embodiment, the sign in GUI 710 comprises a sub-area 711 for collecting login information for the online account from the user 50. The login information comprises, but is not limited to, authentication credentials (e.g., a username/e-mail address and a password) for the online account. For example, as shown in FIG. 4A, the sign in GUI 710 comprises multiple input fields 712 for receiving the login information from the user 50.

The account manager 260 (FIG. 2) verifies the login information against authentication credentials maintained on a database 231 (FIG. 3) corresponding to the online account. In one embodiment, upon successful verification of the login information, the user 50 is directed to a dashboard 271 (FIG. 2) for the online account. In another embodiment, upon successful verification of the login information, the user 50 is directed to a GUI listing different functionalities offered by the web site 100.

In yet another embodiment, upon successful verification of the login information, the user 50 is directed to a GUI providing a functionality selected by the user 50 during sign in. For example, as shown in FIG. 4A, the sign in GUI 710 comprises a selectable GUI component 713A for accessing a dashboard 271 for the online account and a selectable GUI component 713B for initiating a request for a professional service. If the user 50 selects the GUI component 713A during sign in, the user 50 is directed to a GUI including a dashboard 271 for the online account. If the user 50 selects the GUI component 713B during sign in, the user 50 is directed to a GUI (e.g., GUI 720 in FIG. 7) for initiating a request for a professional service.

In one embodiment, the GUI components 713A and 713B are disabled (e.g., greyed out) until the user 50 has populated each input field 712 of the sub-area 711 with the login information.

The user 50 may not remember the login information for the online account. In one embodiment, the sign in GUI 710 comprises a selectable GUI component 714A the user 50 may select to initiate a request to recover or reset authentication credentials for the online account.

The user 50 may not have an existing online account for the web site 100. In one embodiment, the sign in GUI 710 comprises a selectable GUI component 714B the user 50 may select to initiate a request to register a new online account for the web site 100.

Figure 4B:
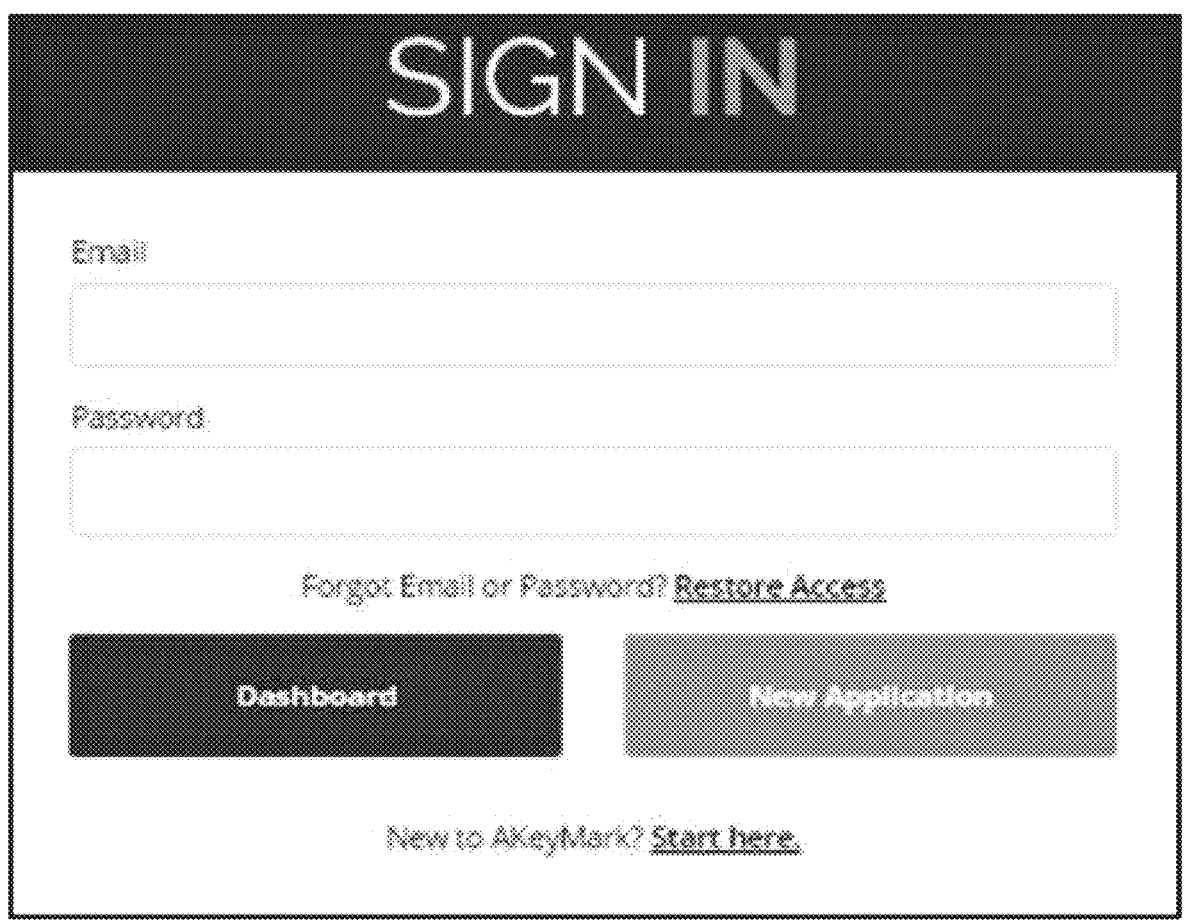
FIG. 4B illustrates another example sign in GUI 715, in accordance with an embodiment.

FIG. 4B illustrates another example sign in GUI 715, in accordance with an embodiment. In one embodiment, the web site 100 (FIG. 1) offers preparing and filing a trademark application for a desired mark with the USPTO as a professional service. As shown in FIG. 4B, the sign in GUI 715 comprises a selectable GUI component for initiating a request for preparing and filing a trademark application for a desired mark with the USPTO.

Figure 5A:
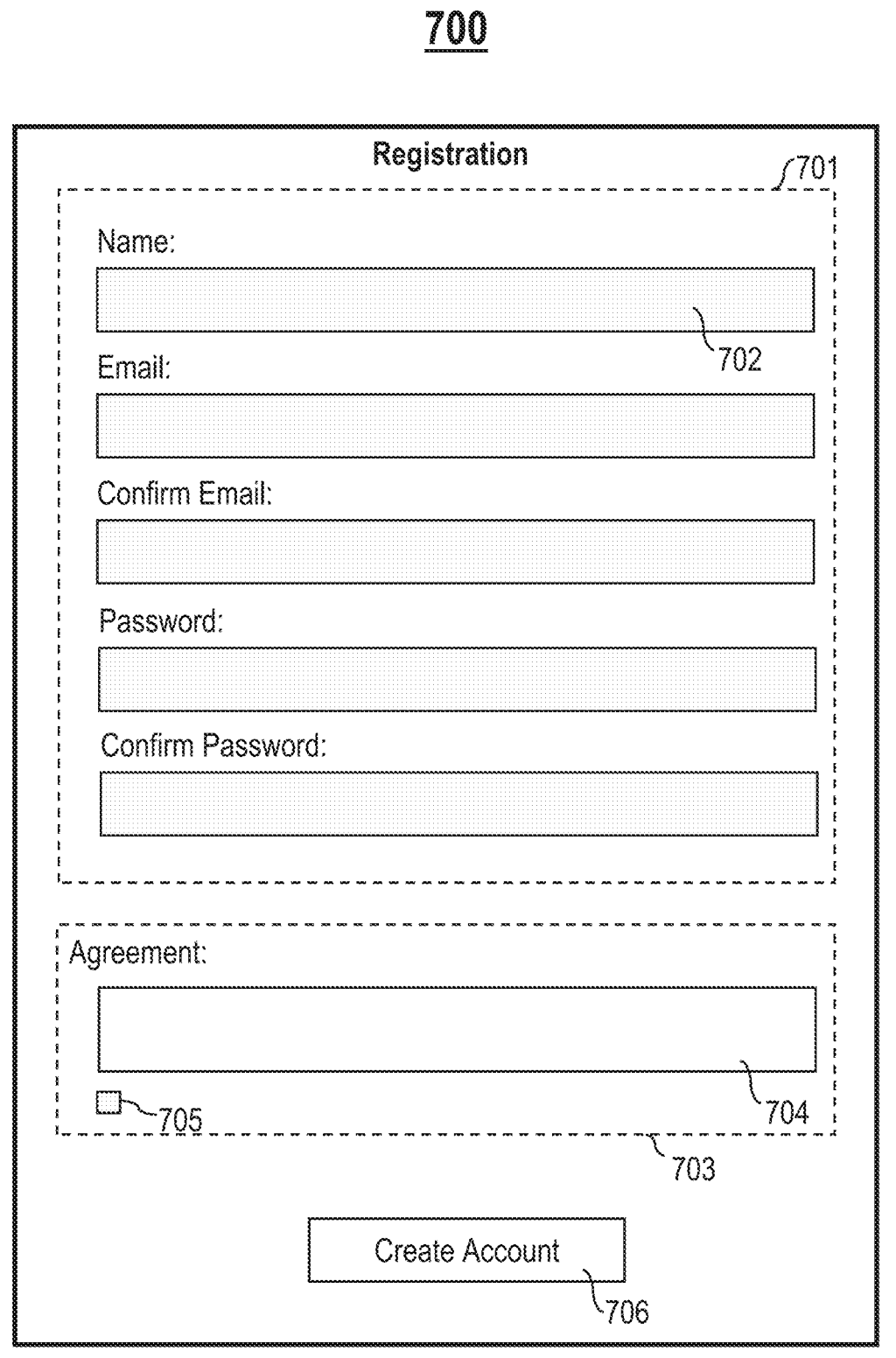

FIG. 5A illustrates an example registration GUI 700, in accordance with an embodiment. In response to a request from a user 50 (FIG. 1) to register a new online account for the web site 100 (FIG. 1), the web site generator 240 (FIG. 2) generates a registration GUI 700 for display on an electronic device 300 (FIG. 1) of the user 50.

In one embodiment, the registration GUI 700 comprises a sub-area 701 for collecting account information for the new online account from the user 50. The account information comprises, but is not limited to, at least one of the following: authentication credentials for the online account (e.g., a username/e-mail address and a password) and user information of the user 50 (e.g., full name, etc.). The account manager 260 (FIG. 2) creates/sets up the online account based on the account information. For example, as shown in FIG. 5A, the registration GUI 700 comprises multiple input fields 702 for receiving the account information from the user 50.

In one embodiment, the account manager 260 creates/sets up the new online account only after the user 50 has reviewed and accepted a user agreement. In one embodiment, the web site 100 requires user acceptance of the user agreement during registration of the online account. For example, as shown in FIG. 5A, the registration GUI 700 comprises a sub-area 703 displaying a click-wrap agreement 704 requiring the user 50 to click and accepts terms and conditions specified in the agreement (e.g., by clicking a checkbox field 705 stating "I accept the terms & conditions."). In another embodiment, the sub-area 703 comprises a selectable GUI component the user 50 may select to view a pop-up window displaying the click-wrap agreement 704.

In one embodiment, the terms and conditions specified in the user agreement may comprise, but are not limited to, at least one of the following: (1) license terms for using the web site 100 and/or an application 310 (FIG. 1) for accessing the web site 100, (2) terms of service governing user access to and use of services provided by the web site 100, and (3) terms for retaining professional services provided by a professional/service provider via the web site 100, including, but not limited to common terms which a trademark attorney would have a client agree to in a lawyer's Engagement Agreement such as an arbitration clause and client trust provisions.

Figure 7:
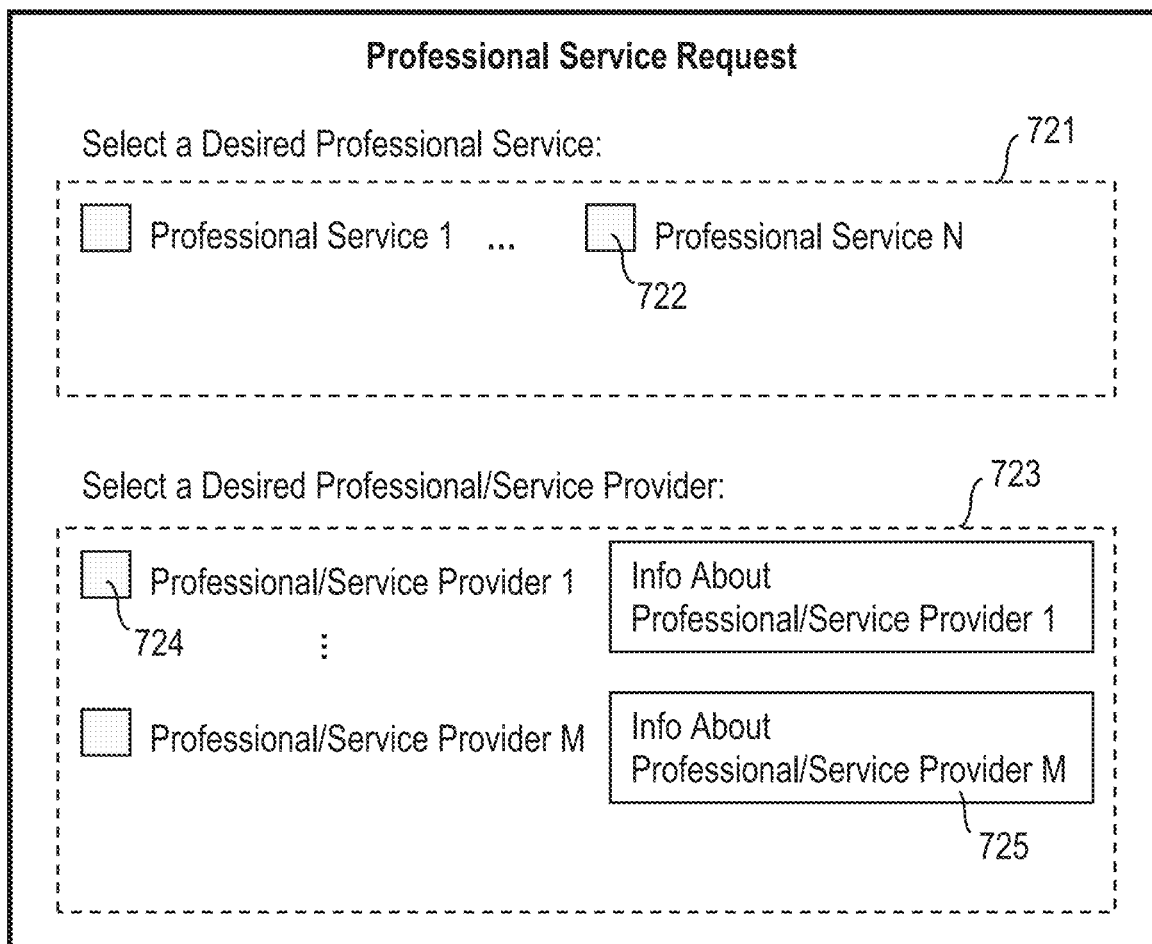
FIG. 7 illustrates an example request GUI 720, in accordance with an embodiment.

When the embodiment allows for multiple service representative users 500 or law firms, as shown in FIG. 7, the embodiment will allow for a common user agreement having similar terms and conditions used by multiple firms or for customized user agreements which may be stored for each service representative user 500 or Professional Service Provider 724, where the user chooses a specific service representative user 500 or Professional Service Provider 724 for their professional service firm.

Further, the click wrap Engagement Agreement can be automatically customized from pre-programmed clauses based upon the desired professional service which the User wishes to choose. In one embodiment, the click wrap Engagement Agreement is for a limited scope service such as only the filing of a trademark application. Further work, such as preparing office action responses can be excluded so that the User can control and budget the costs of the professional services they are authorizing.

For example, if the User wishes to file an Intent to Use trademark application, there may be service specific clauses and fees applicable just to that limited service of preparing an Intent to Use trademark application. Alternatively, if a User wishes to have the Professional Service Provider 724 prepare a trademark office action response, there may be service specific clauses and fees applicable just to that limited service of preparing a trademark office action response. Once the User selects the desired professional service 722 and the desired professional service provider 725, an embodiment of the invention can build a limited scope professional services engagement agreement tailored for those specific attributes. In one embodiment the professional service provider 725 has agreed to accept the engagement and the User can then agree to the terms and conditions and enter into a binding, customized legal agreement with the Professional Service Provider 725. In one embodiment the professional service provider 725 has reserved the right to approve the engagement, and the User's approval of the terms and conditions then requires the Professional Service Provider 725 a binding, customized legal agreement between the User and the Professional Service Provider 725

In one embodiment, the web site 100 requires user acceptance of the user agreement before a user 50 downloads, to his/her electronic device 300, an application 310 for accessing the web site 100.

In one embodiment, the registration GUI 700 comprises a selectable GUI component 706 the user 50 may select to submit the account information to the account manager 260 for processing. In one embodiment, the GUI component 706 is disabled (e.g., greyed out) until the user 50 has populated each input field 702 of the sub-area 701 with the account information and/or accepted the user agreement.

Figure 5B:
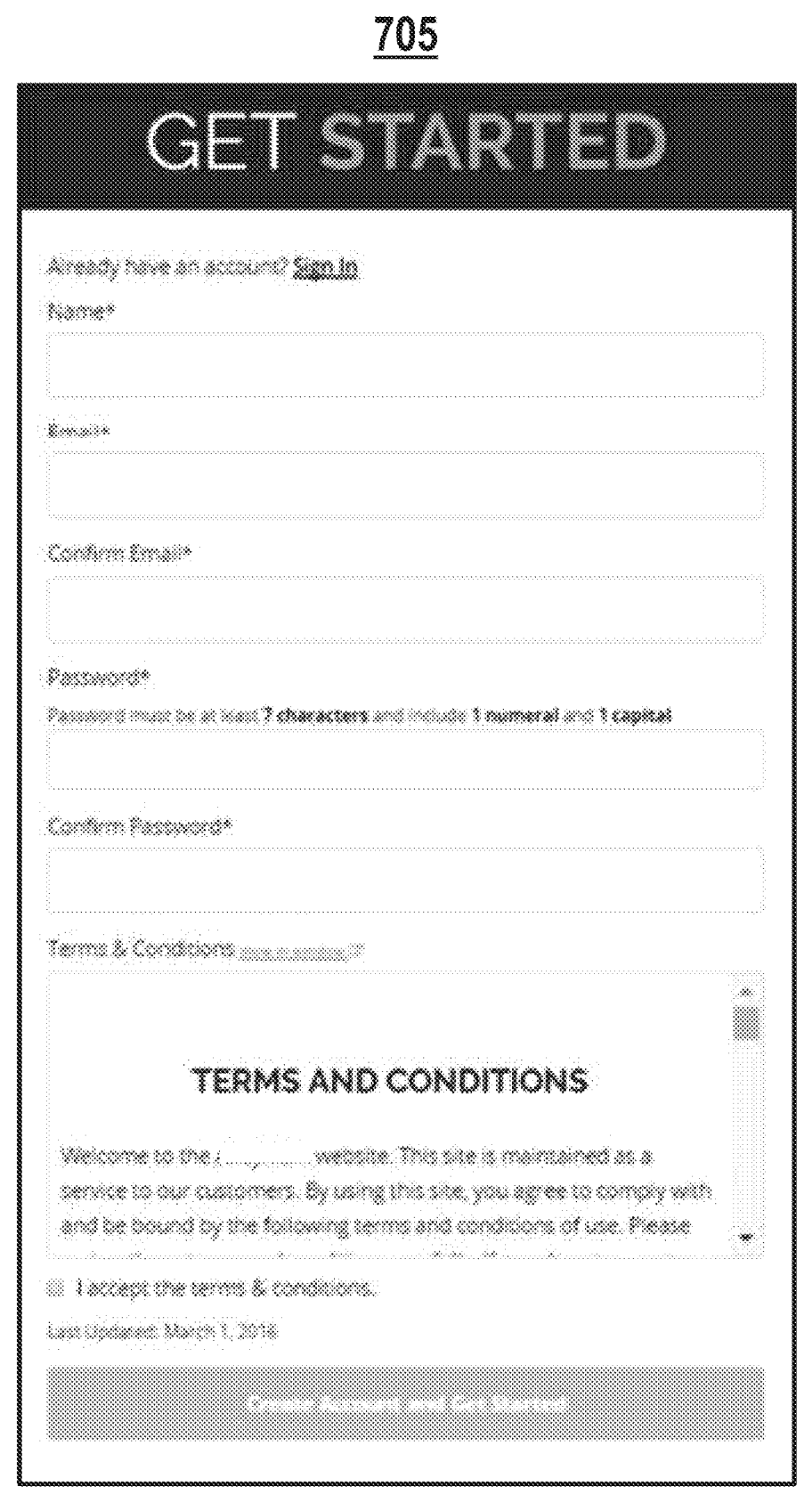

FIG. 5B illustrates another example registration GUI 705, in accordance with an embodiment. In one embodiment, the web site 100 (FIG. 1) offers preparing and filing a trademark application for a desired mark with the USPTO as a professional service. As shown in FIG. 5B, the registration GUI 705 comprises a selectable GUI component for creating a new online account and initiating a request for preparing and filing a trademark application for a desired mark with the USPTO.

Figure 6:
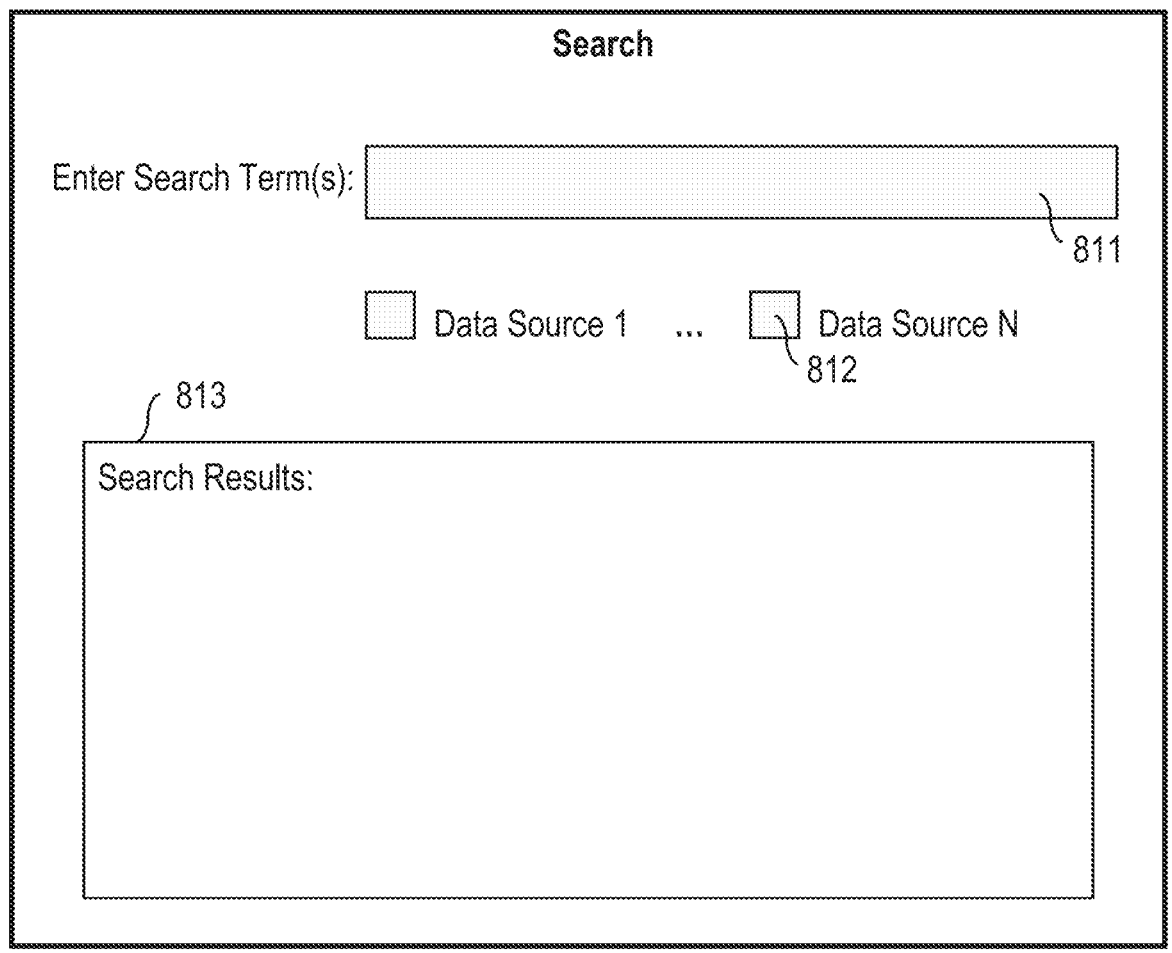
FIG. 6 illustrates an example search GUI 810, in accordance with an embodiment.

FIG. 6 illustrates an example search GUI 810, in accordance with an embodiment. In one embodiment, one of the functionalities offered by the web site 100 (FIG. 1) comprises an online search tool. The web site generator 240 (FIG. 2) is configured to generate a search GUI 810 for display on an electronic device 300 (FIG. 1) of a user 50 (FIG. 1). The search GUI 810 provides an online search tool the user 50 may use to perform an online search for information of relevance/interest.

In one embodiment, the search GUI 810 comprises an input field 811 for collecting one or more search terms/parameters from the user 50. The search GUI 810 may comprise one or more additional input fields 812 the user 50 may interact with to select one or more data sources to perform the online search on (e.g., a select field/checkbox corresponding to a third-party data source 120 (FIG. 1), another select field/checkbox corresponding to a database 225 (FIG. 1) maintained on the storage devices 220 (FIG. 1), etc.). The search unit 295 (FIG. 2) queries the data sources selected based on the search terms/parameters entered by the user 50. The search GUI 810 comprises a sub-area 813 for displaying one or more search/query results obtained/retrieved by the search unit 295.

In one embodiment, the web site 100 offers preparing and filing a trademark application for a desired mark with the USPTO as a professional service. The online search tool may comprise an online trademark search tool the user 50 may use to perform an online search for pending trademark applications and/or registered trademarks. The search unit 295 may be configured to query an online trademark database maintained by the USPTO and/or a trademark database (including a facsimile of trademark information) maintained on the storage devices 220.

In response to a request from a client user 400 (FIG. 1) to initiate a request for a professional service, the web site generator 240 generates a sequence of GUIs the client user 400 navigates through to submit the request. The sequence of GUIs the client user 400 may navigate through are described in detail below.

FIG. 7 illustrates an example request GUI 720, in accordance with an embodiment. In one embodiment, in response to a request from a client user 400 (FIG. 1) to initiate a request for a professional service, the web site generator 240 (FIG. 2) generates a request GUI 720 for display on an electronic device 300 (FIG. 1) of the client user 400.

In one embodiment, the request GUI 720 provides a list of professional services offered by the web site 100. For example, as shown in FIG. 7, the request GUI 720 comprises a sub-area 721 listing one or more professional services for selection. The sub-area 721 comprises one or more input fields 722 the client user 400 may interact with to select a professional service to request (e.g., a select field/checkbox corresponding to a professional service offered by the web site 100 (FIG. 1), another select field/checkbox corresponding to another professional service offered by the web site 100). One or more subsequent GUIs generated by the web site generator 240 may be based on the professional service requested.

In one embodiment, the request GUI 720 comprises a list of professionals/service providers available to perform professional services offered by the web site 100. For example, as shown in FIG. 7, the request GUI 720 comprises a sub-area 723 listing one or more professionals/service providers for selection. In one embodiment, the sub-area 723 is dynamically updated based on the professional service requested (e.g., only professionals/service providers available to perform the professional service requested are listed; other professionals/service providers are filtered out). The sub-area 723 comprises one or more input fields 724 the client user 400 may interact with to select a professional/service provider to perform the professional service requested (e.g., a select field/checkbox corresponding to a professional/service provider, another select field/checkbox corresponding to another professional/service provider).

In one embodiment, the sub-area 723 comprises, for each professional/service provider listed, a corresponding GUI element 725 displaying additional information for the professional/service provider (e.g., a rating and/or a ranking of the professional/service provider, experience level of the professional/service provider, etc.).

In one embodiment, the task of performing the professional service requested is tentatively assigned to the selected professional/service provider; the assignment is only confirmed upon approval of the selected professional/service provider. The selected professional/service provider is provided with request information relevant to the professional service requested (e.g., rating and/or ranking of the client user 400, etc.) to assist the selected professional/service provider with determining whether to approve or deny the assignment.

Figure 8A:
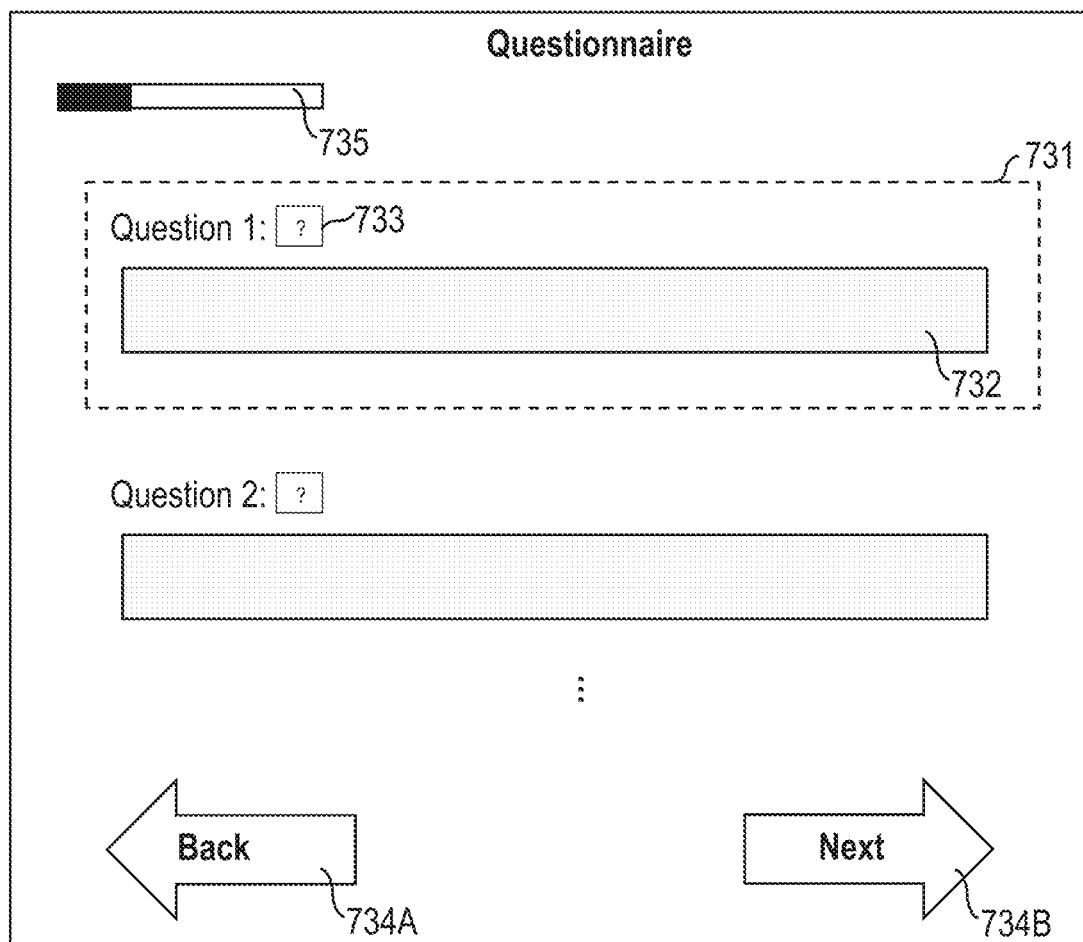
FIG. 8A illustrates an example questionnaire GUI 730, in accordance with an embodiment.
Figure 8B:
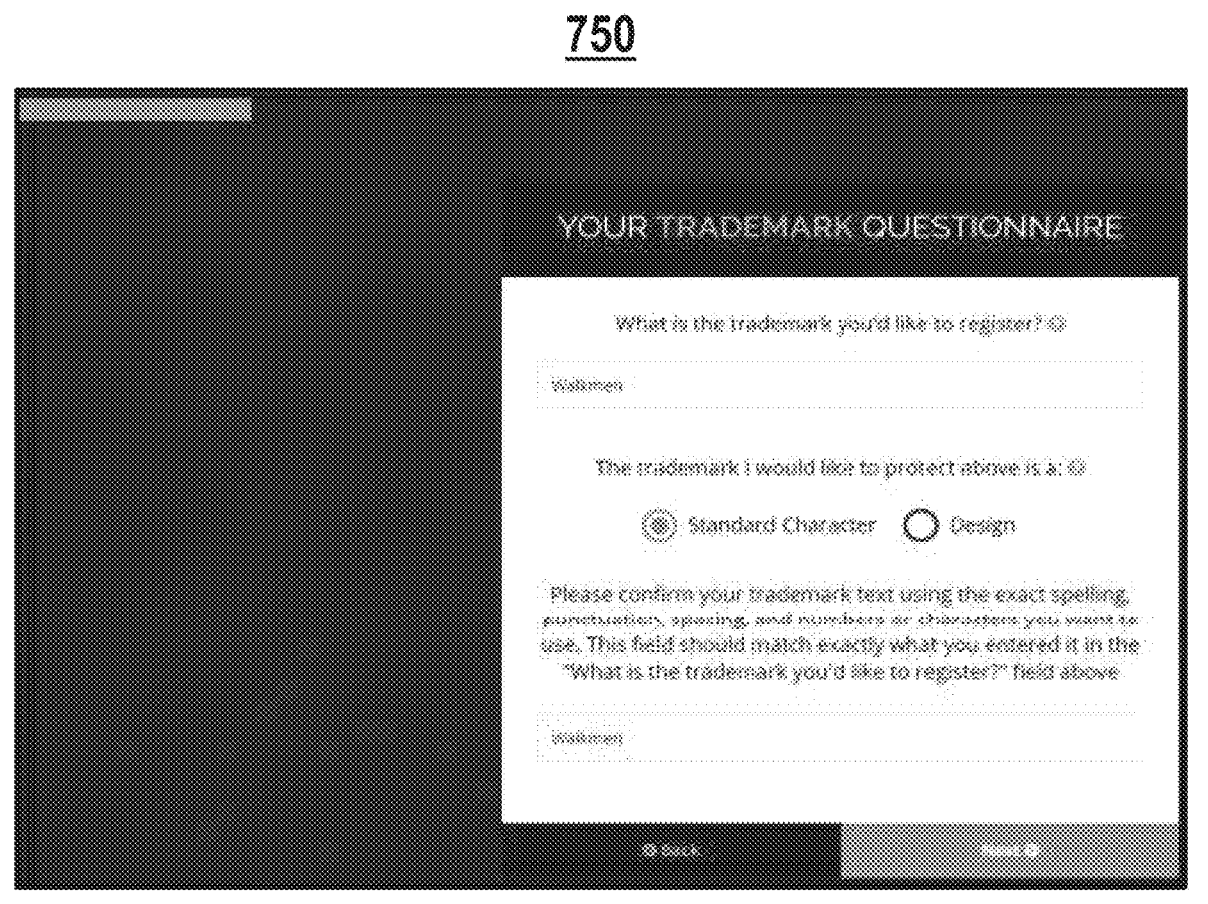
Figure 8C:
Figure 8E:
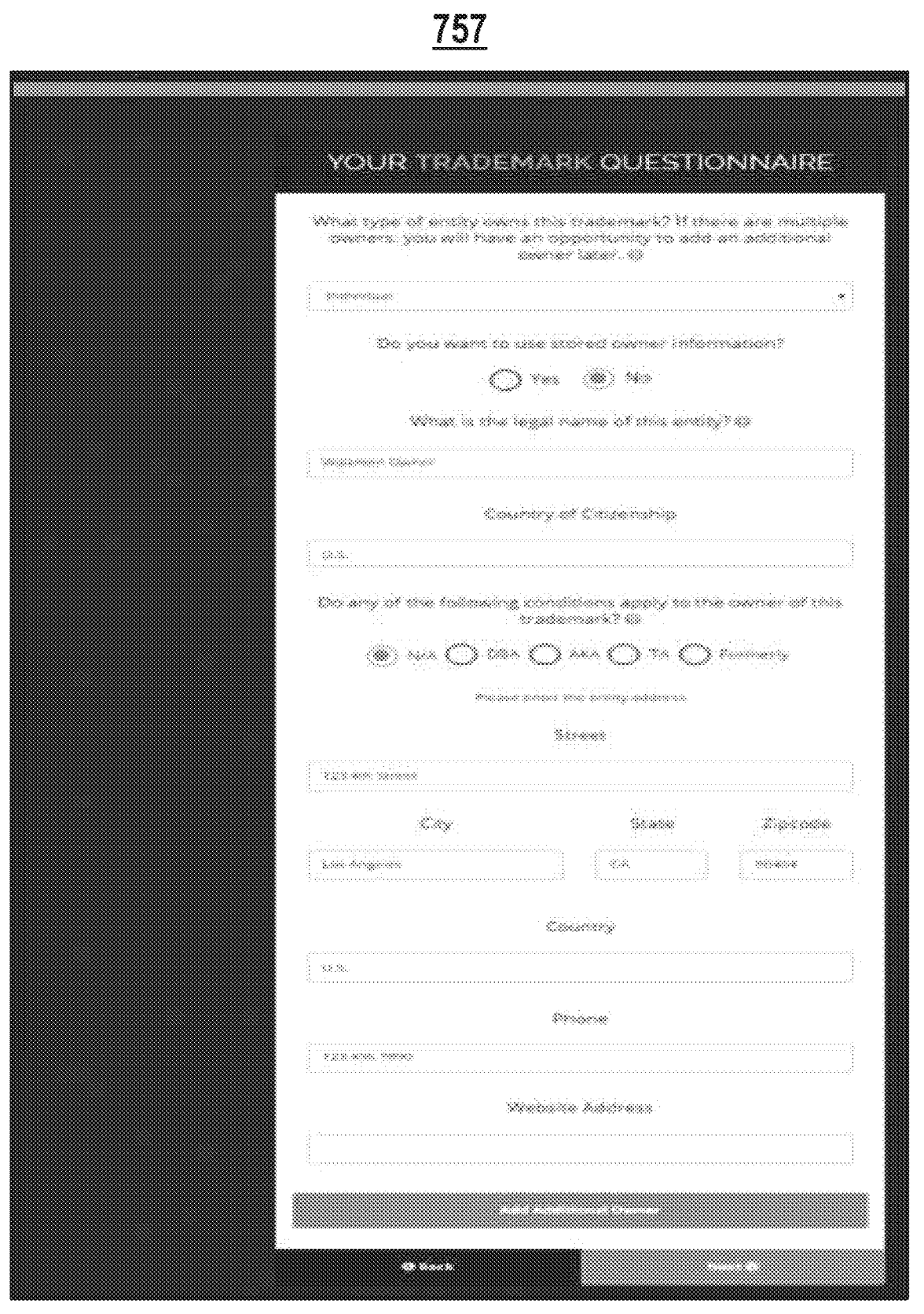
Figure 8F:
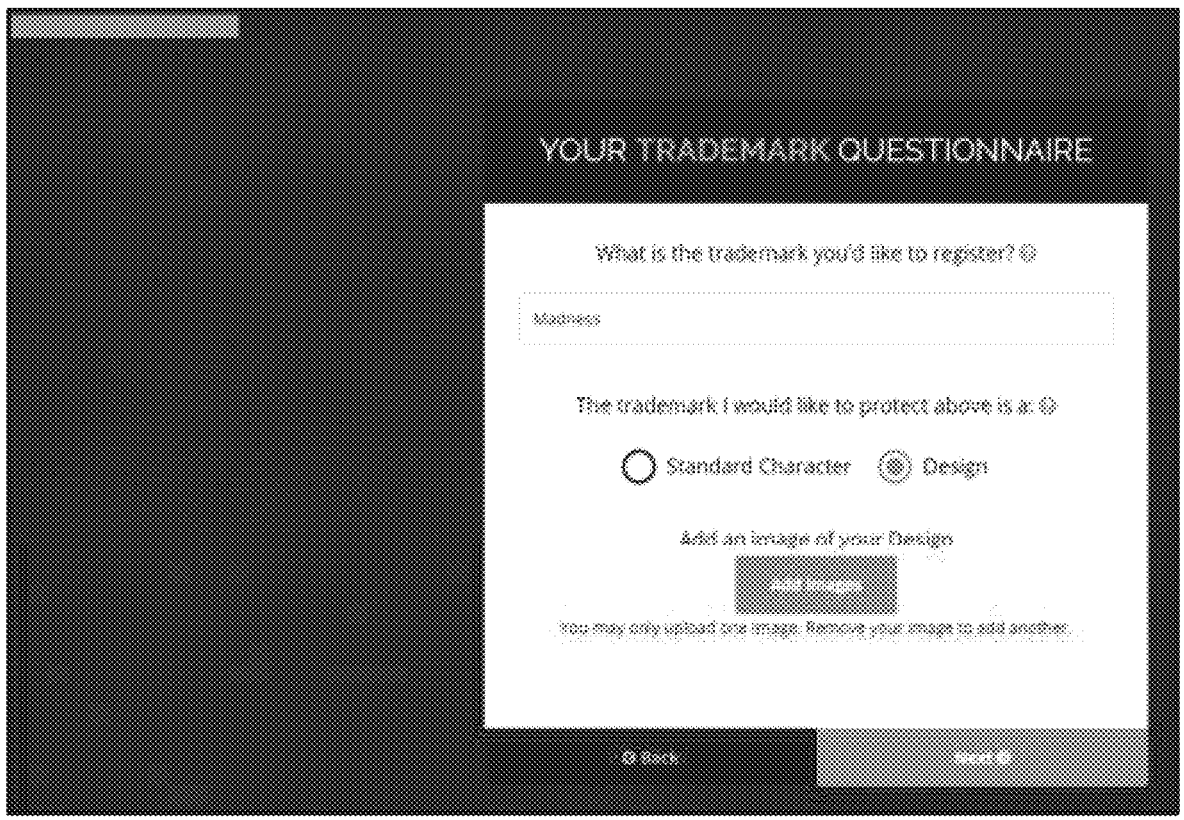
Figure 8G:
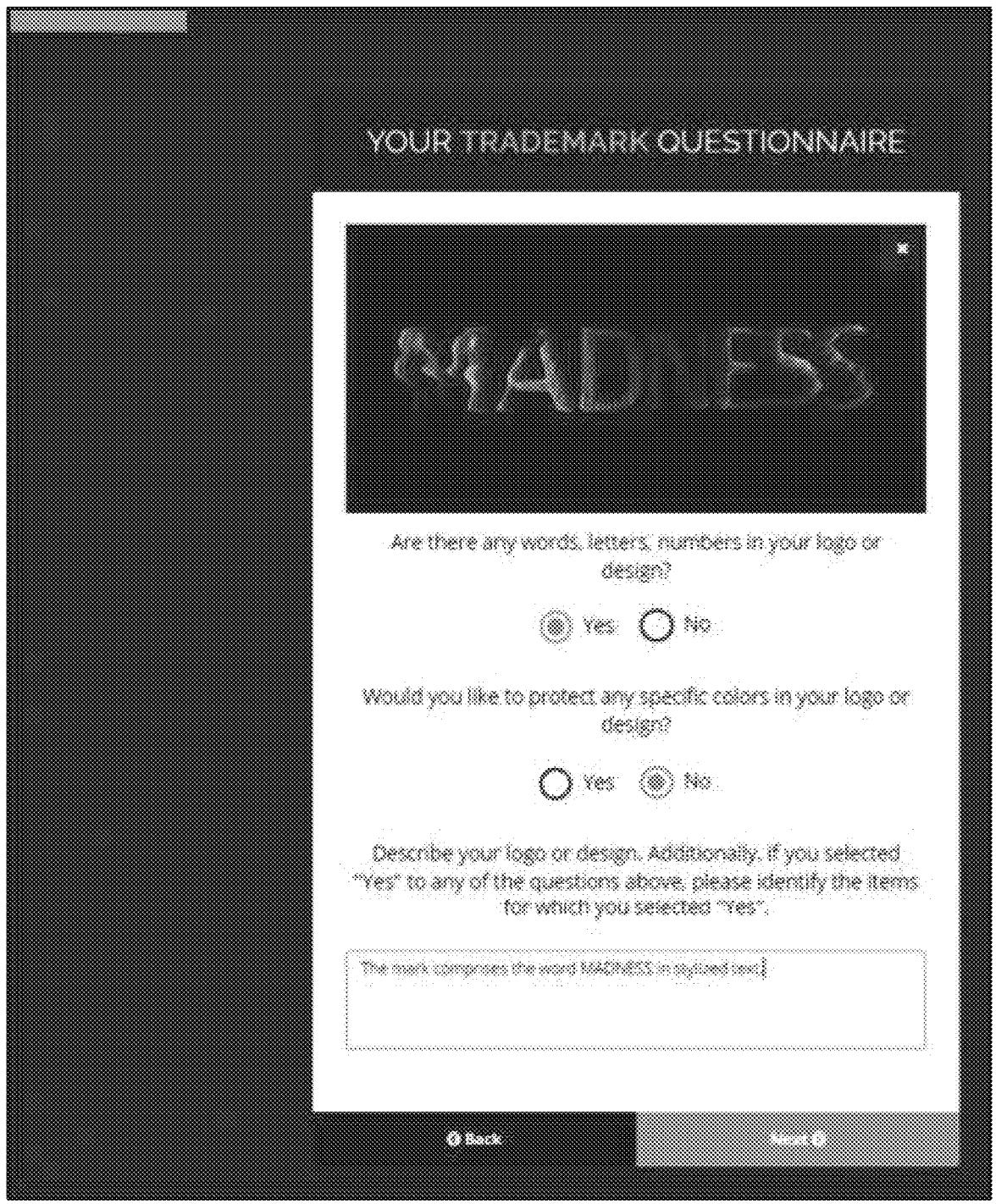
Figure 8H:
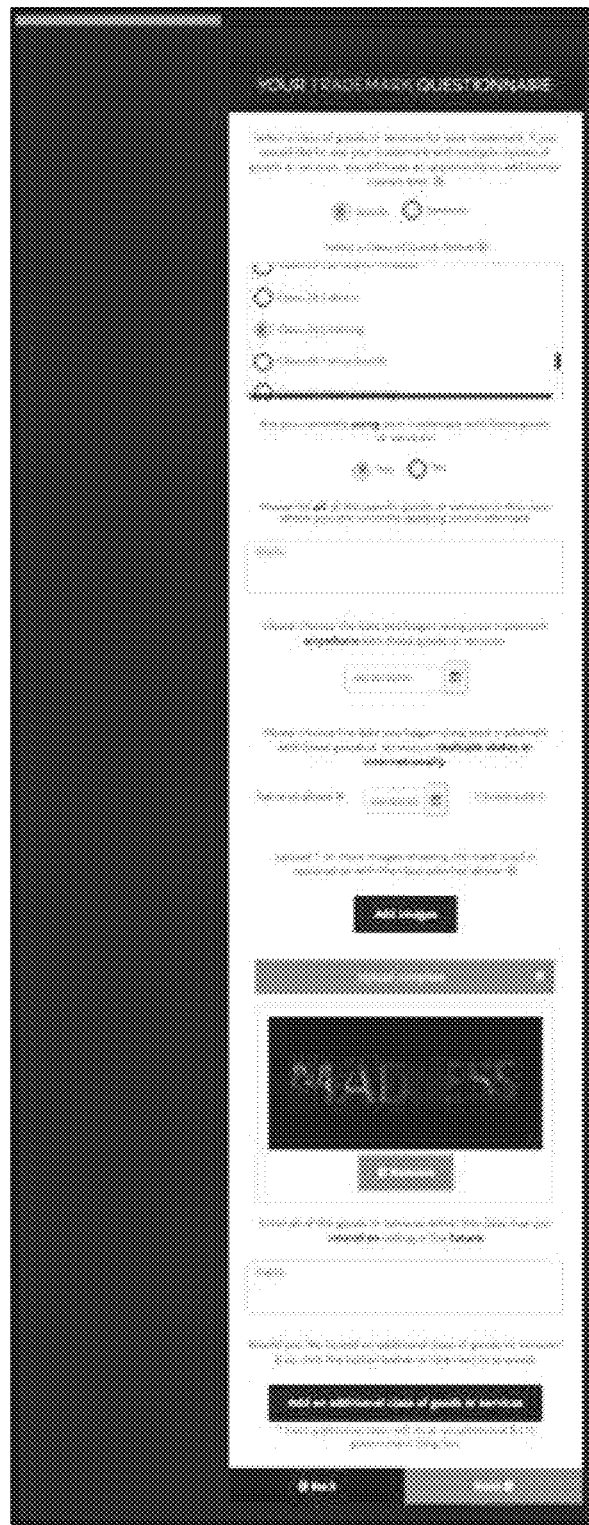
Figure 8I:
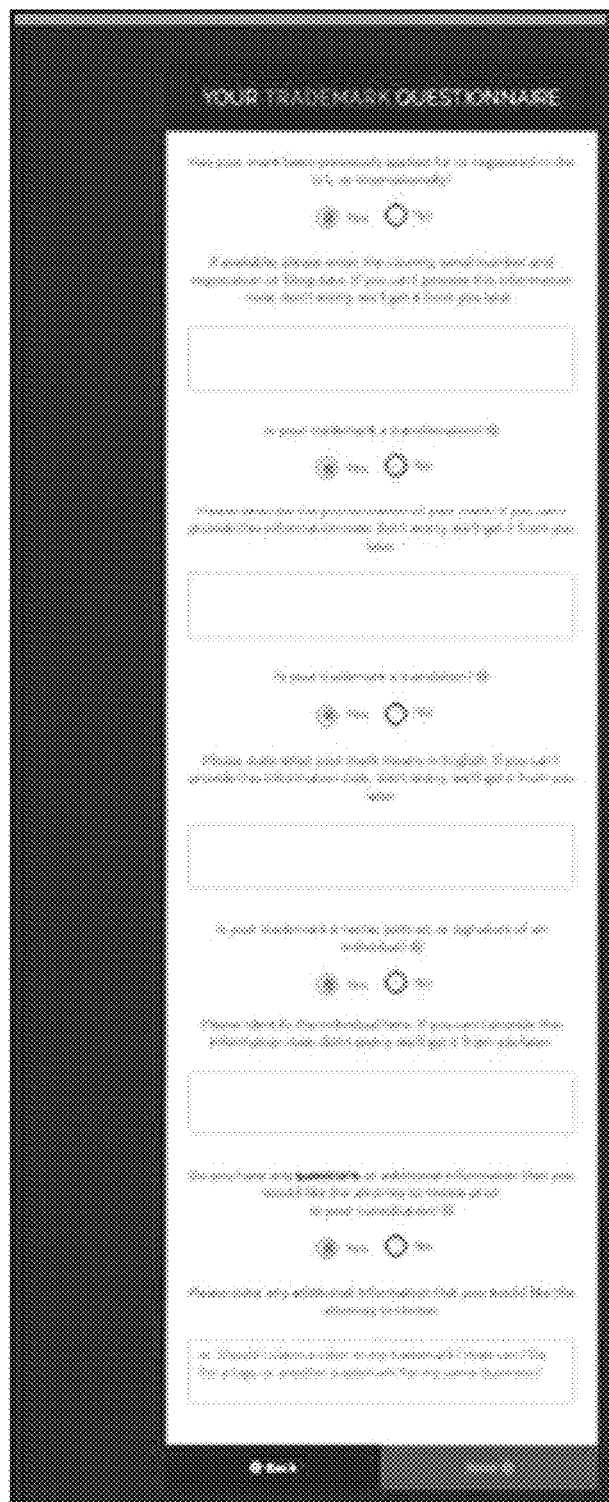

FIG. 8A illustrates an example questionnaire GUI 730, in accordance with an embodiment. In one embodiment, in response to a request from a client user 400 (FIG. 1) for a professional service, the web site generator 240 (FIG. 1) generates a questionnaire GUI 730 for display on an electronic device 300 (FIG. 1) of the client user 400.

The questionnaire GUI 730 comprises a customized questionnaire generated by the questionnaire generator 255 (FIG. 2). The customized questionnaire comprises one or more questions selected from one or more question banks 232 (FIG. 3) maintained on the storage devices 220 (FIG. 1). The questions of the customized questionnaire are relevant to the professional service requested. The customized questionnaire is presented to the client user 400, enabling the client user 400 to flow through an engaging and intuitive flow of steps that collects, from the client user 400, information necessary for performance of the professional service requested. The customized questionnaire adapts based on user responses from the client user 400. Specifically, subsequent questions of the customized questionnaire are based on user responses from the client user 400 to earlier questions of the questionnaire.

The customized questionnaire simplifies the process of gathering information necessary for performance of the professional service requested. By customizing subsequent questions based on earlier user responses from the client user 400, the client user 400 need not struggle with determining subsequent questions he/she must respond to, thereby saving the client user 400 time and effort.

For example, as shown in FIG. 8A, the questionnaire GUI 730 comprises one or more sub-areas 731. Each sub-area 731 corresponds to a particular question of the questionnaire. The sub-area 731 comprises text indicative of the corresponding question. The sub-area 731 includes one or more corresponding input fields 732 (e.g., a text field, a checkbox field, a radio button field, a select field, a file field, etc.) the client user 400 may interact with to provide a user response to the corresponding question.

In one embodiment, the questionnaire GUI 730 comprises one or more GUI elements (e.g., a tooltip, an infotip, a hint, etc.) for providing additional information (e.g., a helpful tip, etc.) about one or more questions of the questionnaire. For example, as shown in FIG. 8A, a sub-area 731 comprises an infotip 733 positioned within proximity of text indicative of a corresponding question. A pop-up window with additional information about the corresponding question appears when the client user 400 interacts with the infotip 733 (e.g., selecting or hovering over the infotip 733).

In one embodiment, the questionnaire includes a pair of similar questions requiring identical user responses to confirm accuracy of the user responses. Specifically, the auditing unit 245 (FIG. 2) compares the user responses to the pair of similar questions to determine whether the user responses match. If the user responses do not match, the questionnaire GUI 730 refreshes to indicate as such and prompts the client user 400 to correct the user responses.

In one embodiment, the questionnaire GUI 730 comprises one or more selectable GUI components for navigation control. For example, as shown in FIG. 8A, the questionnaire GUI 730 comprises a back button 734A for navigating back to a prior GUI (e.g., a GUI comprising a prior set of questions, etc.) and a forward button 734B for navigating forward to a succeeding GUI (e.g., a GUI comprising a next set of questions, etc.).

In one embodiment, the questionnaire GUI 730 comprises a GUI component that represents a progress indicator. For example, as shown in FIG. 8A, the questionnaire GUI 730 comprises a progress bar 735 indicating progress of the client user 400 in completing the process of submitting a request for a professional service.

In one embodiment, in response to the client user 400 completing a questionnaire or submitting a payment of fees for a professional service requested by the client user 400, the web site 100 prompts the client user 400 whether he/she would like to request another professional service related/similar to the professional service requested. If the client user 400 indicates that he/she would like to request another professional service that is related/similar, the questionnaire generator 255 generates a customized questionnaire for the other professional service, and automatically populates one or more input fields of the questionnaire based on user responses to the completed questionnaire for earlier professional service requested. The client user 400 may edit/correct the populated input fields, if necessary.

FIGS. 8B-8I illustrate other example questionnaires GUIs 750-757, in accordance with an embodiment. In one embodiment, the web site 100 (FIG. 1) offers preparing and filing a trademark application for a desired mark with the USPTO as a professional service. If the professional service requested by a client user 400 (FIG. 1) is preparing and filing a trademark application for a desired mark with the USPTO, the questionnaire generator 255 (FIG. 2) is configured to generate a customized trademark questionnaire comprising a step-by-step input form including questions for gathering information relevant to the desired mark. Based on some user responses from the client user 400 to some questions of the trademark questionnaire, the trademark questionnaire is updated to include additional questions. Each questionnaire GUI 750-757 includes a portion of the trademark questionnaire.

For example, as shown in FIG. 8B, the trademark questionnaire comprises, but is not limited to, at least one of the following: a question inquiring about the trademark the client user 400 would like to register, and a question inquiring about a type of the trademark (e.g., a standard character trademark or a design trademark). Each question has one or more corresponding input fields the client user 400 may interact with to provide a user response to the question (e.g., an input field to enter the trademark, a set of select fields to select a type of the trademark, another input field to re-enter the trademark).

In one embodiment, the trademark questionnaire includes a pair of similar questions requiring identical user responses to confirm accuracy of the user responses. For example, as shown in FIG. 8B, the client user 400 is prompted to enter the trademark twice to confirm the exact spelling, punctuation, spacing, numbers, and/or characters of the trademark. The auditing unit 245 (FIG. 2) compares user responses to the pair of similar questions to determine whether the user responses match. If the user responses do not match, the questionnaire GUI 750 refreshes to indicate as such and prompts the client user 400 to correct the user responses.

In one embodiment, the I/O processor 250 is configured to process an image uploaded by the client user 400 of the desired mark (e.g., utilizing optical character recognition (OCR) software), and populate one or more input fields of the trademark questionnaire based on the image (e.g., populate an input field requesting a description of the desired mark).

When all information relevant to the desired mark has been collected from the client user 400, the auditing unit 245 generates a trademark application confirmation (TAC) document (e.g., a web page, a PDF document, etc.) based on the information collected. AI software and/or one or more service representative users 500 (e.g., an attorney, support staff for the attorney, etc.) review the TAC document and suggest edits/corrections, if necessary. The reviewed TAC document is provided to the client user 400 for approval. In one embodiment, the client user 400 may approve the TAC document by digitally signing the TAC document. An approved TAC document comprises an electronic signature of the client user 400.

In response to receiving approval from the client user 400, a service representative user 500 prepares and files a trademark application with the USPTO based on the approved TAC document.

In addition to requesting a professional service, a client user 400 may also request to schedule a live, virtual consultation with a service representative user 500. In one embodiment, a virtual consultation between the client user 400 and a service representative user 500 is a necessary pre-specified condition/requirement for performance of the professional service requested. In another embodiment, a virtual consultation between the client user 400 and a service representative user 500 is optional. In another embodiment, if the client user 400 opts not to schedule a virtual consultation, the client user 400 may receive a discount in fees for the professional service requested.

In one embodiment, the client user 400 may be queried about his/her desire to schedule a virtual consultation after he/she has completed the questionnaire.

FIG. 9 illustrates an example scheduling GUI 840, in accordance with an embodiment. In one embodiment, in response to a request from the client user 400 (FIG. 1) to schedule a live, virtual consultation with a service representative user 500 (FIG. 1), the web site generator 240 (FIG. 2) is configured to generate a scheduling GUI 840 for display on an electronic device 300 (FIG. 1) of the client user 400.

For example, the scheduling GUI 840 is presented to the client user 400 in response to the client user 400 completing a questionnaire. As another example, the scheduling GUI 840 is presented to the client user 400 in response to a request from the client user 400 to schedule a live, virtual consultation with a service representative user 500.

In one embodiment, the scheduling GUI 840 comprises a sub-area 841 providing a cost structure corresponding to a professional service requested by the client user 400. The virtual consultation unit 280 may retrieve the cost structure from a database 233 (FIG. 3) corresponding to a service provider offering the professional service requested. The cost structure comprises pre-determined rates for virtual consultations of varying lengths of time (e.g., a 15-minute virtual consultation, a 30-minute virtual consultation, etc.).

As stated above, the client user 400 may directly control costs associated with the professional service requested by managing a duration of a virtual consultation with a service representative user 500. In one embodiment, the scheduling GUI 840 comprises a sub-area 842 the client user 400 may use to select a desired length/duration of the virtual consultation. For example, as shown in FIG. 9, the scheduling GUI 840 comprises one or more input fields 843 the client user 400 may interact with to select a pre-determined amount of time for the virtual consultation (e.g., a select field/checkbox corresponding to a 15-minute virtual consultation, another select field/checkbox corresponding to a 30-minute virtual consultation, etc.).

In one embodiment, if the client user 400 does not select a pre-determined amount of time for the virtual consultation, no virtual consultation is scheduled (i.e., the client user 400 opts out of scheduling a virtual consultation). In another embodiment, if the client user 400 does not select a pre-determined amount of time for the virtual consultation, the virtual consultation is scheduled for a default amount of time (e.g., a 15-minute virtual consultation may be the default).

As described in detail later herein, the client user 400 may be prompted to pre-pay for the virtual consultation using one or more payment mechanisms supported by the web site 100.

In one embodiment, the scheduling GUI 840 comprises a sub-area 844 the client user 400 may use to select a date and start time for the virtual consultation. For example, as shown in FIG. 9, the scheduling GUI 840 comprises an interactive GUI component 845A (e.g., a date picker) for selecting a desired date for the virtual consultation and an interactive GUI component 845B (e.g., a time picker) for selecting a desired start time for the virtual consultation.

In one embodiment, the scheduling GUI 840 comprises a sub-area 847 listing one or more professionals associated with the service provider and available for the virtual consultation. In one embodiment, the sub-area 847 is dynamically updated based on the pre-determined amount of time selected, the date selected, the start time selected, and availability of professionals. For example, as shown in FIG. 9, the sub-area 847 comprises one or more input fields 848 the client user 400 may interact with to select a professional he/she would like to schedule the virtual consultation with (e.g., a select field/checkbox corresponding to a professional, another select field/checkbox corresponding to another professional).

In one embodiment, the sub-area 847 comprises, for each professional listed, a corresponding GUI element 849 displaying additional information for the professional (e.g., a rating and/or a ranking of the professional, experience level of the professional, etc.). The additional information is provided to assist the client user 400 with selecting the professional he/she would like to schedule the virtual consultation with.

In one embodiment, the virtual consultation is tentatively scheduled and is only confirmed upon approval from the selected professional. The selected professional is provided with appointment information relevant to the virtual consultation (e.g., proposed date, proposed time, desired length/duration, rating and/or ranking of the client user 400, etc.) to assist the selected professional with determining whether to approve the virtual consultation.

Figure 10A:
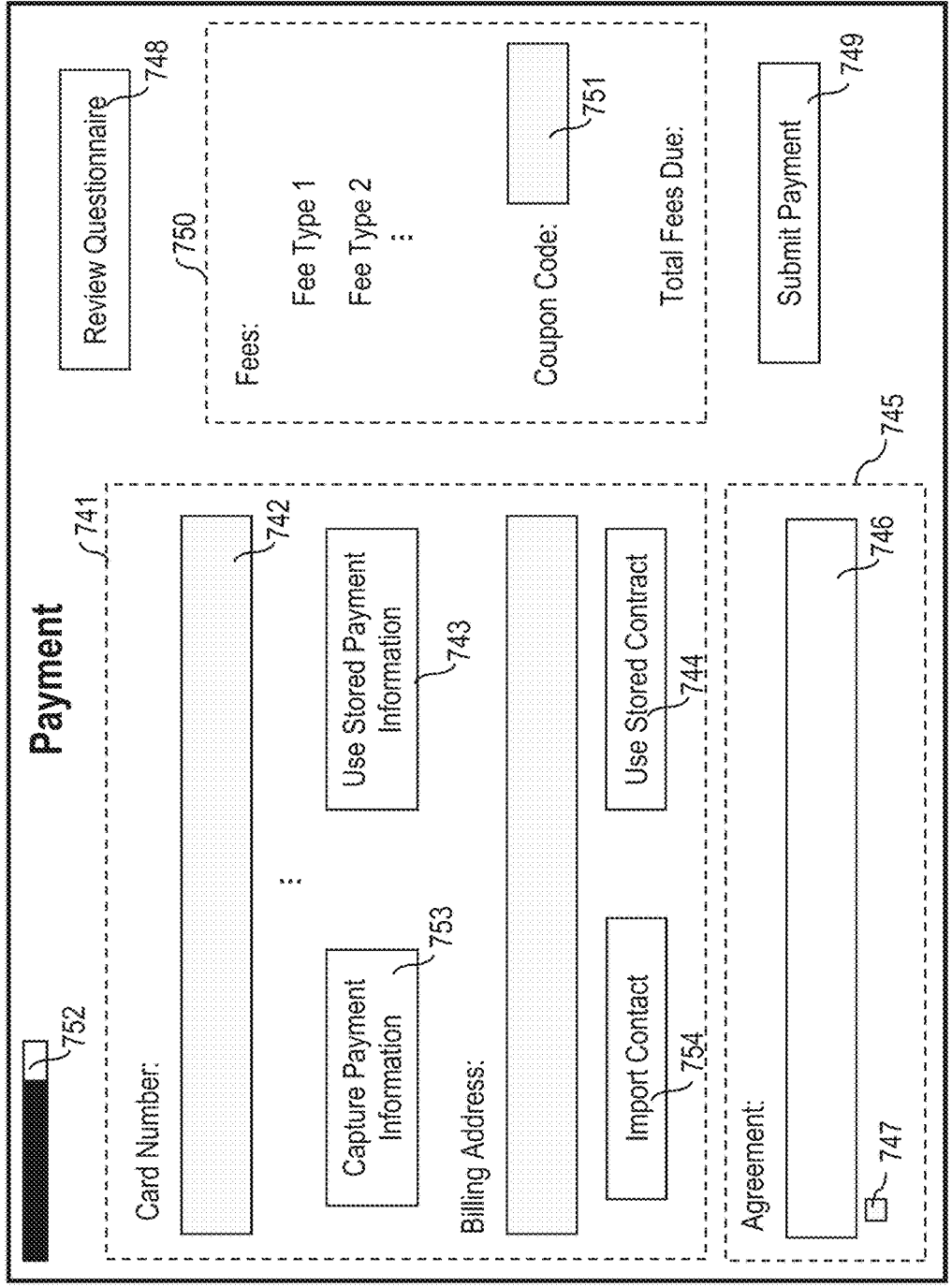
FIG. 10A illustrates an example payment GUI 740, in accordance with an embodiment.

FIG. 10A illustrates an example payment GUI 740, in accordance with an embodiment. In one embodiment, the web site generator 240 (FIG. 2) is configured to generate a payment GUI 740 for display on an electronic device 300 (FIG. 1) of a client user 400 (FIG. 1). The payment GUI 740 enables the client user 400 to submit a payment of fees associated with a professional service requested by the client user 400.

For example, the payment GUI 740 is presented to the client user 400 in response to the client user 400 completing a questionnaire relevant to the professional service requested. As another example, the payment GUI 740 is presented to the client user 400 in response to a request from the client user 400 to submit a payment of fees associated with the professional service requested.

In one embodiment, the payment GUI 740 comprises a sub-area 741 for collecting payment information from the client user 400. The client user 400 may manually enter payment information, capture payment information, or select stored payment information. The sub-area 741 comprises one or more input fields 742 the client user 400 may manually enter payment information into (e.g., a text field for credit card number, check number, etc.).

Further, the sub-area 741 comprises a selectable GUI component 753 the client user 400 may interact with to capture payment information utilizing the electronic device 300. For example, the client user 400 may capture payment information by taking a photo of an electronic check or a credit card using a sensor (e.g., a camera) of the electronic device 300. The payment unit 290 is configured to process the captured payment information (e.g., utilizing optical character recognition (OCR) software), and populate one or more input fields 742 of the sub-area 741 for the client user 400 to confirm. The client user 400 may edit the populated input fields 742, if necessary. The client user 400 may elect to save any payment information manually entered/captured for future payment transactions. Any payment information saved is maintained as stored payment information on a database 239 (FIG. 3) corresponding to an online account associated with the client user 400.

Further, the sub-area 741 comprises a selectable GUI component 743 the client user 400 may interact with to select stored payment information previously saved by the client user 400. In response to the client user 400 selecting the stored payment information, one or more input fields 742 of the sub-area 741 are automatically populated based on the stored payment information selected.

In one embodiment, the sub-area 741 comprises a selectable GUI component 754 the client user 400 may interact with to import contact information (i.e., one or more contacts) stored on the electronic device 300. The payment unit 290 is configured to process the imported contact information, and populate one or more input fields 742 (e.g., billing address, etc.) of the sub-area 741 for the client user 400 to confirm. The client user 400 may edit the populated input fields 472, if necessary. The client user 400 may elect to save any imported contact information for future payment transactions. Any contact information saved is maintained as stored contact information on a database 234 (FIG. 3) corresponding to the client user 400.

Further, the sub-area 741 comprises a selectable GUI component 744 the client user 400 may interact with to select stored contact information previously saved by the client user 400. In response to the client user 400 selecting the stored contact information, one or more input fields 742 (e.g., billing address, etc.) of the sub-area 741 are automatically populated based on the stored contact information selected.

In one embodiment, if the professional service requested is preparing and filing a trademark application for a desired mark with the USPTO, some information relevant to the desired mark (e.g., applicant information) may be been collected from the imported contact information or stored contact information selected.

In one embodiment, the payment GUI 740 comprises a sub-area 750 providing a breakdown of the fees for the professional service requested. For example, as shown in FIG. 10A, the breakdown of the fees may indicate the different types of fees due, such as professional fees, filing fees, etc. If the client user 400 has requested/scheduled a live, virtual consultation with a professional, the different types of fees may include a pre-determined rate for a pre-determined amount of time selected by the client user 400 for the virtual consultation. The sub-area 750 comprises a total amount of fees due (i.e., total sum of the different types of fees due). The sub-area 750 comprises an input field 751 for collecting a coupon/promo code from the client user 400. If the client user 400 enters a valid coupon/promo code, the total amount of fees due may be adjusted to reflect a discount associated with the coupon/promo code entered.

In one embodiment, the payment GUI 740 comprises a selectable GUI component 748 the client user 400 may select to review user responses to the completed questionnaire before submitting a payment.

In one embodiment, the web site 100 requires the client user 400 to review and accepted a user agreement before the client user 400 can submit payment of fees for the professional service requested. For example, as shown in FIG. 10A, the payment GUI 740 comprises a sub-area 745 displaying a click-wrap agreement 746 requiring the client user 400 to click and accepts terms and conditions specified in the agreement (e.g., by clicking a checkbox field 747 stating "I accept the terms & conditions.").

In one embodiment, the professional service requested requires the client user 400 to make one or more declarations/statements (e.g., an oath or declaration). The sub-area 745 may comprise one or more input fields for collecting one or more declarations/statements from the client user 400.

In one embodiment, the payment GUI 740 comprises a selectable GUI component 749 the client user 400 may select to submit a payment of fees for the professional service requested. In one embodiment, the GUI component 749 is disabled (e.g., greyed out) until each input field 742 of the sub-area 741 is populated with the payment information and/or the client user 400 has accepted the user agreement.

In one embodiment, the payment GUI 740 comprises a GUI component that represents a progress indicator. For example, as shown in FIG. 10A, the payment GUI 740 comprises a progress bar 752 indicating progress of the client user 400 in completing the process of submitting a request for a professional service.

Figure 10B:
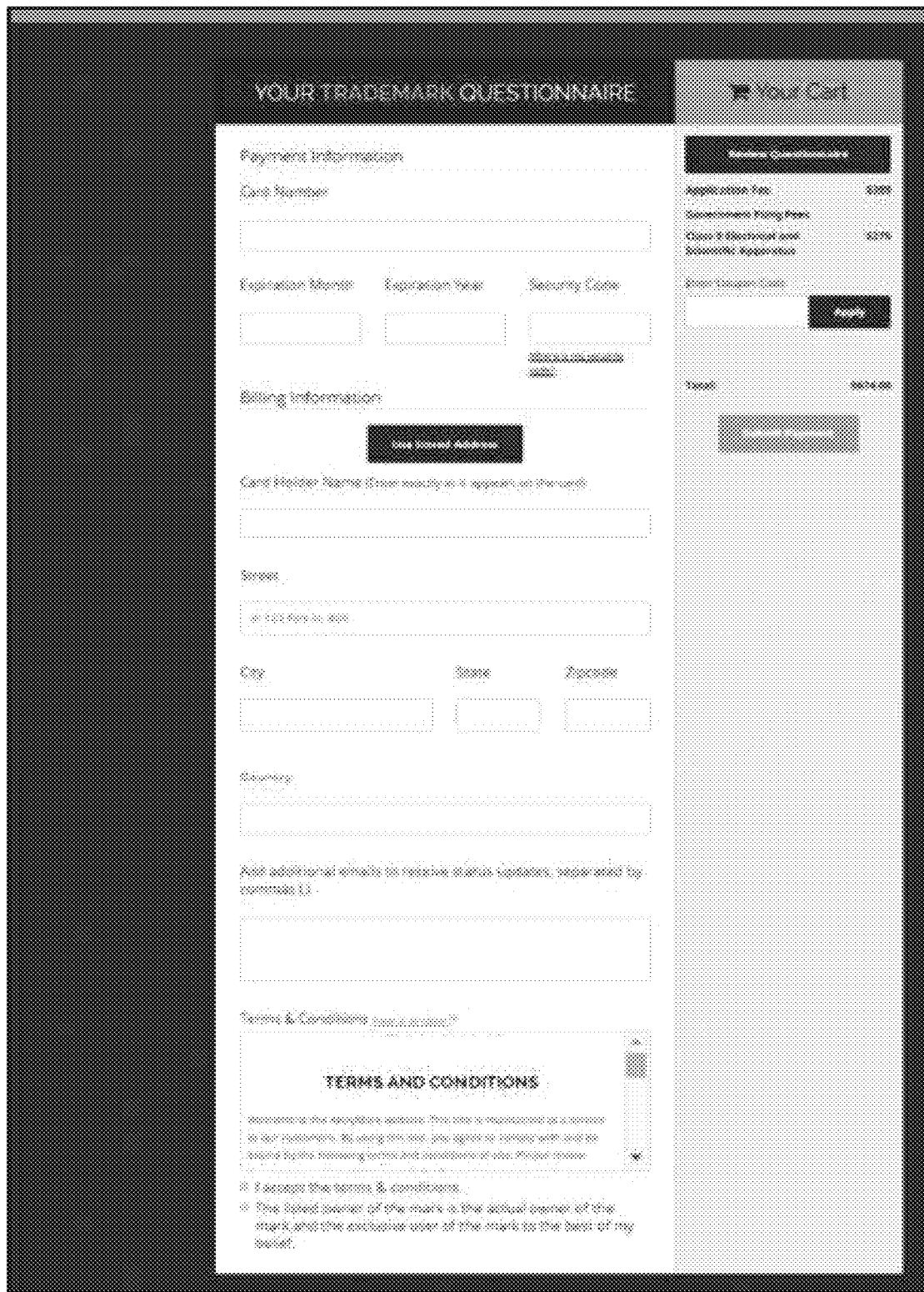
FIG. 10B illustrates another example payment GUI 760, in accordance with an embodiment.

FIG. 10B illustrates another example payment GUI 760, in accordance with an embodiment. In one embodiment, the web site 100 (FIG. 1) offers preparing and filing a trademark application for a desired mark with the USPTO as a professional service. If the professional service requested by a client user 400 (FIG. 1) is preparing and filing a trademark application for a desired mark with the USPTO, the web site generator 240 (FIG. 2) is configured to generate a payment GUI 760 providing a breakdown of fees associated with preparing and filing the trademark application. The payment GUI 760 requires the client user 400 to make a declaration/statement that he/she is the actual owner of the desired mark and the exclusive user of the mark to the best of his/her belief.

In one embodiment, in response to the client user 400 completing a trademark questionnaire or submitting a payment of fees for preparing and filing a first trademark application, the web site 100 prompts the client user 400 whether he/she would like to prepare and file a second trademark application similar the first trademark application (e.g., if the first trademark application is for a standard character mark, the second trademark application may be for a design/stylized mark). If the client user 400 indicates that he/she would like to file a second trademark application that is similar to the first trademark application, the questionnaire generator 255 generates a customized questionnaire for the second trademark application, and automatically populates one or more input fields of the questionnaire based on user responses to the completed questionnaire for the first trademark application. The client user 400 may edit/correct the populated input fields, if necessary. This allows the client user 400 to speed up the process of filing multiple similar trademark applications.

Figure 11A:
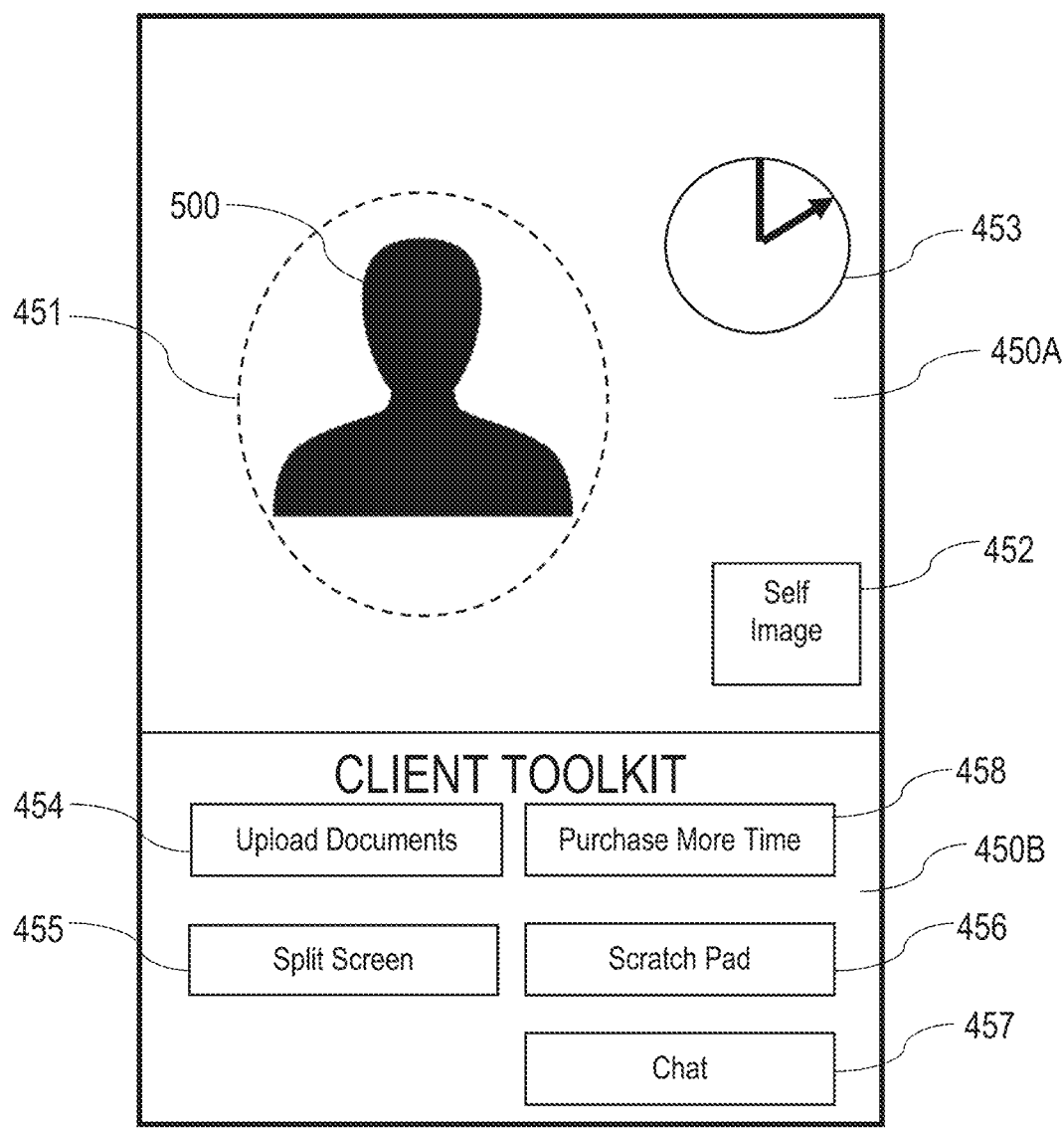
FIG. 11A illustrates an example virtual consultation GUI 450 for a client user 400, in accordance with an embodiment.
Figure 11B:
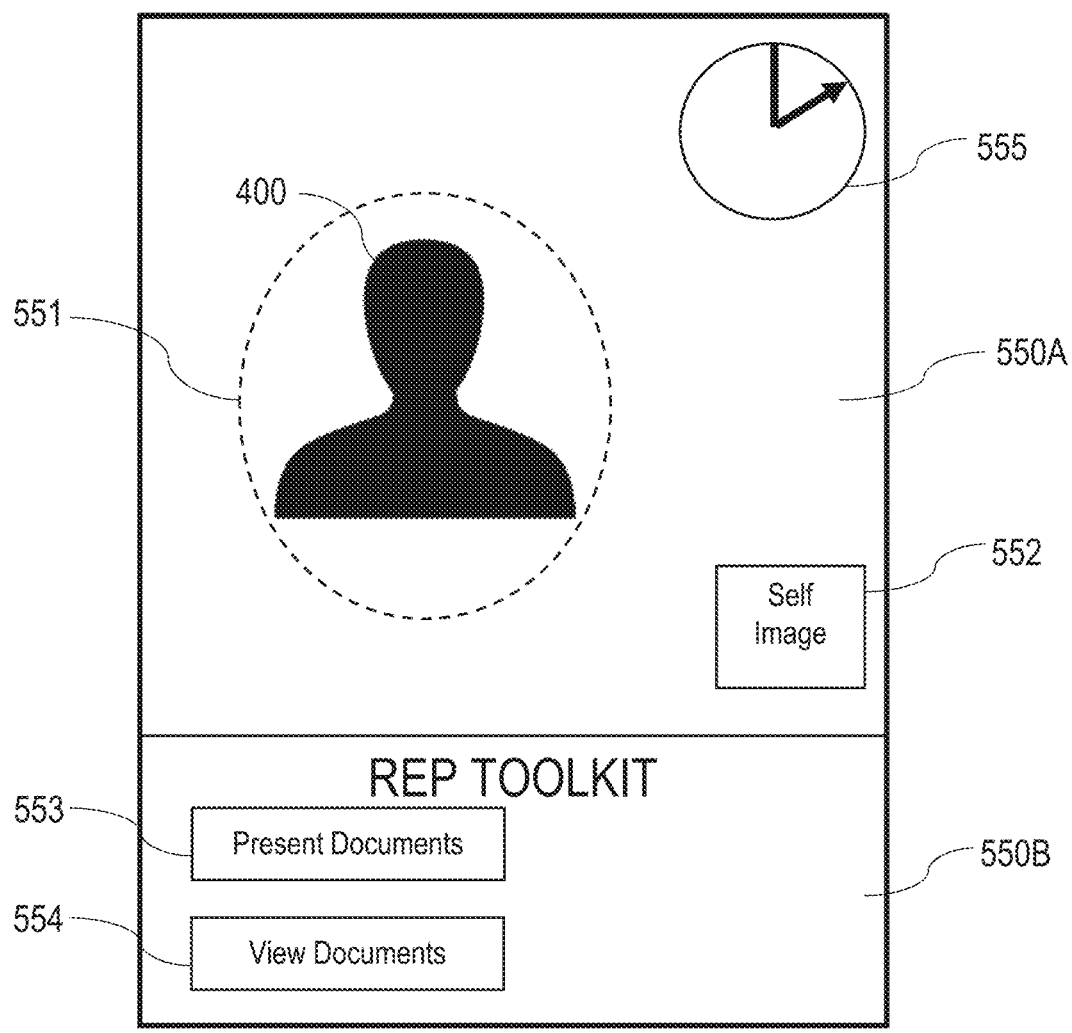
FIG. 11B illustrates an example virtual consultation GUI 550 for a service representative user 500, in accordance with an embodiment.

FIG. 11A illustrates an example virtual consultation GUI 450 for a client user 400, in accordance with an embodiment. FIG. 11B illustrates an example virtual consultation GUI 550 for a service representative user 500, in accordance with an embodiment. To facilitate a scheduled live, virtual consultation between a client user 400 and a service representative user 500, the web site generator 240 (FIG. 2) is configured to generate: (1) a virtual consultation GUI 450 for display on an electronic device 300 (FIG. 1) of the client user 400, and (2) a virtual consultation GUI 550 for display on an electronic device 300 of the service representative user 500. The virtual consultation GUIs 450, 550 enable the client user 400 and the service representative user 500 to interact and engage with each other during the virtual consultation.

In one embodiment, the client user 400 views, via the virtual consultation GUI 450, a live stream audio or audio and video of the service representative user 500 during the virtual consultation, as shown in FIG. 11A. The live stream of the service representative user 500 may be captured utilizing one or more sensors (e.g., a camera, a microphone, etc.) of the electronic device 300 of the service representative user 500. The live stream of the service representative user 500 comprises a live video stream of the service representative user 500 and/or a live audio stream of the service representative user 500. Specifically, the virtual consultation GUI 450 comprises a sub-area 450A comprising a window 451. The window 451 displays either a live video stream of the service representative user 500 or an image of the service representative user 500 (e.g., if only live audio stream is available/enabled).

In one embodiment, the sub-area 450A comprises a window 452 displaying either an image or icon of the client user 400 or a live video stream of the client user 400. The window 452 may be smaller in size than the window 451 (i.e., occupies a smaller area of the virtual consultation GUI 450). Further, live video stream displayed in the window 452 may have lower resolution quality than live video stream displayed in the window 451.

In one embodiment, the client user 400 views, via the virtual consultation GUI 450, real-time data indicative of an amount of time remaining for the virtual consultation. For example, as shown in FIG. 11A, the sub-area 450A comprises a GUI component 453 providing a live countdown. At the start of the virtual consultation, the virtual consultation unit 280 (FIG. 2) keeps track of the amount of time that has elapsed and provides, via the GUI component 453, information indicative of the amount of time remaining for the virtual consultation. In one embodiment, the GUI component 453 is a countdown timer. In another embodiment, the GUI component 453 is a color coded light indicator configured to flash different colors when different predetermined thresholds are met. For example, the light indicator flashes a green color if the amount of time remaining exceeds more than 20% of a pre-determined amount of time the client user 400 has pre-paid for, flashes a yellow color if the amount of time remaining is between 10% and 20% of the pre-determined amount of time, and flashes a red color if the amount of time remaining is less than 10% of the pre-determined amount of time.

In one embodiment, the window 451 decreases in size as the amount of time remaining decreases. For example, the window 451 automatically closes when the amount of time remaining reaches zero. As described in detail later herein, in one embodiment, the virtual consultation GUI 450 provides the client user 400 with an opportunity to purchase additional time to extend the virtual consultation.

In one embodiment, the virtual consultation GUI 450 provides a client toolkit comprising different virtual tools the client user 400 may utilize to enhance his/her online engagement/collaboration with the service representative user 500. For example, as shown in FIG. 11A, the virtual consultation GUI 450 comprises a sub-area 450B comprising one or more selectable GUI components. Each selectable GUI component of the sub-area 450B invokes a particular virtual tool when selected.

In one embodiment, the sub-area 450B comprises a selectable GUI component 454 labeled "Upload Documents" the client user 400 may select to upload one or more documents (e.g., image files such as JPEGs, text files such as Word documents, object files such as PDFs, etc.) to the web site 100. The client user 400 may upload one or more documents stored on, or captured by, the electronic device 300 to the web site 100. For example, a photo of a legal document captured using a sensor (e.g., camera) of the electronic device 300 may be directly uploaded to the web site 100, without requiring the client user 400 to manually scan the legal document and upload the scanned legal document to the web site 100.

In one embodiment, for privacy protection, a document uploaded to the web site 100 by the client user 400 is only accessible by the client user 400 unless the client user 400 has granted access permission to the document to another user 50 (e.g., a service representative user 500 assigned/selected to perform the professional service requested). For example, a document uploaded to the web site 100 may be reviewed by a service representative user 500 engaged with the client user 400 during the virtual consultation if the service representative user 500 has been granted access permission to the document.

In one embodiment, the sub-area 450B comprises a selectable GUI component 455 labeled as "Split Screen" the client user 400 may select to simultaneously view multiple screens. For example, the client user 400 may simultaneously view live video of the service representative 500 and an uploaded document on separate screens.

In one embodiment, the sub-area 450B comprises a selectable GUI component 456 labeled "Scratch Pad" the client user 400 may select to launch a virtual notepad. The client user 400 may jot down notes in the virtual notepad and save the notes as a document the client user 400 may later access.

In one embodiment, the sub-area 450B comprises a selectable GUI component 457 labeled "Chat" the client user 400 may select to launch a chat interface between the client user 400 and the service representative user 500. In one embodiment, the sub-area 450B comprises a selectable GUI component 457 labeled "Third Party" where the client user 400 may select to launch an interface between the client user 400 and a third party, either in the form of a chat or teleconference or a video conference, where by the client user 400 can access information in the possession of a third party or even bring the third party into the conference with the service representative 500. All of this is within the client user's 400 control in how to most effectively obtain professional services.

In one embodiment, the sub-area 450B comprises a selectable GUI component 458 labeled "Purchase More Time" the client user 400 may select to purchase additional time to extend the virtual consultation. For example, if the GUI component 453 indicates the amount of time remaining for the virtual consultation is running out (i.e., the virtual consultation will conclude soon), the GUI 450 and/or the service representative user 500 may prompt the client user 400 to either speed up/wrap up his/her discussion or purchase additional time to extend the virtual consultation. Upon selection of the GUI component 458, the client user 400 is prompted to either input an amount specifying the additional time he/she wishes to purchase or select the amount from suggested time increments (e.g., increments of 5 minutes, 15 minutes, 30 minutes, etc.). In one embodiment, the client user 400 is provided with a cost structure indicating pre-determined rates associated with each suggested time increment. The client user 400 submits payment for the additional time utilizing one of the different payment mechanisms supported by the web site 100. The additional time is automatically added to the amount of time remaining for the virtual consultation upon purchase of the additional time. The GUI component 453 is adjusted to reflect the additional time purchased.

The GUI component 458 allows the client user 400 to make informed decisions regarding whether to extend or conclude the virtual consultation based on costs accrued in real-time. Allowing the client user 400 to directly manage the duration of the virtual consultation allows the client user 400 to directly control costs associated with the professional service requested.

In one embodiment, if the client user 400 concludes the virtual consultation before the amount of time remaining for the virtual consultation has run out, the client user 400 is provided a credit for the unused amount of time remaining. For example, a portion of the payment for the virtual consultation may be credited to the client user 400. As another example, the client user 400 may opt to carryover the unused amount of time remaining to another virtual consultation.

In one embodiment, the service representative user 500 views, via the virtual consultation GUI 550, a live stream of the client user 400, as shown in FIG. 11B. The live stream of the client user 400 may be captured utilizing one or more sensors (e.g., a camera, a microphone, etc.) of the electronic device 300 of the client user 400. The live stream of the client user 400 comprises a live video stream of the client user 400 and/or a live audio stream of the client user 400. Specifically, the GUI 550 comprises a sub-area 550A comprising a window 551. The window 551 displays either a live video stream of the client user 400 or an image of the client user 400 (e.g., if only live audio stream is available/enabled).

In one embodiment, the sub-area 550A comprises a window 552 displaying either an image of the service representative user 500 or a live video stream of the service representative user 500. The window 552 may be smaller in size than the window 551 (i.e., occupies a smaller area of the GUI 550). Further, live video stream displayed in the window 552 may have lower resolution quality than live video stream displayed in the window 551.

In one embodiment, the service representative user 500 views, via the virtual consultation GUI 550, real-time data indicative of an amount of time remaining for the virtual consultation. For example, as shown in FIG. 11B, the sub-area 550A comprises a GUI component 555 providing a live countdown. In one embodiment, the GUI component 555 is a countdown timer. In another embodiment, the GUI component 555 is a color coded light indicator configured to flash different colors when different predetermined thresholds are met. If the GUI component 555 indicates the amount of time remaining for the virtual consultation is running out (i.e., the virtual consultation will conclude soon), the service representative user 500 may prompt the client user 400 to either speed up/wrap up his/her discussion or purchase additional time to extend the virtual consultation.

In one embodiment, the virtual consultation GUI 550 provides a service representative toolkit comprising different virtual tools the service representative user 500 may utilize to enhance his/her online engagement/collaboration with the client user 400. For example, as shown in FIG. 11B, the virtual consultation GUI 550 comprises a sub-area 550B comprising one or more selectable GUI components. Each selectable GUI component of the sub-area 550B invokes a particular virtual tool when selected.

In one embodiment, the sub-area 550B comprises a selectable GUI component 553 labeled "Present Documents" the service representative user 500 may select to present one or more documents (e.g., image files such as JPEGs, text files such as Word documents, object files such as PDFs, etc.) to the client user 400. The documents presented may be viewed on the electronic device 300 of the client user 400 via the GUI 450.

In one embodiment, the sub-area 550B comprises a selectable GUI component 554 labeled "View Documents" the service representative user 500 may select to view one or more documents (e.g., image files such as JPEGs, text files such as Word documents, object files such as PDFs, etc.) uploaded by the client user 400.

Figure 12:
FIG. 12 illustrates an example ratings GUI 820, in accordance with an embodiment.

FIG. 12 illustrates an example ratings GUI 820, in accordance with an embodiment. In one embodiment, the web site generator 240 (FIG. 2) is configured to generate a ratings GUI 820 for display on an electronic device 300 (FIG. 1) of a user 50 (FIG. 1). The ratings GUI 820 provides a rating tool the user 50 may use to rate and/or review his/her experience with another user 50.

For example, if the user 50 is a client user 400 (FIG. 1), the client user 400 may provide a rating and/or a review indicative of client satisfaction with performance and/or experience of a service representative user 500 who performed a professional service requested by the client user 400. If the user 50 is a service representative user 500 (FIG. 1), the service representative user 500 may provide a rating and/or a review indicative of ease of interaction/engagement with a client user 400 the service representative user 500 performed a professional service for.

In one embodiment the client user 400 ratings may provide discounted fee structures for future professional service engagements. For example, a client user 400 with a 5 star rating can obtain a ten percent (10%) discount on further services ordered from the same or other service representative users 500. A 4 star rating might command an eight percent (8%) discount, etc. Likewise, a service representative user 500 can obtain altered fees based on their rating. A higher rating will allow the service representative user 500 to pre-set higher service fees to users. Regardless of the fee application, the rating provides creditably for future engagements with both client users 400 and service representative users 500.

In one embodiment, the ratings GUI 820 may be displayed on an electronic device 300 of a client user 400 and/or on an electronic device 300 of a service representative user 500 at the conclusion of a virtual consultation between the client user 400 and the service representative user 500.

In one embodiment, the ratings GUI 820 prompts the user 50 to input ratings for different metrics. The different metrics may comprise, but are not limited to, at least one the following: ease of communication, clarity of response, timeliness of answers, professionalism, expertise, likelihood of recommendation, desire to engage again, cost effectiveness, overall experience. For example, as shown in FIG. 12, the ratings GUI 820 comprises multiple sets 821 of input fields for collecting quantitative input. Each set 821 of input fields corresponds to a particular metric.

In one embodiment, the ratings GUI 820 comprises an input field 822 for collecting qualitative input, such as comments including free form text from the user 50 (i.e., a comments section).

The ratings unit 296 (FIG. 2) is configured to: (1) determine rankings for different client users 400 based on ratings and/or reviews collected for the client users 400, and (2) determine rankings for different service representative users 500 based on ratings and/or reviews collected for the service representative users 500. The higher a ranking accorded to a particular user 50, the more likely the user 50 will be selected or approved for a live, virtual consultation. The rankings allow for both client users 400 and service representative users 500 to make educated and informed decisions before choosing a professional to hire, accepting an engagement request from a User and/or participating in a live, virtual consultation.

FIG. 13A illustrates an example dashboard 770, in accordance with an embodiment. In one embodiment, in response to a request from a user 50 to access a dashboard 770 for an online account, the dashboard generator 270 is configured to generate the dashboard 770 for display on an electronic device 300 of the user 50.

In one embodiment, the dashboard 770 comprises a sub-area 780 providing service history information for the online account. The service history information is retrieved from a database 237 (FIG. 3) corresponding to the online account. For example, if the user 50 is a client user 400, the service history information comprises a listing of all professional services requested by the client user 400. If the user 50 is a service representative user 500, the service history information comprises a listing of all professional services assigned to/overseen by the service representative user 500. For example, as shown in FIG. 13A, the sub-area 780 comprises one or more data rows 781. Each data row 781 corresponds to a particular professional service associated the online account. Each data row 781 comprises summarized information for a corresponding professional service. In one embodiment, the summarized information for the corresponding professional service comprises, but is not limited to, at least one of the following: (1) a corresponding label/name for the professional service, (2) a corresponding identifier for the professional service, (3) corresponding filing/submission information for the professional service, if any (e.g., a timestamp indicating when a document prepared for the professional service was submitted/filed), and (4) corresponding status information indicative of a current status of the professional service (e.g., completed, incomplete, etc.).

In one embodiment, a corresponding identifier for the professional service is automatically generated by the web site 100.

In one embodiment, the sub-area 780 comprises, for each professional service listed, a corresponding GUI element 785 indicating a current status of the professional service. As shown in FIG. 13A, the GUI element 785 may be a color coded indicator that may be set to one of multiple colors based on the current status of the professional service. For example, the indicator is set to a first color (e.g., red) if the professional service has not yet been completed, and set to a second color (e.g., green) if the professional service has been completed.

In one embodiment, the dashboard generator 270 is configured to interface and exchange data with a third-party entity (e.g., the USPTO) to push/pull notifications of status changes for one or more of the professional services listed.

In one embodiment, the dashboard 770 comprises a selectable GUI component 792 providing a legend for the color coded indicator.

In one embodiment, the dashboard 770 comprises a selectable GUI component 791 the user 50 may select to export the service history information to a document file (e.g., a tab delimited text file, a CSV or comma delimited text file, etc.).

In one embodiment, the sub-area 780 comprises, for each professional service listed, a selectable GUI component 782 the user 50 may select to view detailed information for the professional service (e.g., documents prepared and/or submitted for the professional service, virtual consultation information indicative of a virtual consultation scheduled, etc.).

In one embodiment, the sub-area 780 comprises, for each professional service listed, a selectable GUI component 783 the user 50 may select to send a communication (e.g., an e-mail, a SMS, a message, a text, a document file, and a push/pull notification) relevant to the professional service. For example, if the user 50 is a client user 400, the client user 400 may utilize the GUI component 783 to send a communication to a service representative user 500 assigned to/handling the professional service (e.g., an inquiry communication). If the user 50 is a service representative user 500, the service representative user 500 may utilize the GUI component 783 to send a communication to a client user 400 who requested the professional service (e.g., a status update communication).

In one embodiment, for each professional service listed, the dashboard 770 allows a user 50 to enable automatic status update communications for the professional service. When the system 200 receives a notification indicting a change in status for the professional service (e.g., a notification from the USPTO indicating change in status of a filed trademark application), the system 200 automatically generates and sends a pre-formatted status update communication to the client user 400 and/or the service representative user 500 advising of the status change.

In one embodiment, the sub-area 780 comprises, for each professional service listed that is incomplete, a selectable GUI component 784 the user 50 may select to delete the request for the professional service from the service history information.

In one embodiment, the dashboard 770 comprises a sub-area 771 providing a filter tool for filtering the service history information. For example, as shown in FIG. 13A, the sub-area 771 comprises different input fields the user 50 may interact with to specify/select a combination of different filters for filtering the service history information. In one embodiment, the sub-area 771 comprises a set of input fields 772 (e.g., date pickers) the user 50 may interact with to specify a date range for filtering the service history information. In one embodiment, the sub-area 771 comprises an input field 773 the user 50 may interact with to select a status the service history information should be filtered based on (e.g., filter the service history information to only show professional services with status "complete", etc.). In one embodiment, the sub-area 771 comprises an input field 774 the user 50 may interact with to select a label/name the service history information should be filtered based on (e.g., filter the service history information to only show professional services with a label/name beginning with the letter 'A', etc.).

The sub-area 771 comprises a selectable GUI component 775 the user 50 may select to filter the service history information based on the filters specified/selected. The service history information displayed in the sub-area 780 is updated to display only professional services that satisfy the filters specified/selected. The sub-area 771 comprises a selectable GUI component 776 the user 50 may select to clear each filter specified/selected and restore any filtered version of the service history information shown in the sub-area 780 to the original, unfiltered version.

In one embodiment, the sub-area 771 provides a search tool for searching the service history information. For example, as shown in FIG. 13A, the sub-area 771 comprises an input field 777 the user 50 may use to specify one or more search terms/parameters. The sub-area 771 comprises a selectable GUI component 778 the user 50 may select to search the service history information based on the search terms/parameters specified. The service history information displayed in the sub-area 780 is updated to display only professional services that satisfy the search terms/parameters specified.

In one embodiment, the dashboard 770 comprises a selectable GUI component 794 the user 50 may select to view and update account information for the online account. The account information comprises, but is not limited to, contact information, payment history information, and user preferences such as preferred electronic delivery method, preferred payment method, etc.

In one embodiment, the dashboard 770 comprises a sub-area 790 providing statistical information for the online account. In one embodiment, the statistical information is indicative of statistics associated with the service history information (e.g., total number of professional services requested in a given time period, total number of professional services completed, etc.).

In one embodiment, the dashboard 770 comprises a selectable GUI component 793 the user 50 may select to resume an incomplete request (i.e., a professional service with an incomplete status). Upon selection of the GUI component 793, a pop-up window 1000 (FIG. 13D) listing each professional service that has not yet been completed is presented to the user 50. The user 50 may select a professional service from the pop-up window 1000 to resume working on the professional service (e.g., completing a questionnaire, submitting payment information, etc.).

In one embodiment, the dashboard 770 comprises a selectable GUI component 795 the user 50 may select to initiate a new request for a professional service. Upon selection of the GUI component 795, the user 50 may be directed to a questionnaire GUI (e.g., questionnaire GUI 730 in FIG. 8A) comprising a questionnaire for the new request.

In one embodiment, the dashboard 770 allows a service representative user 500 to manage a portfolio of professional services assigned to/overseen by the service representative user 500. A service representative user 500 may add a new professional service to the dashboard 700 by uploading a document file (e.g., a PDF file) for the professional service or providing data for retrieving information relating to the professional service from a third-party entity (e.g., providing a filing/application number or a link to information relating to the professional service, and retrieving the information utilizing the number or link provided).

In one embodiment, the dashboard 770 allows a service representative user 500 to customize a questionnaire for a specific client user 400. The client user 400 may access the customized questionnaire via a dashboard 271 for his/her online account.

Figure 13B:
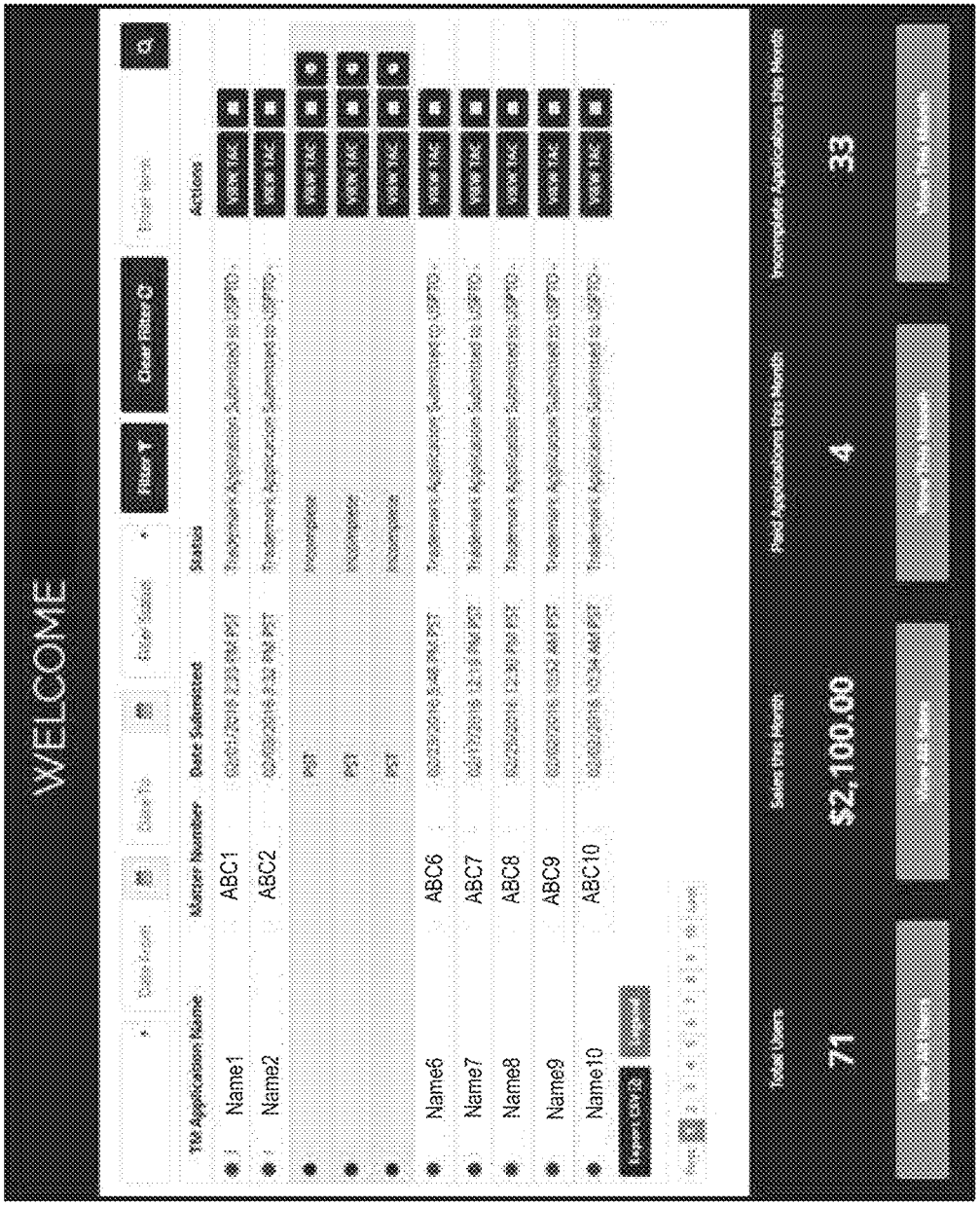
FIGS. 13B-13C illustrates other example dashboards 800 and 805, in accordance with an embodiment.
Figure 13C:
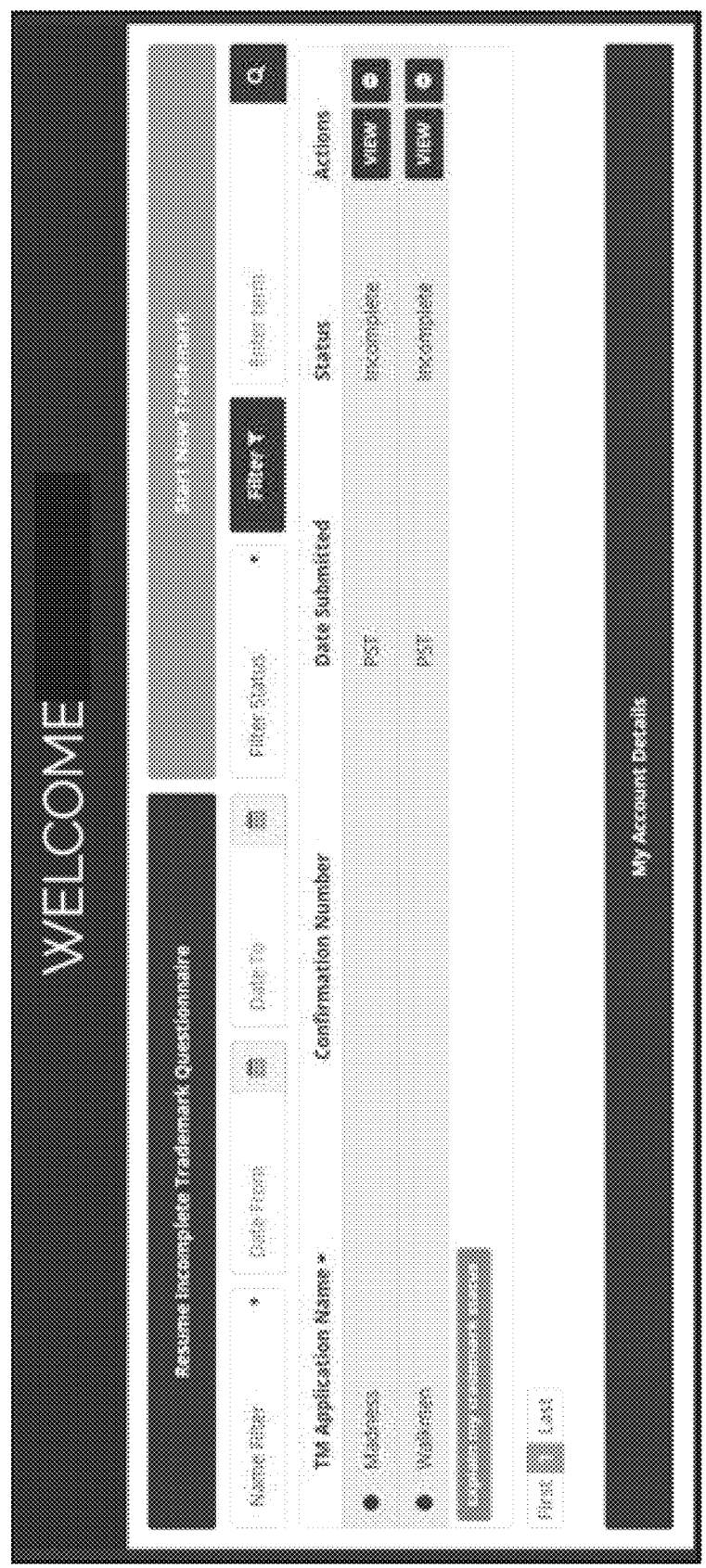

FIGS. 13B-13C illustrates other example dashboards 800 and 805, in accordance with an embodiment. Assume the web site 100 offers preparing and filing a trademark application as a service. Each dashboard 800, 805 provides service history information indicative of different trademark applications associated with an online account. Each dashboard 800, 805 tracks a status of each trademark application associated with the online account.

As shown in FIGS. 13B-13C, each trademark application has a corresponding label (referenced as "TM Application Name") identifying a mark that is the subject of the trademark application, a corresponding identifier (referenced as "Matter Number" or "Confirmation Number") identifying a unique matter/docket/confirmation number assigned to the trademark application, corresponding date information (referenced as "Date Submitted") comprising a timestamp indicating when the trademark application was submitted to the USPTO, and corresponding status information (referenced as "Status") indicative of a current status of the trademark application.

In one embodiment, a current status of a trademark application may be one of the following: (1) incomplete (e.g., questionnaire has not been completed), (2) payment pending (i.e., awaiting payment of fees for preparing and filing the trademark application), (3) payment received, paralegal review pending (i.e., questionnaire pending an audit by a paralegal), (4) paralegal reviewed, consultation with attorney pending (i.e., scheduling of a virtual consultation with an attorney pending), (5) consultation with attorney scheduled (i.e., virtual consultation with an attorney scheduled), (6) attorney reviewed, client approval pending (i.e., attorney has reviewed a TAC document prepared for the trademark application, client approval of the document pending), (7) client approved, filing of the trademark application pending (i.e., client approved the TAC document, and filing of the trademark application with the USPTO is pending), (8) trademark application submitted (i.e., submitted to the USPTO), and (9) USPTO status monitoring (i.e., on receipt of a status update from the USPTO for the trademark application, the paralegal/attorney will communicate the status update to the client). Each status has a corresponding color that a color coded indicator is set to.

For each trademark application listed, a user 50 may view each document (e.g., a trademark application confirmation document) prepared for the trademark application by selecting a selectable GUI component labeled as "View TAC" or "View". In one embodiment, a user 50 may also view associated documents such as trademark specimens, office action responses or even recorded video consultations from a case related menu.

As shown in FIG. 13B, the dashboard 800 provides statistical information for the online account. For example, if the user 50 is a service representative user 500, the statistical information comprises, but is not limited to, at least one of the following: a total number of incomplete trademark applications in a current month, a total number of trademark applications paid in the current month, a total number of client users 400 the service representative user 500 is overseeing trademark applications for, and a total amount of sales in the current month.

If the user 50 is a client user 400, the dashboard 800 allows the client user 400 to complete each incomplete trademark application listed and check a status of each completed trademark application listed.

FIG. 13D illustrates an example pop-up window 1000, in accordance with an embodiment. In one embodiment, in response to a request by a user 50 to resume an incomplete request (e.g., selection of GUI component 793 in FIG. 13A), the web site generator 240 (FIG. 2) generates a pop-up window 1000 for display on an electronic device 300 (FIG. 1) of the user 50.

In one embodiment, the pop-up window 1000 comprises a sub-area 1001 providing a list of one or more professional services that have not yet been completed. Each professional service has a corresponding selectable GUI component 1002 the user 50 may select to resume working on the professional service (e.g., completing a questionnaire, submitting payment information, etc.).

FIG. 14A illustrates an example detailed information GUI 830, in accordance with an embodiment. In one embodiment, in response to a request from a user 50 (FIG. 1) to view detailed information for a professional service associated with an online account (e.g., selection of GUI component 782 in FIG. 13A), the web site generator 240 (FIG. 2) is configured to generate the detailed information GUI 830 for display on an electronic device 300 (FIG. 1) of the user 50.

In one embodiment, the detailed information GUI 830 comprises a sub-area 831 providing the detailed information for the professional service. The detailed information for the professional service comprises, but is not limited to, at least one of the following: (1) a corresponding label/name for the professional service, (2) a corresponding identifier for the professional service, (3) corresponding filing/submission information for the professional service, if any (e.g., a timestamp indicating when a document prepared for the professional service was submitted, a confirmation/filing number, etc.), (4) corresponding status information indicative of a current status of the professional service (e.g., completed, incomplete, etc.), (5) corresponding virtual consultation information indicative of a virtual consultation scheduled, if any (e.g., date and time of the virtual consultation), (6) corresponding contact information indicative of where communications (e.g., status updates) relevant to the professional service should be forwarded to, (7) corresponding payment transaction record indicative of a payment received for fees for the professional service (e.g., amount of fees paid, payment method and information used, etc.), (8) all corresponding documents prepared and/or submitted for the professional service, (9) corresponding revision history information listing each revision/edit made to each corresponding document prepared and/or submitted for the professional service, (10) communication history indicative of all communications sent/received pertaining to the professional service (e.g., notifications, etc.), and (11) user responses to a questionnaire generated for the professional service.

In one embodiment, the sub-area 831 comprises one or more input fields 832 the user 50 may interact with to provide one or more changes to the detailed information for the professional service (e.g., an input field for updating the corresponding contact information, a date picker and a time picker for re-scheduling the virtual consultation, etc.). The sub-area 831 comprises a selectable GUI component 833 the user 50 may select to confirm the changes provided. In response to the user 50 selecting the GUI component 833, the detailed information is updated to incorporate the changes provided.

In one embodiment, the detailed information GUI 830 comprises a sub-area 836 providing the corresponding revision history information for the professional service. The revision history information is retrieved from a database 236 (FIG. 3) corresponding to the online account. For example, as shown in FIG. 14A, the sub-area 836 comprises one or more data rows 837 providing a trail of revisions/edits made to documents prepared and/or submitted for the professional service. Each data row 837 corresponds to a revision/edit made to a corresponding document prepared and/or submitted for the professional service. Each data row 837 comprises revision information indicative of a corresponding revision/edit made to a corresponding document. In one embodiment, the revision information comprises, but is not limited to, at least one of the following: a user identifier indicating a user 50 who made the corresponding revision/edit, and a timestamp indicating when the revision/edit was made.

In one embodiment, the sub-area 836 comprises, for each revision/edit listed, a selectable GUI component 838 the user 50 may select to view a time-stamped report/work piece (e.g., a PDF file) for a corresponding document. The time-stamped report/work piece incorporates the revision/edit. In one embodiment, the sub-area 836 comprises, for each revision/edit listed, a selectable GUI component 839 the user 50 may select to download the time-stamped report/work piece. In one embodiment, the time-stamped report/work piece highlights the revision/edit for ease of user review.

In one embodiment, the detailed information GUI 830 comprises a selectable GUI component 834 the user 50 may select to return to a dashboard 271 for the online account.

In one embodiment, the detailed information GUI 830 comprises a selectable GUI component 835 the user 50 may select to generate and download a compressed file (e.g., a ZIP file) comprising each document prepared and/or submitted for the professional service.

Figure 14B:
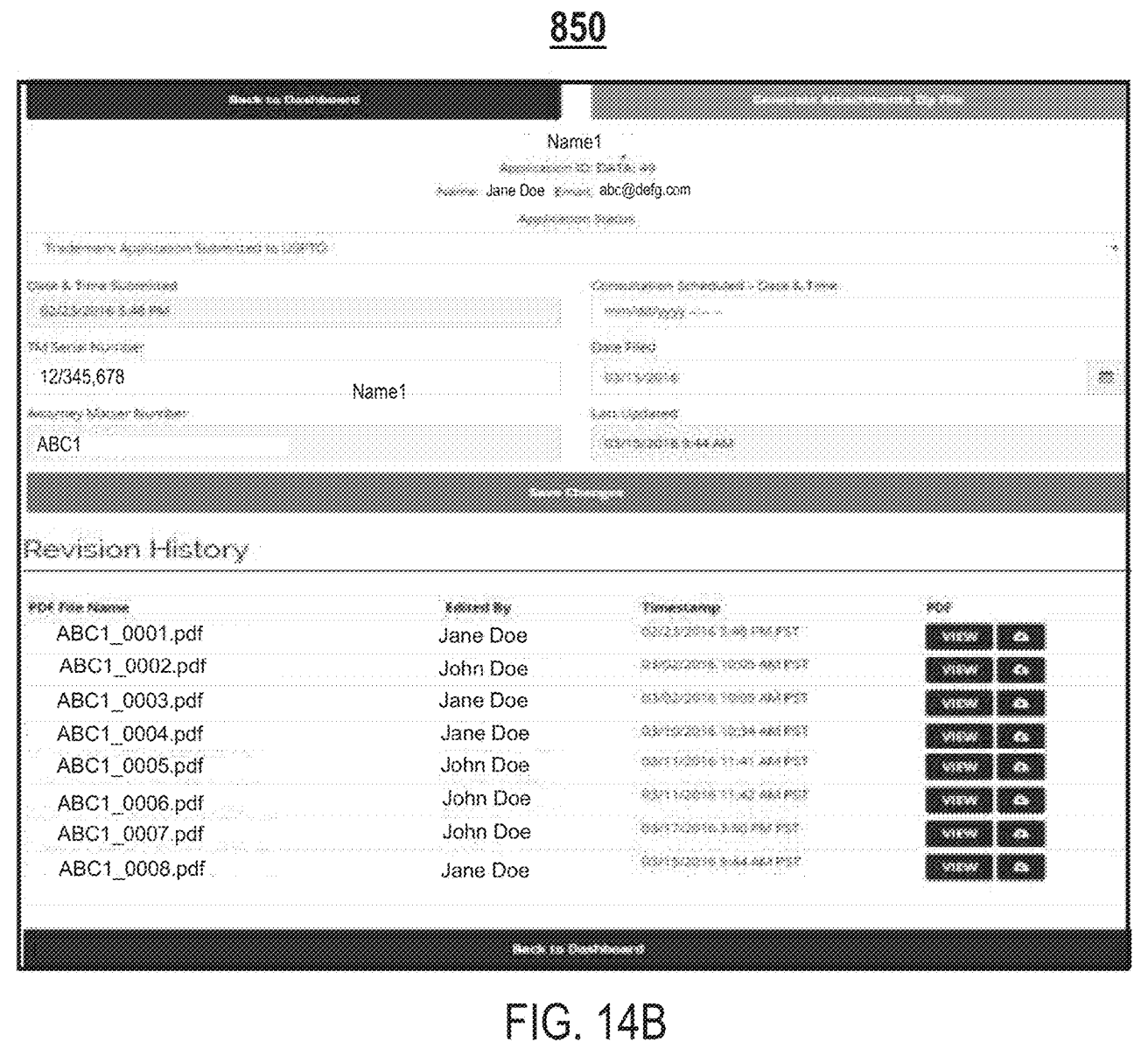

FIG. 14B illustrates another example detailed information GUI 850, in accordance with an embodiment. In one embodiment, the web site 100 (FIG. 1) offers preparing and filing a trademark application for a desired mark with the USPTO as a professional service. In response to a request from a user 50 to view detailed information for a particular trademark application, the web site generator 240 (FIG. 2) is configured to generate a detailed information GUI 850 providing the detailed information for the trademark application.

Figure 15A:
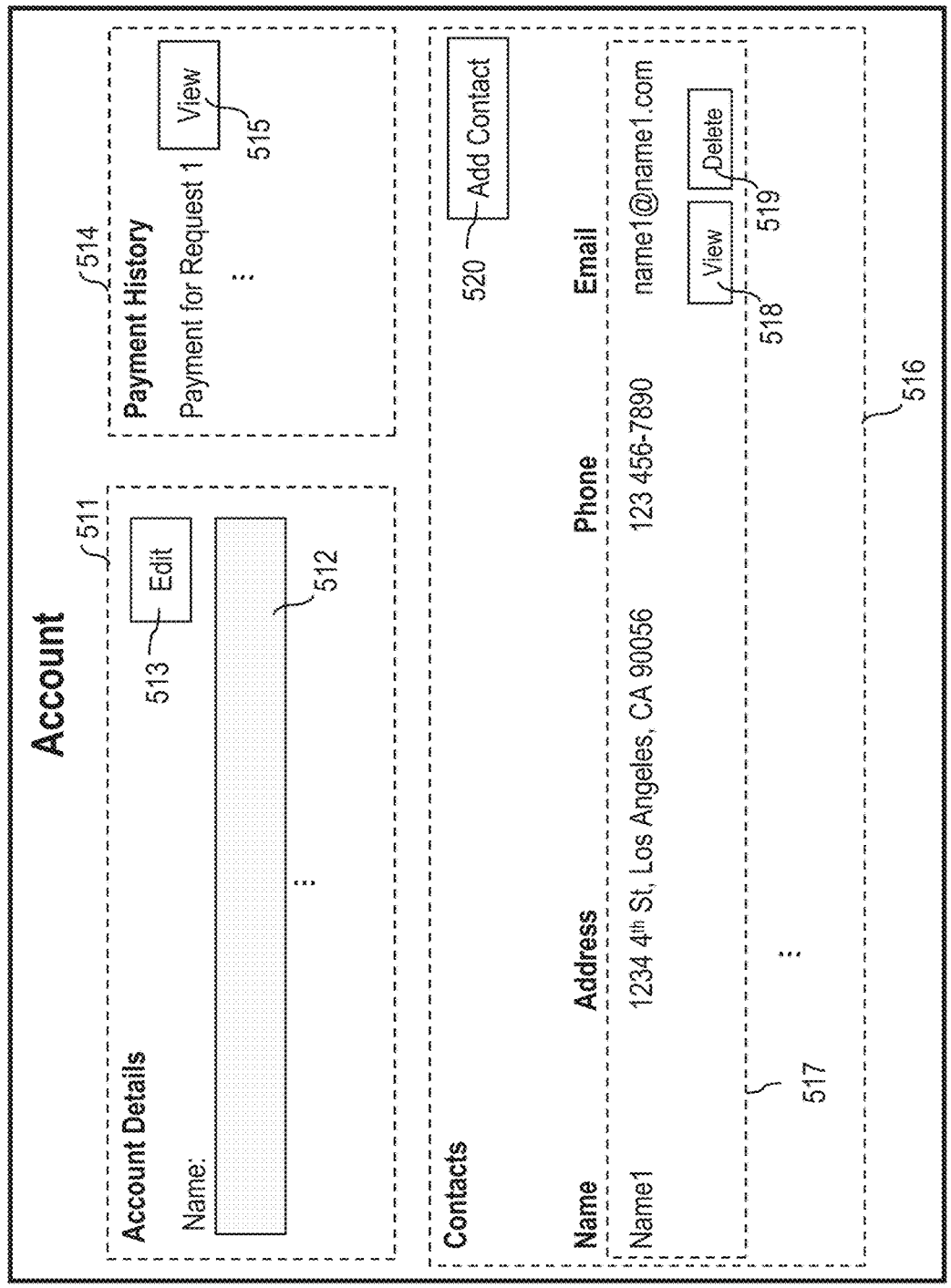
FIG. 15A illustrates an example account details GUI 510, in accordance with an embodiment.

FIG. 15A illustrates an example account details GUI 510, in accordance with an embodiment. In one embodiment, in response to a request from a user 50 (FIG. 1) to view account details for an online account the user 50 is associated with (e.g., selection of GUI component 794 in FIG. 13A), the web site generator 240 (FIG. 2) is configured to generate the account details GUI 510 for display on an electronic device 300 (FIG. 1) of the user 50.

In one embodiment, the account details GUI 510 comprises a sub-area 511 providing account information for the online account. The account information may comprise, but is not limited to, at least one of the following: authentication credentials for the online account (e.g., a username/e-mail address and a password), and user information of the user 50 (e.g., full name, etc.). The sub-are 511 comprises a selectable GUI component 513 the user 50 may select to edit one or more input fields 512 of the sub-area 511 that is populated with the account information.

In one embodiment, the account details GUI 510 comprises a sub-area 514 providing payment history information for the online account. The payment history information is retrieved from a database 238 (FIG. 3) corresponding to the online account. The payment history information is indicative of all payments of fees received for all professional services associated with the online account. If the user 50 is a client user 400, the payment history information comprises a payment transaction record for each payment of fees made by the client user 400 for each professional service requested by the client user 400. The sub-area 514 comprises, for each payment of fees, a corresponding selectable GUI component 515 the user 50 may select to view a payment transaction record for the payment.

In one embodiment, the account details GUI 510 comprises a sub-area 516 providing stored contact information for the user 50. The stored contact information is retrieved from a database 234 (FIG. 3) corresponding to the user 50. The stored contact information comprises one or more data rows 517. Each data row 517 corresponds to a contact saved by the user 50. Each data row 517 comprises information for a corresponding contact. The information for the corresponding contact may comprise, but is not limited to, a corresponding name of the contact, a corresponding address for the contact (e.g., home address, business address, etc.), a corresponding telephone number for the contact (e.g., home phone number, office phone number, mobile phone number, etc), a corresponding e-mail address for the contact (e.g., personal e-mail address, business e-mail address, etc.), etc. The sub-area 516 comprises, for each contact, a corresponding selectable GUI component 518 the user 50 may select to view and edit the information for the contact. The sub-area 516 comprises, for each contact, a corresponding selectable GUI component 519 the user 50 may select to delete the contact from the stored contact information.

The sub-area 516 comprises a selectable GUI component 520 the user 50 may select to add and save a new contact. In one embodiment, the user 50 may import information for the new contact stored on the electronic device 300 or manually enter the information for the new contact.

FIG. 15B illustrates another example account details GUI 530, in accordance with an embodiment.

Figure 16:
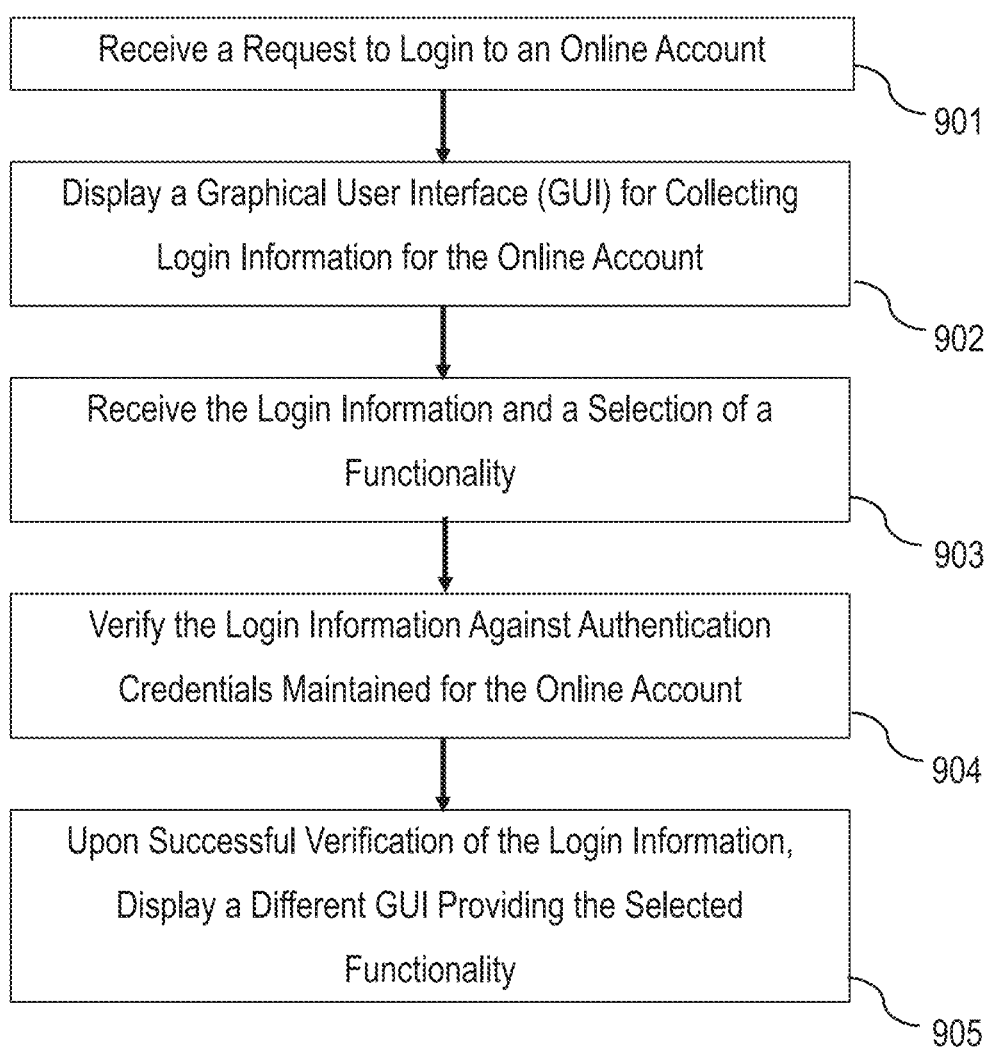
FIG. 16 illustrates a flowchart of an example process 900 for processing a login request, in accordance with an embodiment of the invention.

FIG. 16 illustrates a flowchart of an example process 900 for processing a login request, in accordance with an embodiment of the invention. In process block 901, receive a request to login to an online account. In process block 902, display a graphical user interface (GUI) for collecting login information for the online account. In process block 903, receive the login information and a selection of a functionality. In process block 904, verify the login information against authentication credentials maintained for the online account. In process block 905, upon successful verification of the login formation, display a different GUI providing the selected functionality.

For example, if the selected functionality comprises a request for a professional service, a questionnaire GUI (e.g., questionnaire GUI 730) is displayed. As another example, if the selected functionality comprises a request to access a dashboard for the online account, a dashboard (e.g., dashboard 770) for the online account is displayed.

In one embodiment, the system 200 utilizes the I/O processor 250, the web site generator 240, and the account manager 260 to perform process blocks 901-905.

Figure 17:
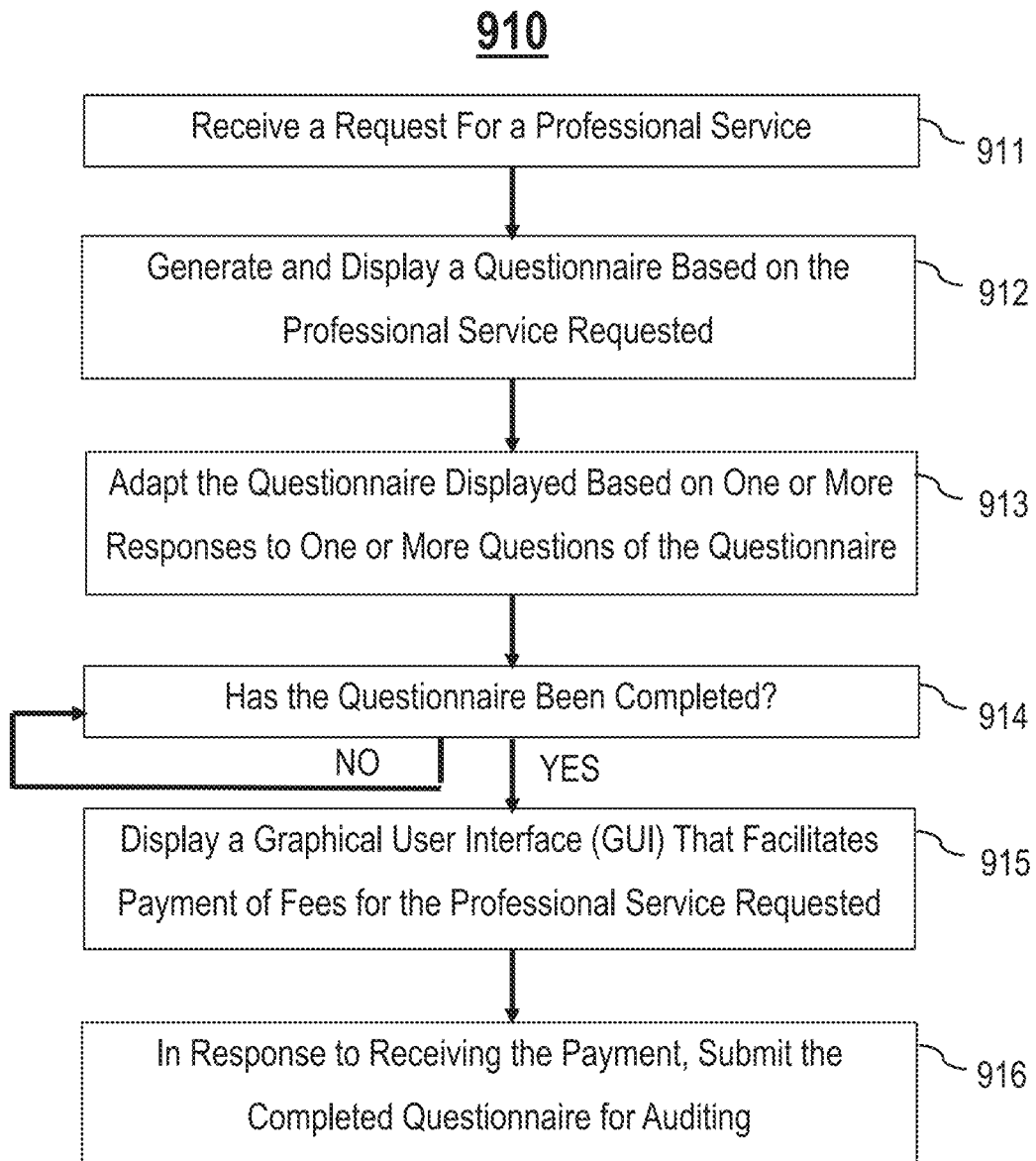
FIG. 17 illustrates a flowchart of an example process 910 for processing a request for a professional service, in accordance with an embodiment of the invention.

FIG. 17 illustrates a flowchart of an example process 910 for processing a request for a professional service, in accordance with an embodiment of the invention. In process block 911, receive a request for a professional service. In process block 912, generate and display a questionnaire based on the professional service requested. In process block 913, adapt the questionnaire displayed based on one or more responses to one or more questions of the questionnaire. In process block 914, determine whether the questionnaire has been completed. If the questionnaire has not been completed, return to process block 914.

If the questionnaire has been completed, proceed to process block 915 to display a graphical user interface (GUI) that facilitates payment of fees for the professional service requested. In process block 916, in response to receiving the payment, submit the completed questionnaire for auditing.

In one embodiment, the system 200 utilizes at least the I/O processor 250, the web site generator 240, the account manager 260, the questionnaire generator 255, and the payment generator 290 to perform process blocks 911-916.

Figure 18:
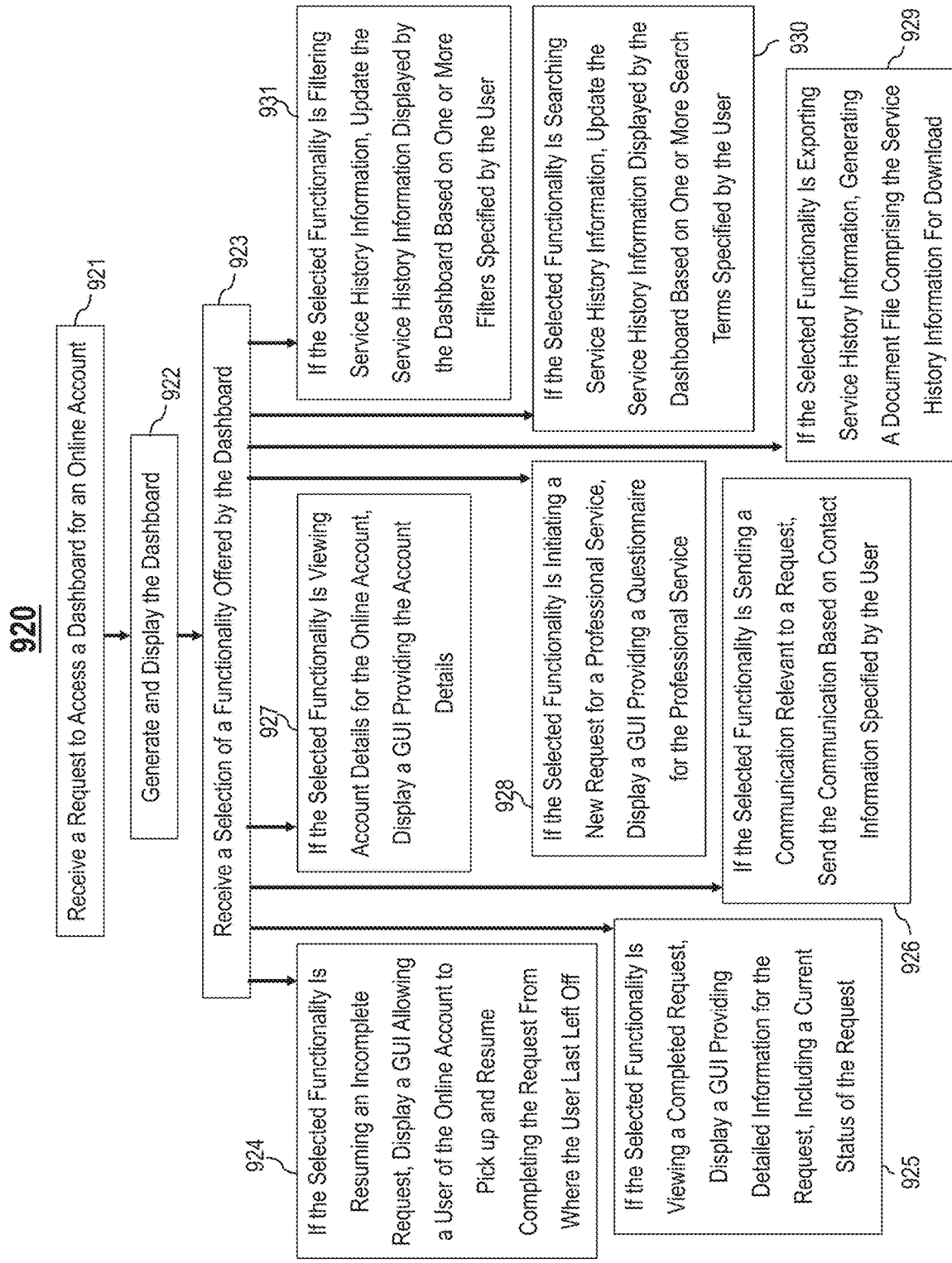
FIG. 18 illustrates a flowchart of an example process 920 for processing a request to access a dashboard for an online account, in accordance with an embodiment of the invention.

FIG. 18 illustrates a flowchart of an example process 920 for processing a request to access a dashboard for an online account, in accordance with an embodiment of the invention. In process block 921, receive a request to access a dashboard for an online account. In process block 922, generate and display the dashboard. In process block 923, receive a selection of a functionality offered by the dashboard.

If the selected functionality is resuming an incomplete request, proceed to process block 924 to display a GUI allowing a user of the online account to pick up and resume completing the request from where the user last left off.

If the selected functionality is viewing a completed request, proceed to process block 925 to display a GUI providing detailed information for the request, including a current status of the request.

If the selected functionality is sending a communication relevant to a request, proceed to process block 926 to send the communication based on contact information specified by the user.

If the selected functionality is viewing account details for the online account, proceed to process block 927 to display a GUI providing the account details.

If the selected functionality is initiating a new request for a professional service, proceed to process block 928 to display a GUI providing a questionnaire for the professional service.

If the selected functionality is exporting service history information, proceed to process block 929 to generate a document file comprising the service history information for download.

If the selected functionality is searching service history information, proceed to process block 930 to update the service history information displayed by the dashboard based on one or more search terms specified by the user.

If the selected functionality is filtering service history information, proceed to process block 931 to update the service history information displayed by the dashboard based on one or more filters specified by the user.

In one embodiment, the system 200 utilizes at least the I/O processor 250, the web site generator 240, the account manager 260, the questionnaire generator 255, and the dashboard generator 270 to perform process blocks 921-931.

Figure 19:
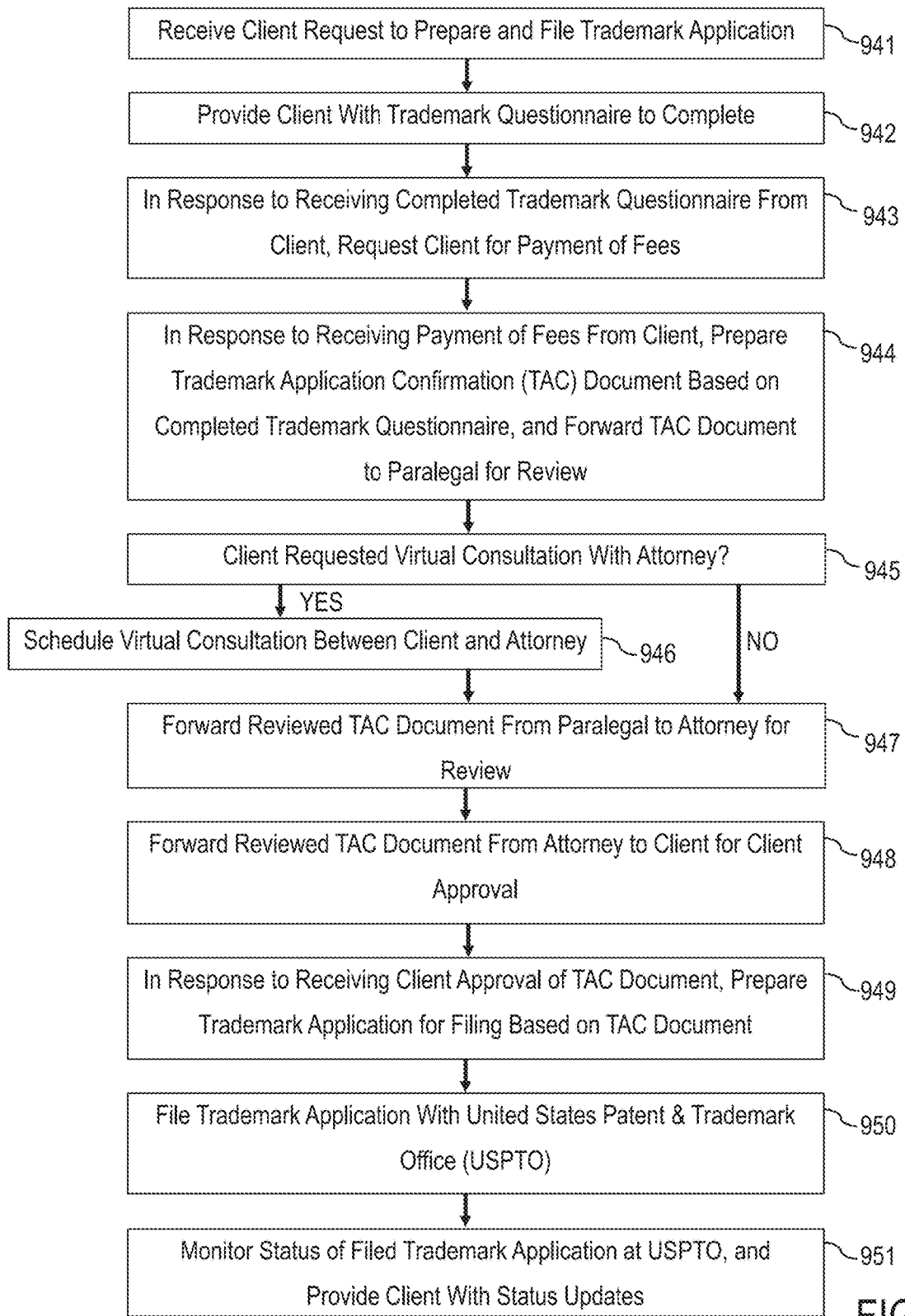
FIG. 19 illustrates a flowchart of an example process 940 for processing a request to prepare and file a trademark application, in accordance with an embodiment of the invention.

FIG. 19 illustrates a flowchart of an example process 940 for processing a request to prepare and file a trademark application, in accordance with an embodiment of the invention. In process block 941, receive a request from a client to prepare and file a trademark application. In process block 942, provide the client with a trademark questionnaire to complete. In process block 943, in response to receiving the completed trademark questionnaire from the client, request a payment of fees for preparing and filing a trademark application from the client. In process block 944, in response to receiving the payment of fees from the client, prepare a trademark application confirmation (TAC) document based on the completed trademark questionnaire, and forward the TAC document to a paralegal for review. In process block 945, determine whether the client requested a virtual consultation with an attorney. If the client did not request a virtual consultation, proceed to process block 947. If the client requested a virtual consultation, proceed to process block 946 to schedule a virtual consultation between the client and the attorney, and then proceed to process block 947.

In process block 947, forward the reviewed TAC document from the paralegal to the attorney for review. In process block 948, forward the reviewed TAC document from the attorney to the client for client approval. In process block 949, in response to receiving client approval of the TAC document, prepare a trademark application for filing based on the TAC document. In process block 950, file the trademark application with the United Stated Patent and Trademark Office (USPTO). In process block 951, monitor status of the filed trademark application at USPTO, and provide the client with status updates of the filed trademark application.

In one embodiment, the system 200 utilizes at least the I/O processor 250, the web site generator 240, the account manager 260, the questionnaire generator 255, the payment generator 290, the dashboard generator 270, the auditing unit 245, and the virtual consultation unit 280 to perform process blocks 941-951.

Figure 20:
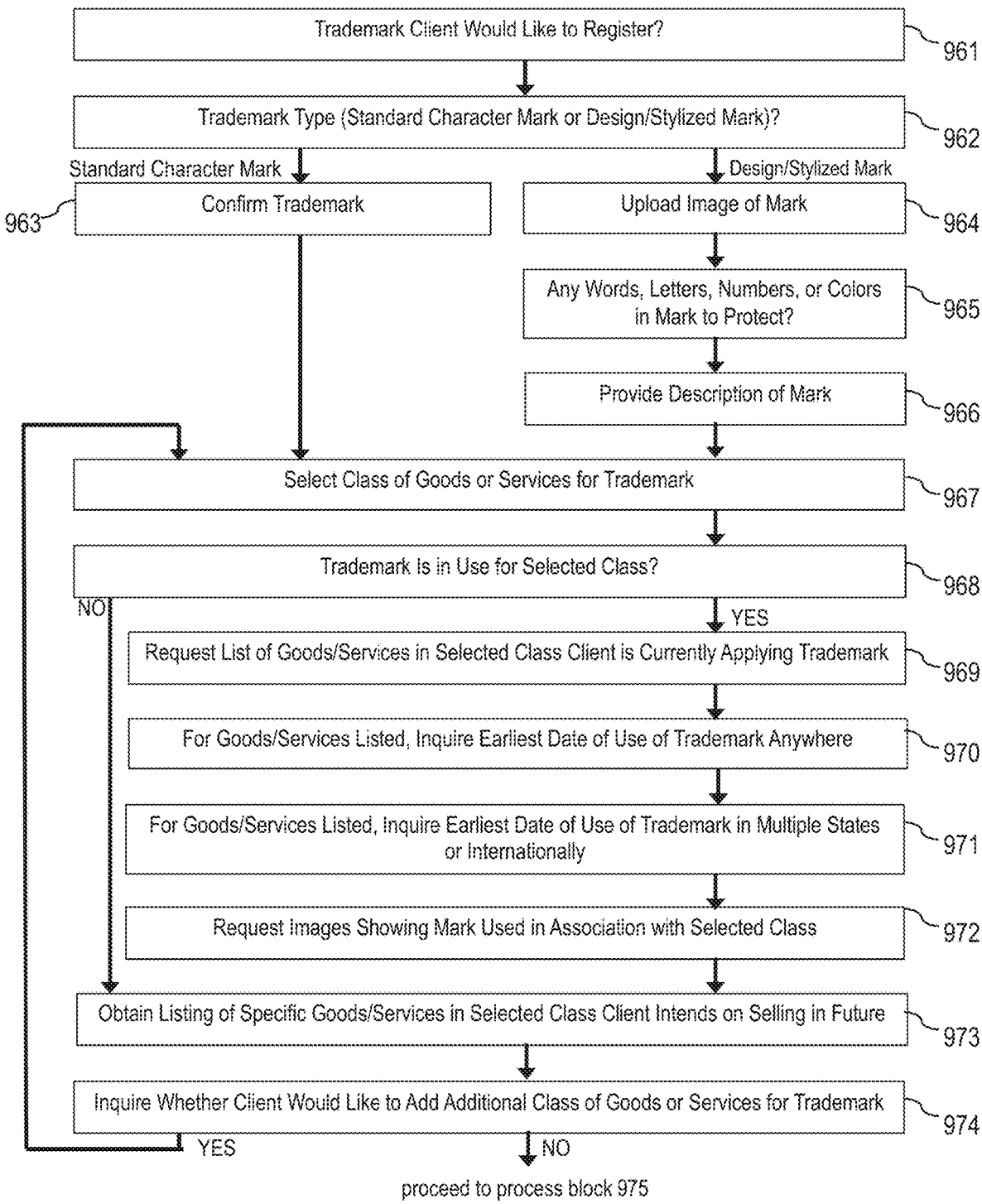
FIG. 20 illustrates a flowchart of an example process 960 for adapting a questionnaire to collect information for preparing and filing a trademark application, in accordance with an embodiment of the invention.
Figure 20:
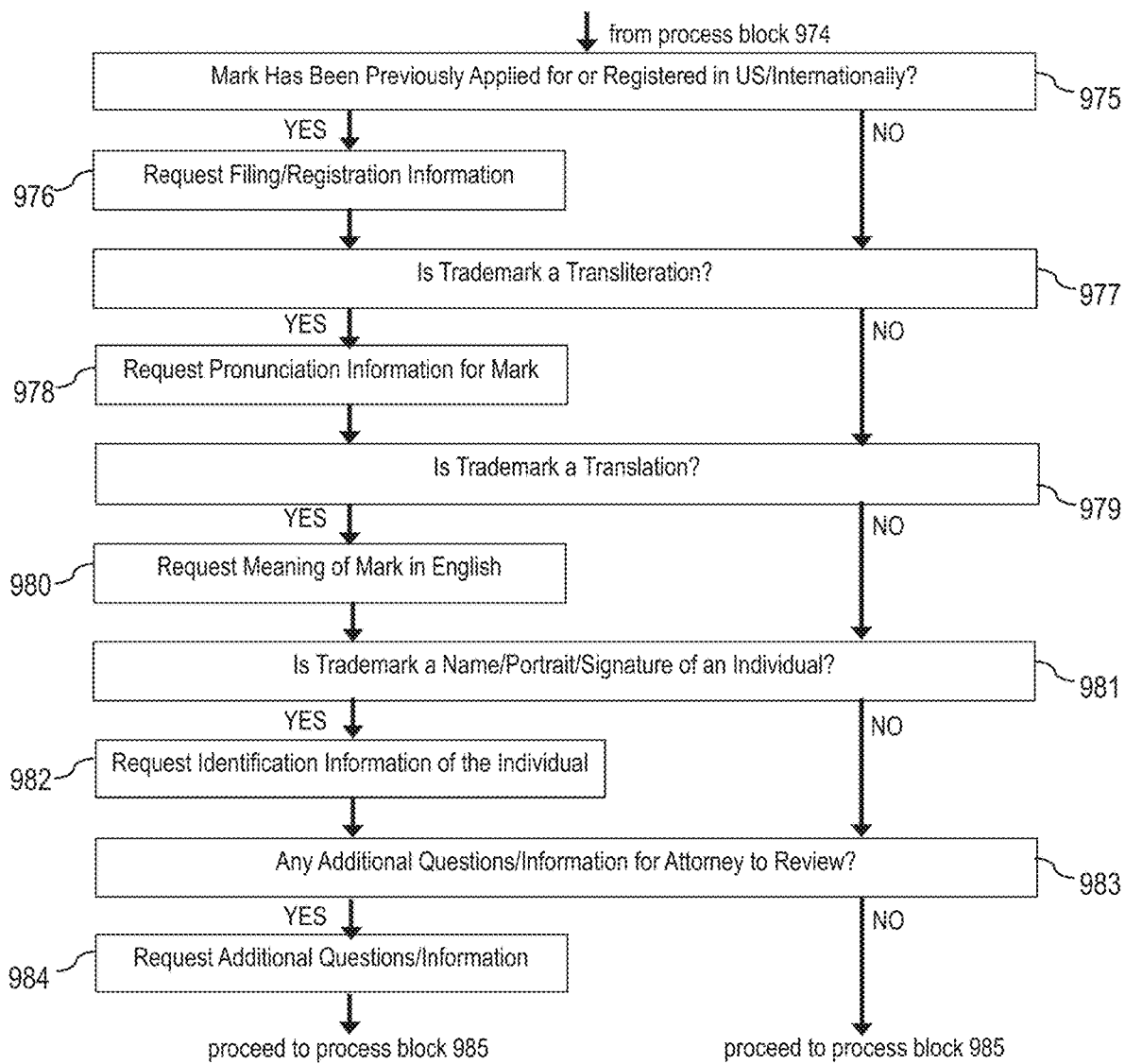
Figure 20:
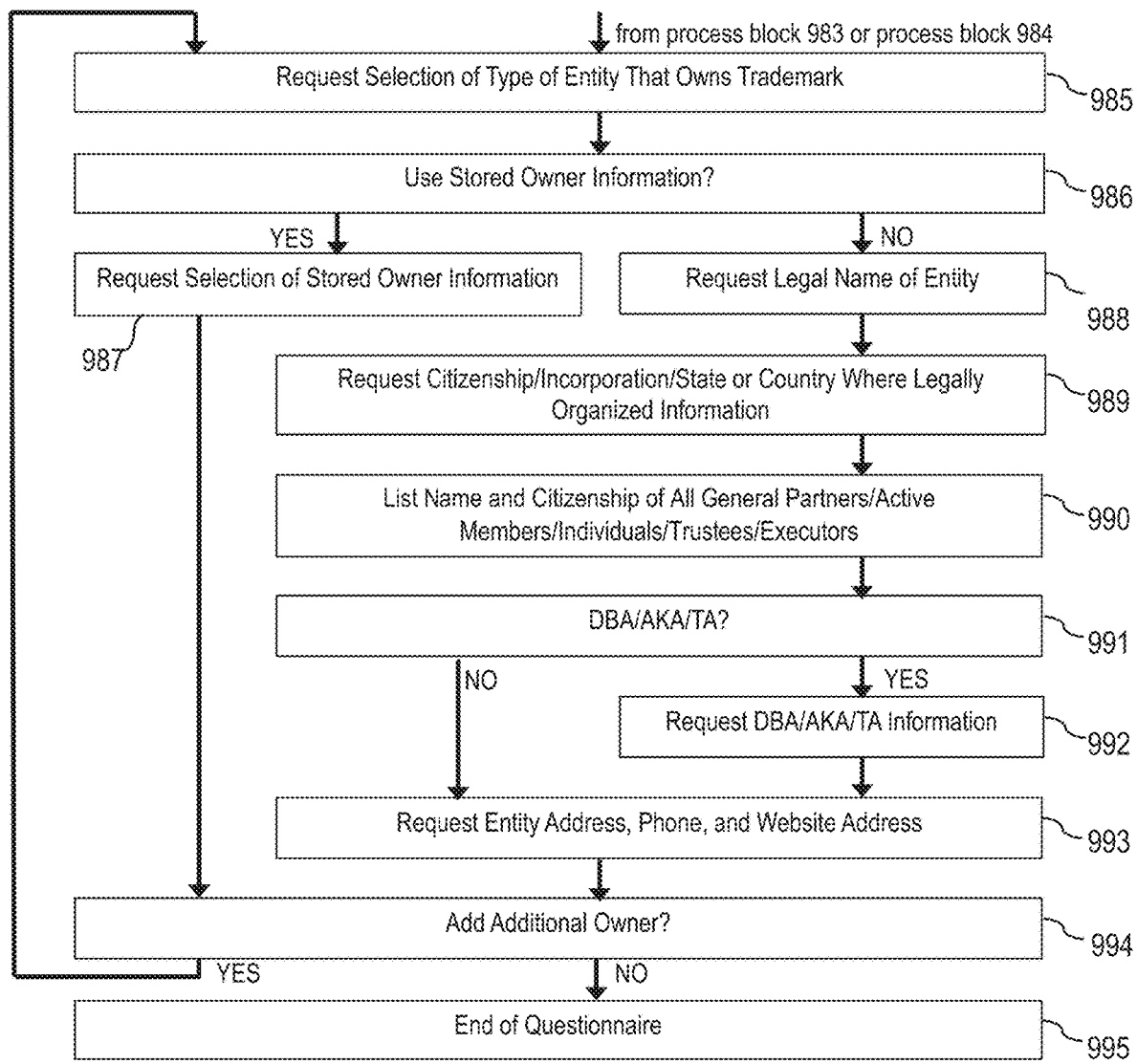

FIG. 20 illustrates a flowchart of an example process 960 for adapting a questionnaire to collect information for preparing and filing a trademark application, in accordance with an embodiment of the invention. In process block 961, present a question inquiring a trademark a client (e.g., a client user 400) would like to register. In process block 962, present a question inquiring a type of the trademark (i.e., whether the trademark is a standard character mark or a design/stylized mark). If the trademark is a standard character mark, proceed to process block 963. In process block 963, present a question requesting the client to confirm the trademark, then proceed to process block 967.

If the trademark is a design/stylized mark, proceed to process block 964. In process block 964, present a question requesting the client to upload an image of the mark. In process block 965, present a question inquiring whether there are any words, letters, numbers, or colors in the mark to protect. In process block 966, present a question requesting the client to provide a description of the mark, then proceed to process block 967.

In process block 967, present a question requesting the client to select a class of goods or services for the trademark. In process block 968, present a question inquiring whether the trademark is in use for the selected class. If the trademark is not in use for the selected class, proceed to process block 973.

If the trademark is in use for the selected class, proceed to process block 969. In process block 969, present a question requesting a list of goods/services in the selected class the client is currently applying the trademark. In process block 970, for the goods/services listed, present a question inquiring earliest date of use of the trademark anywhere. In process block 971, for the goods/services listed, present a question inquiring earliest date of use of the trademark in multiple states or internationally. In process block 972, present a question requesting images showing the mark used in association with the selected class, then proceed to process block 973.

In process block 973, obtain a listing of specific goods/service in the selected class the client intends on selling in the future. In process block 974, present a question inquiring whether the client would like to add an additional class of goods or services for the trademark. If the client would like to add an additional class of goods or services, return to process block 967. If the client would not like to add an additional class of goods or services, proceed to process block 975.

In process block 975, present a question inquiring whether the mark has been previously applied for or registered in the US or internationally. If the mark has been previously applied for or registered in the US or internationally, proceed to process block 976. In process block 976, present a question requesting the client to provide filing or registration information for the mark, then proceed to process block 977. If the mark has not been previously applied for or registered in the US or internationally, proceed to process block 977.

In process block 977, present a question inquiring whether the trademark is a transliteration. If the trademark is a transliteration, proceed to process block 978. In process block 978, present a question requesting the client to provide pronunciation information for the mark, then proceed to process block 979. If the trademark is not a transliteration, proceed to process block 979.

In process block 979, present a question inquiring whether the trademark is a translation. If the trademark is a translation, proceed to process block 980. In process block 980, present a question requesting the client to provide a meaning of the mark in English, then proceed to process block 981. If the trademark is not a translation, proceed to process block 981.

In process block 981, present a question inquiring whether the trademark is a name, portrait, or signature of an individual. If the trademark is a name, portrait, or signature of an individual, proceed to process block 982. In process block 982, present a question requesting the client to provide identification information of the individual, then proceed to process block 983. If the trademark is not a name, portrait, or signature of an individual, proceed to process block 983.

In process block 983, present a questing inquiring whether there are any additional questions/information for an attorney to review. If there are any additional questions/information for an attorney to review, proceed to process block 984. In process block 984, present a question requesting the client to provide the additional questions/information, then proceed to process block 985. If there are no additional questions/information for an attorney to review, proceed to process block 985.

In process block 985, present a question requesting the client to select a type of entity that owns the trademark. In process block 986, present a question inquiring whether the client would like to use stored owner information to provide as owner information for the trademark. If the client would like to use stored owner information, proceed to process block 987. In process block 987, present a question requesting the client to select stored owner information the client would like to provide as owner information for the trademark, then proceed to process block 994. If the client would not like to use stored owner information, proceed to process block 988.

In process block 988, present a question requesting the client to provide a legal name of the entity. In process block 989, present a question requesting the client to provide citizenship, incorporation, or other information indicative of a state or country where the entity is legally organized. In process block 990, present a question requesting the client to list name and citizenship of all general partners/active members/individuals/trustees/executors for the entity. In process block 991, present a question inquiring whether the entity is a DBA/AKA/TA. If the entity is a DBA/AKA/TA, proceed to process block 992. In process block 992, present a question requesting the client to provide DBA/AKA/TA information, then proceed to process block 993. If the entity is not a DBA/AKA/TA, proceed to process block 993.

In process block 993, present a question requesting the client to provide contact information for the entity (e.g., entity address, phone, web site address, etc.). In process block 994, present a question inquiring whether the client would like to add an additional owner for the trademark. If the client would like to add an additional owner for the trademark, return to process block 985. If the client would not like to add an additional owner for the trademark, proceed to process block 995 where the questionnaire ends.

In one embodiment, the system 200 utilizes at least the I/O processor 250, the web site generator 240, the account manager 260, the questionnaire generator 255, and the auditing unit 245 to perform process blocks 961-995.

Figure 21:
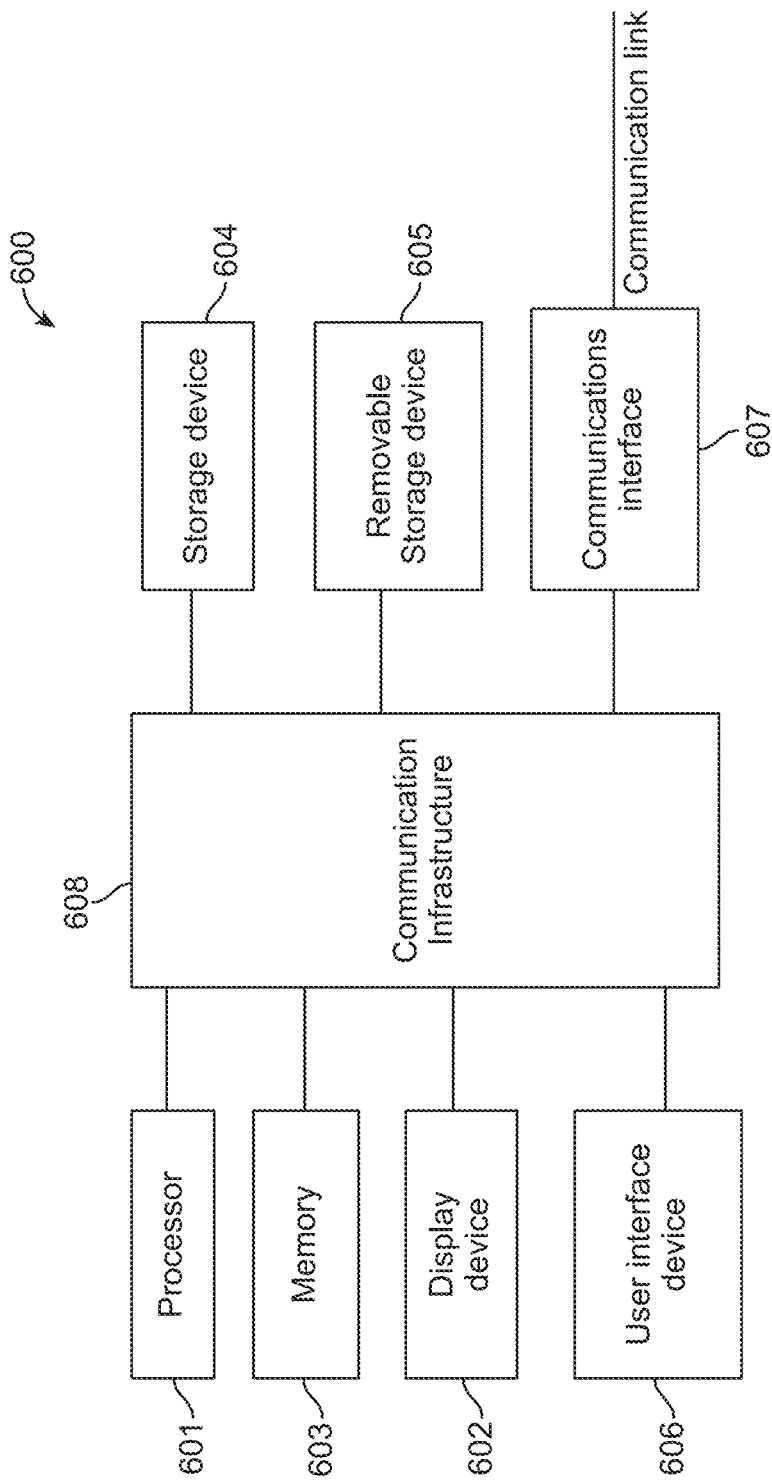
FIG. 21 is a high-level block diagram showing an information processing system comprising a computer system 600 useful for implementing the disclosed embodiments.

FIG. 21 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform process blocks 901-904 of the process 900.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for process 900 (FIG. 12) and process 950 (FIG. 13) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    receiving confirmation of a pre-payment of fees for a live, virtual consultation with a remote service representative user for a pre-determined amount of time;
    initiating the virtual consultation by generating a graphical user interface (GUI) for display on an electronic device, wherein the GUI comprises a countdown timer indicative of an amount of time remaining for the virtual consultation, and the GUI further comprises a window displaying the remote service representative user;
    automatically resizing the window displaying the remote service representative user smaller in response to the amount of time remaining for the virtual consultation decreasing; and
    terminating the virtual consultation in response to the amount of time remaining for the virtual consultation running out.

2. The method of claim 1, further comprising:
    generating a background indicator for creating an emotional sense in a user that the amount of time remaining for the virtual consultation is running out.

3. The method of claim 2, wherein the background indicator further comprises the window displaying the remote service representative user, and wherein a size of the window displaying the remote service representative user decreases in response to the amount of time remaining for the virtual consultation decreasing.

4. The method of claim 1, wherein the terminating the virtual consultation comprises:
    automatically closing the window displaying the remote service representative user.

5. The method of claim 1, further comprising:
    automatically resizing the window displaying the remote service representative user larger in response to an extension of the amount of time remaining for the virtual consultation, wherein a size of the window displaying the remote service representative user increases in response to the extension of the amount of time remaining for the virtual consultation.

6. The method of claim 2, wherein the background indicator further comprises a light indicator configured to flash different colors in response to the amount of time remaining for the virtual consultation satisfying different predetermined thresholds.

7. The method of claim 1, wherein the GUI further comprises:
    one or more selectable GUI components indicative of one or more pre-determined rates corresponding to one or more time increments available for purchase to extend the amount of time remaining for the virtual consultation.

8. The method of claim 7, further comprising:
    receiving, from the electronic device, a selection of a time increment from the one or more time increments available;
    receiving additional confirmation of an additional pre-payment of fees for the time incremented selected; and
    extending the amount of time remaining for the virtual consultation based on the time increment selected.

9. A system comprising:
    at least one processor; and
    a non-transitory processor-readable memory device storing instructions that when executed by the at least one processor causes the at least one processor to perform operations including:
        receiving confirmation of a pre-payment of fees for a live, virtual consultation with a remote service representative user for a pre-determined amount of time;
        initiating the virtual consultation by generating a graphical user interface (GUI) for display on an electronic device, wherein the GUI comprises a countdown timer indicative of an amount of time remaining for the virtual consultation, and the GUI further comprises a window displaying the remote service representative user;

automatically resizing the window displaying the remote service representative user smaller in response to the amount of time remaining for the virtual consultation decreasing; and terminating the virtual consultation in response to the amount of time remaining for the virtual consultation running out.

10. The system of claim 9, wherein the operations further comprise:

generating a background indicator for creating an emotional sense in a user that the amount of time remaining for the virtual consultation is running out.

11. The system of claim 10, wherein the background indicator further comprises the window displaying the remote service representative user, and wherein a size of the window displaying the remote service representative user decreases in response to the amount of time remaining for the virtual consultation decreasing.

12. The system of claim 9, wherein the terminating the virtual consultation comprises:

automatically closing the window displaying the remote service representative user.

13. The system of claim 11, wherein the operations further comprise:

automatically resizing the window displaying the remote service representative user larger in response to an extension of the amount of time remaining for the virtual consultation, wherein a size of the window displaying the remote service representative user increases in response to the extension of the amount of time remaining for the virtual consultation.

14. The system of claim 10, wherein the background indicator further comprises a light indicator configured to flash different colors in response to the amount of time remaining for the virtual consultation satisfying different predetermined thresholds.

15. The system of claim 9, wherein the GUI further comprises:

one or more selectable GUI components indicative of one or more pre-determined rates corresponding to one or more time increments available for purchase to extend the amount of time remaining for the virtual consultation.

16. The system of claim 15, wherein the operations further comprise:

receiving, from the electronic device, a selection of a time increment from the one or more time increments available;

receiving additional confirmation of an additional pre-payment of fees for the time incremented selected; and extending the amount of time remaining for the virtual consultation based on the time increment selected.

17. A computer program product comprising a non-transitory computer readable storage medium having program instructions embodied therewith, the program instructions executable by a processor to cause the processor to:

receive confirmation of a pre-payment of fees for a live, virtual consultation with a remote service representative user for a pre-determined amount of time;

initiate the virtual consultation by generating a graphical user interface (GUI) for display on an electronic device, wherein the GUI comprises a countdown timer indicative of an amount of time remaining for the virtual consultation, and the GUI further comprises a window displaying the remote service representative user;

automatically resize the window displaying the remote service representative user smaller in response to the amount of time remaining for the virtual consultation decreasing; and terminate the virtual consultation in response to the amount of time remaining for the virtual consultation running out.

18. The computer program product of claim 17, wherein the program instructions are further executable by the processor to cause the processor to:

generate a background indicator for creating an emotional sense in a user that the amount of time remaining for the virtual consultation is running out.

19. The computer program product of claim 18, wherein the background indicator further comprises the window displaying the remote service representative user, and wherein a size of the window displaying the remote service representative user decreases in response to the amount of time remaining for the virtual consultation decreasing.

20. The computer program product of claim 17, wherein the processor terminates the virtual consultation by automatically closing the window.

* * * * *